US012804401B2

(12) United States Patent
Sandström et al.

(10) Patent No.: US 12,804,401 B2
(45) **Date of Patent: *Nov. 17, 2026**

(54) MANAGEMENT OF SIGNAL VERIFICATION AMONGST NODES OF A COMMUNICATION SYSTEM EMPLOYING E2E PROTECTION PROTOCOLS

(71) Applicant: Volvo Car Corporation, Gothenburg (SE)

(72) Inventors: Per Sandström, Gothenburg (SE); Andreas Ekbom, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 42 days.

This patent is subject to a terminal disclaimer.

(21) Appl. No.: 18/987,333

(22) Filed: Dec. 19, 2024

(65) Prior Publication Data

US 2026/0136192 A1 May 14, 2026

Related U.S. Application Data

(63) Continuation of application No. 18/979,776, filed on Dec. 13, 2024, which is a continuation-in-part of application No. 18/943,340, filed on Nov. 11, 2024.

(51) Int. Cl.
*H04W 12/106* (2021.01)
*H04L 1/08* (2006.01)
(Continued)

(52) U.S. Cl.
CPC ............. *H04W 12/106* (2021.01); *H04L 1/08* (2013.01); *H04W 4/44* (2018.02); *H04W 88/04* (2013.01)

(58) Field of Classification Search
CPC ..... H04W 12/106; H04W 4/44; H04W 88/04; H04L 1/08
See application file for complete search history.

(56) References Cited

U.S. PATENT DOCUMENTS 10,791,125 B2 * 9/2020 Mohammed .......... G06F 21/606
11,200,331 B1 * 12/2021 Bouaichi ............... H04L 9/0897
(Continued)

FOREIGN PATENT DOCUMENTS

CN 106257863 A 12/2016
CN 110324219 A 10/2019
(Continued)

OTHER PUBLICATIONS

Constantino, et al., "Analysis of Functional Safety in a secure implementation of CAN Protocol," 2020 IEEE 18th International Conference on Industrial Informatics (INDIN) | 978-1-7281-4964-6/20/$31.00 © 2020 IEEE | DOI: 10.1109/INDIN45582.2020.9442168.
(Continued)

*Primary Examiner* — Luu T Pham
*Assistant Examiner* — Paul J Skwierawski
(74) *Attorney, Agent, or Firm* — Amin, Turocy & Watson, LLP

(57) ABSTRACT

Techniques for centralized management of signal verification of protected data messages are described. A computer-implemented method, performed by a data processing device of a system comprising a plurality of nodes respectively connected to one another via a communication framework, can comprise executing a transmission relay process repeatedly at a defined execution frequency to control transmission of protected data messages between sender nodes of the plurality of nodes and respective receiver nodes of the plurality of nodes. The transmission relay process comprises reading data entries published by the sender nodes to a memory of the system, the data entries respectively comprising data content to be sent to the respective receiver nodes, generating the protected data messages respectively comprising the data content, and sending, via the commu-
(Continued)

nication framework, the protected data messages to the respective receiver nodes.

20 Claims, 20 Drawing Sheets

(51) Int. Cl.
*H04W 4/44* (2018.01)
*H04W 88/04* (2009.01)

(56) References Cited

U.S. PATENT DOCUMENTS

| | | | |
|---|---|---|---|
| 11,443,323 B2* | 9/2022 | Wang | G06F 21/57 |
| 11,977,665 B2 | 5/2024 | Islim et al. | |
| 2007/0289017 A1 | 12/2007 | Copeland | |
| 2017/0180314 A1* | 6/2017 | Walker | H04L 9/3263 |
| 2018/0131522 A1 | 5/2018 | Lawlis et al. | |
| 2023/0328635 A1 | 10/2023 | Detwiler et al. | |

FOREIGN PATENT DOCUMENTS

| | | |
|---|---|---|
| CN | 111917619 A | 11/2020 |
| CN | 113037759 A | 6/2021 |
| CN | 111917619 B | 7/2022 |
| CN | 115765904 A | 3/2023 |
| CN | 116319029 A | 6/2023 |
| WO | 2023143020 A1 | 8/2023 |

OTHER PUBLICATIONS

U.S. Appl. No. 18/943,340, filed Nov. 11, 2024.
U.S. Appl. No. 18/979,776, filed Dec. 13, 2024.
International Search Report and Written Opinion received for PCT Application Serial No. PCT/EP2025/081434 dated Dec. 3, 2025, 11 pages.
Autosar, "Specification of CAN Interface", R21-11, Nov. 25, 2021, pp. 1-217.
Non-Final Office Action received for U.S. Appl. No. 18/943,340 dated Apr. 7, 2026, 31 pages.
Non-Final Office Action received for U.S. Appl. No. 18/979,776 dated Apr. 8, 2026, 33 pages.
Non-Final Office Action received for U.S. Appl. No. 18/987,312 dated Apr. 8, 2026, 37 pages.
Extended European Search Report received for European Patent Application Serial No. 25212385.6 dated Mar. 20, 2026, 9 pages.
Extended European Search Report received for European Patent Application Serial No. 25212358.3 dated Mar. 27, 2026, 8 pages.
Extended European Search Report received for European Patent Application Serial No. 25212399.7 dated Mar. 27, 2026, 8 pages.
Final Office Action received for U.S. Appl. No. 18/943,340 dated Sep. 14, 2026, 124 pages.

* cited by examiner

MANAGEMENT OF SIGNAL VERIFICATION AMONGST NODES OF A COMMUNICATION SYSTEM EMPLOYING E2E PROTECTION PROTOCOLS

CROSS REFERENCE TO RELATED APPLICATION

This application claims priority to and is a continuation of U.S. patent application Ser. No. 18/979,776 filed Dec. 13, 2024 and entitled "MANAGEMENT OF SIGNAL VERIFICATION AMONGST NODES OF A COMMUNICATION SYSTEM EMPLOYING E2E PROTECTION PROTOCOLS," which is a continuation-in-part of U.S. patent application Ser. No. 18/943,340 filed Nov. 11, 2024 and entitled "MANAGEMENT OF SIGNAL VERIFICATION AMONGST NODES OF A COMMUNICATION SYSTEM EMPLOYING E2E PROTECTION PROTOCOLS." The entirety of the aforementioned applications is incorporated herein by reference.

TECHNICAL FIELD

The disclosed subject matter relates to end-to-end (E2E) data communication protocols, more particularly, to improved management of data signal verification amongst nodes of a communication system employing E2E protection protocols.

BACKGROUND

The Automotive Open System Architecture (AUTOSAR), is a worldwide development partnership that creates standardized software communication architecture for automotive systems, referred to as AUTOSAR E2E (End-to-End). The purpose of AUTOSAR E2E is to provide data protection mechanisms for safety-critical communication in automotive systems. Since vehicles often rely on complex, networked systems to control critical functions such as braking, steering, and safety features, it's essential that data transferred across these systems is both accurate and secure.

While AUTOSAR E2E is primarily designed for protecting data in communication between Electronic Control Units (ECUs) in automotive systems, its application is not strictly limited to ECUs. The E2E protocols can be used for any safety-critical communication within an automotive system and other systems, especially where data integrity and fault tolerance are essential. For example, E2E protection mechanisms can also be used in communication between sensors (e.g., radar, lidar, ultrasonic) and actuators within the vehicle's control network, ensuring that critical inputs like speed, distance, and object detection data are reliable. In another example, modern vehicles often use gateway modules to connect different communication buses (e.g., a Controller Area Network (CAN), a Local Interconnect Network (LIN), a FlexRay, an Ethernet, etc.). E2E protection helps ensure that data transferred across these networks maintains its integrity, even as it's routed through gateways.

AUTOSAR E2E protocols facilitate creating a more robust and secure communication infrastructure by implementing specific data protection and error-detection techniques. In particular, the E2E protocols adds checks to data to detect if it has been corrupted during transmission. This often includes mechanisms like Cyclic Redundancy Checks (CRCs), which helps ensure the receiving node can verify the integrity of the data received. The E2E protocols also detect common communication errors such as data loss, corruption, or out-of-order messages by adding sequence counters to messages.

Although AUTOSAR E2E protocols are highly beneficial for ensuring reliable and secure communication between communication nodes in automotive systems, they do come with certain challenges and limitations. In particular, E2E protocols involve additional error-checking mechanisms, such as CRC and sequence counters, which increase computational demands in terms of processing power and memory used by the communication nodes. Moreover, in high-speed communications where a large amount of data needs to be verified continuously, E2E mechanisms can significantly increase resource consumption. High resource consumption may require more advanced hardware, which can increase costs, or may reduce available resources for other critical tasks, potentially affecting system performance.

In addition, AUTOSAR E2E uses varying AUTOSAR E2E profiles for different ECUs, which are different configurations of E2E protection mechanisms suited for specific applications. Setting up and calibrating E2E protocols can be complex, as it involves configuring multiple parameters tailored to different E2E profiles, like sequence numbers, counters, timeout values, and CRC lengths, which vary depending on safety and timing requirements. Thus, adding E2E protection mechanisms can make the overall system more complex, both in terms of software architecture and in the ECU interactions, which can increase development time. More complex development processes, testing requirements, and compliance checks might be necessary, which can slow down project timelines and add development costs.

Further, E2E protection mechanisms, especially CRC calculations, can introduce latency, which might impact real-time applications that require fast response times, like braking or collision detection systems. For example, in high-speed or low-latency automotive networks (like in-vehicle Ethernet), these delays can reduce the effectiveness of time-critical applications, posing a challenge to achieving stringent timing requirements.

The above-described background relating to issues associated with AUTOSAR E2E is merely intended to provide a contextual overview of some current issues and is not intended to be exhaustive. Other contextual information may become further apparent upon review of the following detailed description.

SUMMARY

The following presents a summary to provide a basic understanding of one or more embodiments of the disclosed technology. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, devices, computer-implemented methods, apparatuses and/or computer program products are described that facilitate improved management of data signal verification amongst nodes of a communication system employing E2E protection protocols.

As alluded to above, techniques for minimizing resource consumption and other issues associated with systems employing E2E communication protocols are desirable, and various embodiments are described herein to this end and/or other ends.

According to an embodiment, a system is provided that comprises a plurality of nodes respectively connected to one another via a communication framework, a processor, and a memory that stores executable instructions that, when executed by the processor, facilitate performance of operations. The operations comprise intercepting protected data messages sent by one or more sender nodes of the plurality of nodes via the communication framework and directed to one or more receiver nodes of the plurality of nodes, the protected data messages being configured in accordance with a secure communication protocol. The operations further comprise performing a verification process of the secure communication protocol to verify the protected data messages sequentially in time as intercepted over time, extracting data content from respective messages of the protected data messages in response to successful verification of the respective messages, and providing the data content to the one or more receiver nodes via the communication framework.

In some implementations, the protected data messages comprise different types of messages, and wherein performing a verification process comprises performing different instances of the verification process for each type of the different types, the different instances respectively tailored to the different types of messages, and wherein at least some of the different instances of the verification process employ different activation frequencies respectively tailored to the different types of messages.

In various implementations, the providing the data content comprises publishing, via the communication framework, the data content to the memory or another memory of the system with timestamps respectively indicating timing of interception of corresponding messages of the respective messages, wherein the one or more receiver nodes are configured to read the data content from the memory or the other memory via the communication framework. In various implementations, at least one receiver node of the one or more receiver nodes is configured to read the data content associated with a same type of the different types from the memory or the other memory at a different read frequency relative to a corresponding activation frequency of a corresponding instance of the verification process employed for the same type.

In one or more embodiments, wherein the system is integrated on or within a vehicle, wherein the one or more sender nodes comprise electronic control units (ECUs) associated with different onboard systems of the vehicle and wherein the one or more receiver nodes comprise different applications amongst the executable instructions stored in the memory.

According to another embodiment, a system is provided that comprises a plurality of nodes respectively connected to one another via a communication framework, a processor, and a memory that stores executable instructions that, when executed by the processor, facilitate performance of operations. The operations comprise executing a transmission relay process repeatedly at a defined execution frequency to control transmission of protected data messages between sender nodes of the plurality of nodes and respective receiver nodes of the plurality of nodes. The transmission relay process comprises reading data entries published by the sender nodes to a memory of the system, the data entries respectively comprising data content to be sent to the respective receiver nodes, generating the protected data messages respectively comprising the data content, and sending, via the communication framework, the protected data messages to the respective receiver nodes.

In various implementations, the data entries further respectively comprise timestamps and validity thresholds that indicate a duration of time the data content is valid, and wherein the transmission relay process further comprises determining whether the data content is valid based on the validity thresholds and respective time differences between the timestamps and a current time, wherein the sending is responsive to the generating and wherein the generating is responsive to respective determinations that the data content is valid.

In accordance with this system, the data entries are published by the sender nodes to the memory of the system repeatedly in accordance with respective publication frequencies employed by the sender nodes. In some implementations, the respective publication frequencies are different. Additionally, or alternatively, at least some of the respective publication frequencies are different relative to the defined execution frequency. The respective publication frequencies can also vary over time and/or based on a context of the system. In some implementations, the system is integrated on or within a vehicle, and wherein the plurality of nodes comprise electronic control units (ECUs) associated with different onboard systems of the vehicle and different applications executed by the processor of the system. With these implementations, the context of the system can correspond to the context of the vehicle.

In some embodiments, elements described in connection with the disclosed systems can be embodied in different forms such as a computer-implemented method, a computer program product, or another form.

DETAILED DESCRIPTION

Figure 1:
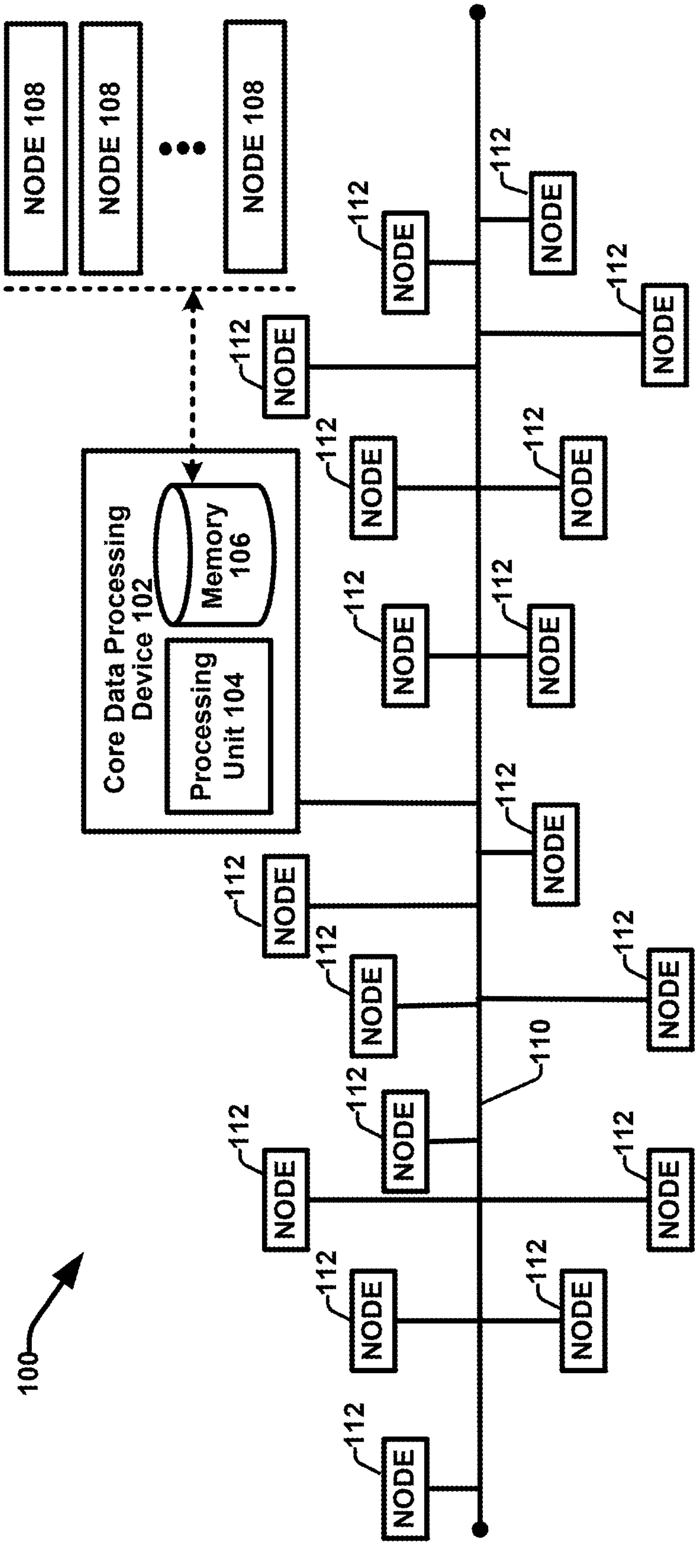
FIG. 1 illustrates a block diagram of an exemplary system that can employ E2E communication protocols with centralized signal verification management, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

As noted in the Background section, AUTOSAR E2E protocols are highly beneficial for ensuring reliable and secure communication between communication nodes in automotive systems, they do come with certain challenges and limitations. In particular, E2E protocols involve additional error-checking mechanisms, such as CRC and sequence counters, to validate that data has reached its destination and that it has not been corrupted during transfer. These added security mechanisms increase computational demands in terms of processing power and memory used by the communication nodes. Moreover, in high-speed communications where a large amount of data needs to be verified continuously, E2E mechanisms can significantly increase resource consumption.

In this regard, in accordance with existing AUTOSAR E2E protocols, the respective nodes of the communication system are configured with E2E protection applications that enable the nodes to send protected data signals and to perform signal verification in association with receiving and reading the protected data signals. The signal verification at the receiver node involves using a counter to detect message corruption, sequence errors, or loss, ensuring that each received message is fresh and arrives in the correct order. More particularly, at the sender node, a counter is embedded in the message payload. This counter increments with each message sent and is included alongside the data and error-detection mechanisms (like CRC). At the receiver node, a stored expected counter value is used for verification. The receiver checks if the counter in the received message matches the expected value. If the counter matches the expected value, the message is considered valid, and the receiver reads or extracts the data content from the message and updates its stored counter value to expect the next incremented value for the next message.

To verify the counter to detect counter errors (loss of data), the receiver will need to wake up at every incoming message, either by an event trigger or in accordance with a defined wake-up frequency that is the same or higher than the frequency at which the incoming messages are sent. In other words, in accordance with existing AUTOSAR E2E protocols, if the sender node is configured to send a particular E2E protected message continuously or regularly at a defined send frequency, the receiver node is configured to wake up at a read frequency that is the same or higher than the defined send frequency to receive and verify the count of the incoming messages. Alternatively, the receiver may be configured to execute at slightly lower frequency relative to the send frequency and accept a few missed messages and thus counter updates. However, the counter has a limit, and the number of missed counter updates allowed is restricted in accordance with the existing AUTOSAR E2E protocols. So, if the receiver is configured to wake up at a lower frequency and accept a few missed signals to down sample the execution of the signal reception and verification at the receiver, it can only do that to a certain limit.

With this architecture, every receiver node of the system is generally configured to wake up and execute signal reception and verification at an execution frequency that is generally controlled by the corresponding send frequency of the E2E protected messages directed to the respective receiver nodes. In high-speed communications where a large amount of data needs to be verified continuously by the receiver nodes at high execution or high wake up frequencies (e.g., every 10 milliseconds or the like), the signal verification processes performed by the receiver nodes significantly increases resource consumption by the receiver nodes in terms of memory usage, power usage, and processing speed.

Another problem with verifying the E2E messages at the end receiver is that the receiver nodes can include or correspond to a core receiver node comprising a memory that stores a plurality of different applications and a central processing unit (CPU) that executes the different applications. In this scenario, with existing AUTOSAR E2E protocols, each application corresponds to a separate receiver node and configured to execute signal verification for respective messages that they are configured to receive in accordance with the corresponding send frequencies and thus wake-up frequencies associated with the respective messages. In these implementations, the CPU must execute each application to perform the wake-up and verification process independently by each application. In scenarios involving a large number of receiver applications (e.g., greater than 10, greater than 50, greater than 100, or more) configured to perform the wake-up and verification process at high frequencies (e.g., every 10-200 milliseconds), this puts a high load on the CPU and can hinder performance of the CPU (e.g., in terms of processing speed, latency) and the system overall.

In this regard, context switching is a process by which a CPU switches from executing one process or thread to another. It allows multiple processes to share the CPU, giving the appearance of simultaneous execution (multitasking) even though most CPUs can only process one task at a time. Although context switching is essential for multitasking, it comes with overhead, including processing time costs attributed to switching between different processes and memory resource consumption costs. In association with existing AUTOSAR E2E protocols, each execution of the verification process of protected messages by different applications executed by the CPU corresponds to a separate process or thread. Accordingly, in scenarios in which the CPU executes multiple different applications and thus multiple separate signal verification processes, the context switching overhead costs can become excessive and negatively impact system performance.

In addition, in many implementations, separate receiver nodes may be configured to receive the same messages yet have different demands in terms of data freshness. In this regard, the E2E protected messages sent to the receiver nodes can include different message types. For example, the different message types can include or correspond to different sender nodes, such as different ECUs of an automotive system. In accordance with this example, messages sent from a first ECU can correspond to a first type of message, messages sent from a second ECU can correspond to a second type of message, and so on. For instance, one message type may correspond to a message sent from an ECU of a braking system of the vehicle that indicates the status of the brakes (e.g., status activated or deactivated). The braking system ECU may be configured to send a status update message for the breaks status at a defined send frequency (e.g., every 10 milliseconds, every 100 milliseconds, or another send rate). In another example, the different message types can correspond to different types of messages sent by the same sender node, such as different messages comprising different types of data content. For instance, the braking system ECU may be configured to send a first type of message that reports the status of the breaks and a second type of message that reports the intensity of the breaking activation.

In this regard, let's assume the vehicle's braking system ECU sends a first type of message indicating the breaking status of the braking system every 10 milliseconds and directs the message to two separate receiving nodes configured to receive and consume the message data content. Let's further assume that the two separate receiving nodes have different demands on the freshness of data content of the brake status. For example, one receiving node may correspond to a beacon motion state application that needs to know very quickly whether the brake pedal is activated or not. Let's say the second receiver node corresponds to an application that performs an action in response to pressing the brake pedal in association with starting the vehicle and pushing a button. This second application may need updated brake pedal status information less frequently than the first, such as every 200 milliseconds. However, as signal verification execution frequency at the receiving node is controlled by the send frequency of the message type in accordance with existing AUTOSAR E2E verification protocols, both applications will need to execute and perform signal verification to extract the message content from the protected messages at the same signal verification execution frequency. In this regard, although the second application would be fine executing signal verification every 200 milliseconds in terms of its demands on data freshness, under existing AUTOSAR E2E protocols, the second application cannot down sample it's execution frequency. In other words, existing AUTOSAR E2E protocols bind the receiver execution frequency to the frequency of at which the messages are sent.

Moreover, in implementations in which the receiver nodes that consume the same messages (e.g., messages of the same type) include different application executed by the same CPU, this would cause the CPU to perform verification for multiple applications for the same message, which significantly and unnecessarily increases resource consumption by the CPU.

With this context in mind, the disclosed subject matter is directed to techniques for minimizing resource consumption and other issues associated with systems employing E2E communication protocols, such as AUTOSAR E2E communication protocols and similar communication protocols. The disclosed techniques can be employed by any system comprising a plurality of nodes respectively connected to one another via a communication framework and configured to communicate data messages in accordance with an E2E communication protocol involving signal verification to verify and extract the data content to be read and consumed at the receiver nodes. In various embodiments, such a system can include automotive systems (i.e., vehicles) employing AUTOSAR E2E communication protocols or similar communication protocols, such as SOME/IP (Scalable Service-Oriented Middleware over Internet Protocol). However, the disclosed techniques are not limited to automotive systems and AUTOSAR E2E communication protocols or similar protocols. For example, the disclosed techniques can also be applied to manufacturing systems, aircraft systems, watercraft systems, sensor networks, medical systems, and various others. The E2E communication protocols can include any communication protocol wherein the sender nodes are configured to send protected data messages directed to one or more receiver nodes over time at relatively high send frequencies (e.g., between every 10 milliseconds and every 60 seconds), wherein the protected data messages must be verified via a verification process in order to extract data content from the protected data messages for consumption by the one or more receiver nodes, and wherein the activation frequency of the verification process is controlled by the corresponding send frequencies.

In one or more embodiments, the disclosed subject matter provides techniques for minimizing resource consumption associated with existing AUTOSAR E2E receiver end signal verification protocols. The disclosed techniques solve the aforementioned issues with such existing AUTOSAR E2E protocols by removing the signal verification from the receiver nodes (e.g., all receiver nodes or a select subset thereof) and integrating a centralized communications management application that performs the signal verification processes for all (or a select subset) of the receiver nodes. The centralized communications manager application intercepts E2E protected messages sent by respective sender nodes of the system via the communication framework and directed to respective receiver nodes of the system. The centralized communications manager application performs the verification process to verify the E2E protected messages as intercepted. This involves verifying the respective messages based on the counters and in some instances performing a CRC check. In some embodiments, the execution frequency of the verification process performed by the centralized communications manager application can be the same for all message types. For example, the centralized manager application can be configured to execute signal verification at a high frequency (e.g., every 10 milliseconds) for all incoming messages regardless of their signal type send frequencies. In other embodiments, the centralized management application can tailor activation of verification process for different message types according to their respective send frequencies. For example, the centralized management application can activate signal verification for messages of a first message type every 10 milliseconds and activate signal verification for signals of a second message type every 50 milliseconds, and so on.

To eliminate or minimize issues associated with context switching, the centralized management application can employ separate software modules or plugins that are tailored to the different message types and configured to perform separate instances of the verification process as tailored to the respective message types (and their respective counters, CRC mechanisms, and the like). In this regard, as opposed to executing separate threads or applications for each signal type verification process, the centralized manager application, a single application, can execute separate software modules or plugins sequentially in time, thus eliminating or minimizing the context switching overhead. In addition, the separate software modules or plugins tailored to different message types are dynamically loaded shared objects that can be efficiently configured and integrated into the centralized management application as needed for the different message types. With this design, the disclosed techniques minimize system complexity in terms of scalability and adding or adjusting E2E protection mechanisms, both in terms of software architecture and in the ECU interactions.

Upon successful verification of a protected data message, in some embodiments, the centralized communications manager application extracts the data content from the protected message and provides the data content along with a timestamp indicating timing or interception of the protected data message to the respective receiver nodes via the communication framework. For example, in some implementations, the centralized manager application can publish the data content to a shared memory of the system along with the timestamp. With these embodiments, the receiver nodes can be configured to read the data content from the share memory at any desired read frequency. In this manner, the disclosed techniques do not bind the receiving nodes to execute signal verification in relation to the message send frequency as with exiting E2E communication protocols. On the contrary, with the disclosed techniques the receiver nodes do not perform the signal verification and merely ready the verified and extracted data content from the shared memory. The read rate employed for each receiver node can thus be tailored as needed for the respective signal types based on the demands of data freshness. In this regard, in association with publishing the data content extracted from messages of a particular signal type, upon successful verification, the centralized management application publishes the data content (only if the data content has changed in some implementations, such as the status of the brake pedal changing from active to inactive from one message to the next) along with the timestamp to the shared memory. The receiver node can access and read the shared memory at any desired read rate and consume the data content as long as the timestamp indicate the data content is fresh enough (e.g., that the data content was updated less than a threshold time difference relative to the current read time).

In some embodiments, the centralized management application can also be configured to notify certain receiver nodes in response to publishing updated data content for a particular signal type that the certain receiver nodes are configured to receive. With these embodiments, the respective receiver nodes can be configured to read the updated content in response to reception of the notification. As an alternative to shared memory, an integrity-protected database, message bus, or any other means of inter-process communication could be utilized, provided the integrity of the extracted data content remains intact.

With this solution, the centralized management application can perform message verification once for the same messages (i.e., messages of the same type) yet consumed by multiple (e.g., two or more) receiver nodes. For example, as applied to multiple receiver nodes that are applications executed by the same CPU, rather than having all receiver nodes individually perform signal verification for the same messages (which can put an unnecessary high load on the CPU), the signal verification can be performed for the same messages by a single, centralized management application for all the relevant receiver nodes, thereby significantly reducing resource consumption by the system attributed to performing separate verification process by the respective receiver nodes yet for the same messages.

In one or more additional embodiments, the disclosed subject matter further provides techniques for improving the transmission side of existing E2E communication protocols such as AUTOSAR E2E and similar protocols. In this regard, while the solution above outlines an efficient method for receiver nodes to verify received E2E protected communication, it does not address improvements in data transmission. One aspect of E2E messaging is timeout detection, which is verified at the receiving node. In accordance with existing AUTOSAR E2E protocols in which sender node is configured to regularly or continuously transmit the same message (e.g., the same type of data content yet with the current property value) to a receiver node over time, the receiver node is configured to apply a fixed timer to detect a timeout corresponding to a failure to receive an expected message within a defined timeframe. This fixed timer is set based on the transmission frequency of the message by the sender node. Thus, in accordance with existing AUTOSAR E2E communication protocols, the transmission frequency used by the sender node for a particular type of signal cannot be varied.

The frequency of the transmitted signal may be linked to safety requirements, user experience, or a combination of both. For example, as applied to communication amongst applications of an automotive system and a transmitted signal identifying the status of the child safety lock mechanism of the vehicle (e.g., which may be either active or inactive), a high signal frequency can be necessary to minimize latency when specific events occur, however a lower frequency signal may be suitable in other contexts of the vehicle. However, because the timeout timer employed by the receiver node is fixed, this requires the sending node to send the signal at fixed frequency, which must be set to the highest transmission frequency needed for the most critical scenarios. Thus, existing AUTOSAR E2E protocols do not enable the sender node to down-sample its transmission frequency, and thus its resource consumption, in contexts in which higher latency is appropriate.

To resolve this issue, in one or more additional embodiments, the aforementioned centralized communications manager application can additionally, or alternatively, perform a transmission relay process to control transmission of protected data messages between the sender nodes and the receiver nodes. The transmission relay process enables the sender nodes to dynamically tailor (i.e., increase, decrease, or maintain) the frequencies at which they communicate their information to the receiver nodes. In other words, a sender node can vary it's execution frequency, (which correspond to the frequency at which the sender node generates, obtains or otherwise reports out the information), independent of the fixed signal transmission frequency expected at the receiver node while still ensuring E2E protection and usage of the fixed timeout timer. As a result, the sender node execution frequency can be decreased under contexts in which higher latency is acceptable, thereby decreasing consumption of resources. In addition, the sender node execution frequency can be fully or even partially event driven.

In various embodiments, the transmission relay process performed by the centralized communications manager application removes the transmission of the protected data signals from the sender nodes and places control of the transmission at the communications manager application on behalf of all (or a select subset) of the sender nodes and/or types of the protected messages. The term "transmission" as used in this context refers to sending, communicating or otherwise providing a signal to one or more receiver nodes and can involve any type of wired or wireless communication technology. In accordance with these embodiments, as opposed to generating and sending the protected data messages, the sender nodes are configured to publish the data content (i.e., the payload) to be sent in the protected data messages to a centralized memory (e.g., a shared memory or the like) of the system accessible to the management application. In other words, rather than sending a protected data signal at a fixed transmission frequency to one or more receiver nodes, the sender node can be configured to publish the data content (e.g., the current/updated property value) to the centralized memory, wherein the publication frequency can be event driven, vary over time, and/or vary based on the context of the system. For instance, in furtherance to the child safety lock mechanism example above, the publication frequency of the signal information (also referred to as the data content), that is the current status of the locking mechanism (e.g., either active or inactive), may be event driven (e.g., based only on detection of a change in status), fixed (e.g., set to a high frequency such as every 10 milliseconds), vary over time, and/or vary based on the context of the vehicle. To this end, the publication frequency corresponds to the execution frequency of the sender node.

The management application further performs the transmission relay process which is executed repeatedly at a defined execution frequency for all (or a select subset) of sender nodes. In various embodiments, the transmission relay process comprises reading the data content from the memory, generating a protected data message comprising the data content, and sending the protected data message to the one or more receiver nodes on behalf of the sender node. In other words, the centralized management application operates as a relay that relays information from a sender node to one or more receiver nodes in a protected format (e.g., with an E2E header and added protection such as a counter, a CRC, encoding, or the like). The execution frequency at which the management application performs the transmission relay process for a particular type of protected data message (e.g., corresponding to the same type of data content and/or sender node) can be fixed in accordance with the corresponding timeout timer employed by the one or more receiver nodes. For example, the execution frequency can be higher than the corresponding publication frequency (e.g., which corresponds to an up sampling of the publication frequency). In these scenarios, the data content read from the shared memory and included in some consecutive messages will remain the same despite not being updated in the shared memory by the sender node. In other implementations, the execution frequency of the transmission relay process can be the same or lower than the corresponding publication frequency (e.g., which corresponds to a down sampling of the publication frequency).

In some embodiments, in association with publishing the data content to be sent to one or more receiver nodes to the shared memory, the sender nodes can be configured to publish a timestamp with the data content that represents the time at which the data content was determined by, generated by or otherwise collected by the sender node. Alternatively, the timestamp can represent the timing of publication of the data content to the shared memory. In addition, the sender node can apply a validity threshold to the data content that represents the duration of time the data content is valid. With these embodiments, the transmission relay process can further involve verifying the validity of the data content prior to sending it in a protected message. In other words, the centralized management application can be configured to only send the data content in a protected data message if it is valid. To this end, the transmission relay process also involves a form of signal verification management, yet performed prior to generation of the protected data messages.

In this regard, at each repetition of the transmission relay process performed for a particular type of protected data message, the centralized management application reads the data content, the timestamp and the validity threshold from the shared memory. The management application determines whether the data content is valid based on whether the time difference between the current time (e.g., the read time) and the timestamp satisfies the validity threshold. The management application further generates and sends the data content in a protected data message to the corresponding receiver node or receiver nodes in response to a determination that the data content is valid and forgoes generating and sending the protected data message in response to a determination that the data content is invalid. In this manner, the receiver nodes can proceed with detecting timeout events in accordance with their fixed timeout timers, which would reflect an error with the data content being too old as included in the shared memory. In some implementations of these embodiments, the sender nodes can tailor (e.g., adjust, increase or decrease, etc.) the validity thresholds based on their needs (e.g., different sender nodes and/or different types of protected data messages can employ different validity thresholds). In addition, a sender node can vary its validity threshold over time and/or as needed based on the context of the system (e.g., a context of the vehicle in implementation involving vehicles).

In various embodiments, the centralized management application can perform different instances of the transmission relay process tailored to different types of protected data messages. For example, in a same or similar matter described above with respect to the receiver signal verification, the centralized management application can employ separate software modules or plugins that are tailored to the different message types and configured to perform separate instances of the transmission relay process as tailored to the respective message types (and their respective counters, CRC mechanisms, and the like). In this regard, as opposed to executing separate threads or applications for each signal type transmission process, the centralized manager application, a single application, can execute separate software modules or plugins sequentially in time in association with performing signal transmission for all (or a select subset) of sender nodes and/or signal types, thus eliminating or minimizing the corresponding context switching overhead. In some embodiments, the same software modules or plugins can perform both the receiver signal verification and the transmission relay processes described herein. In other words, the same execution path may handle both transmission and reception of signals along the same execution path, ensuring efficient processing. In addition, the separate software modules or plugins tailored to different message types are dynamically loaded shared objects that can be efficiently configured and integrated into the centralized management application as needed for the different message types. With this design, the disclosed techniques minimize system complexity in terms of scalability and adding or adjusting E2E protection mechanisms, both in terms of software architecture and in the ECU interactions.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being “coupled” to another element (and/or “connected” to another element or variations thereof), it can describe one or more different types of coupling including, but not limited to, chemical coupling, communicative coupling, capacitive coupling, electrical coupling, electromagnetic coupling, inductive coupling, operative coupling, conductive coupling, acoustic coupling, ultrasound coupling, optical coupling, physical coupling, thermal coupling, and/or another type of coupling. As referenced herein, an “entity” can comprise a human, a client, a user, a computing device, a software application, an agent, a machine learning model, an artificial intelligence, and/or another entity. It should be appreciated that such an entity can facilitate implementation of the subject disclosure in accordance with one or more embodiments described herein.

Turning now to the drawings, FIG. 1 illustrates a block diagram of an exemplary system 100 that can employ E2E communication protocols with centralized signal verification management, in accordance with one or more embodiments described herein. System 100 comprises a core data processing device 102 and a plurality of (e.g., nodes 112 and nodes 108) respectively connected to one another via a communication framework 110. The number of nodes 112 and nodes 108 can vary. The core data processing device 102 comprises at least one memory 106 that stores computer-executable components and at least one processor or processing unit 110 that executes the computer-executable components stored in memory 106 to carry out the operations/functions described with respect to the corresponding computer-executable components. The computer-executable components can include a plurality of nodes 108 that respectively correspond to software applications or modules that are executed by the processing unit 104. The nodes 108 hosted by the core data processing device 102 and the nodes 112 can respectively correspond to entities configured to send and/or receive protected data messages from one another in accordance with a secure communication protocol. In this regard, in some implementations, one or more of the nodes 112 and/or nodes 108 can include or correspond to sender nodes, while in other implementations, one or more of the nodes 112 and/or nodes 108 can correspond to receiver nodes.

Figure 3:
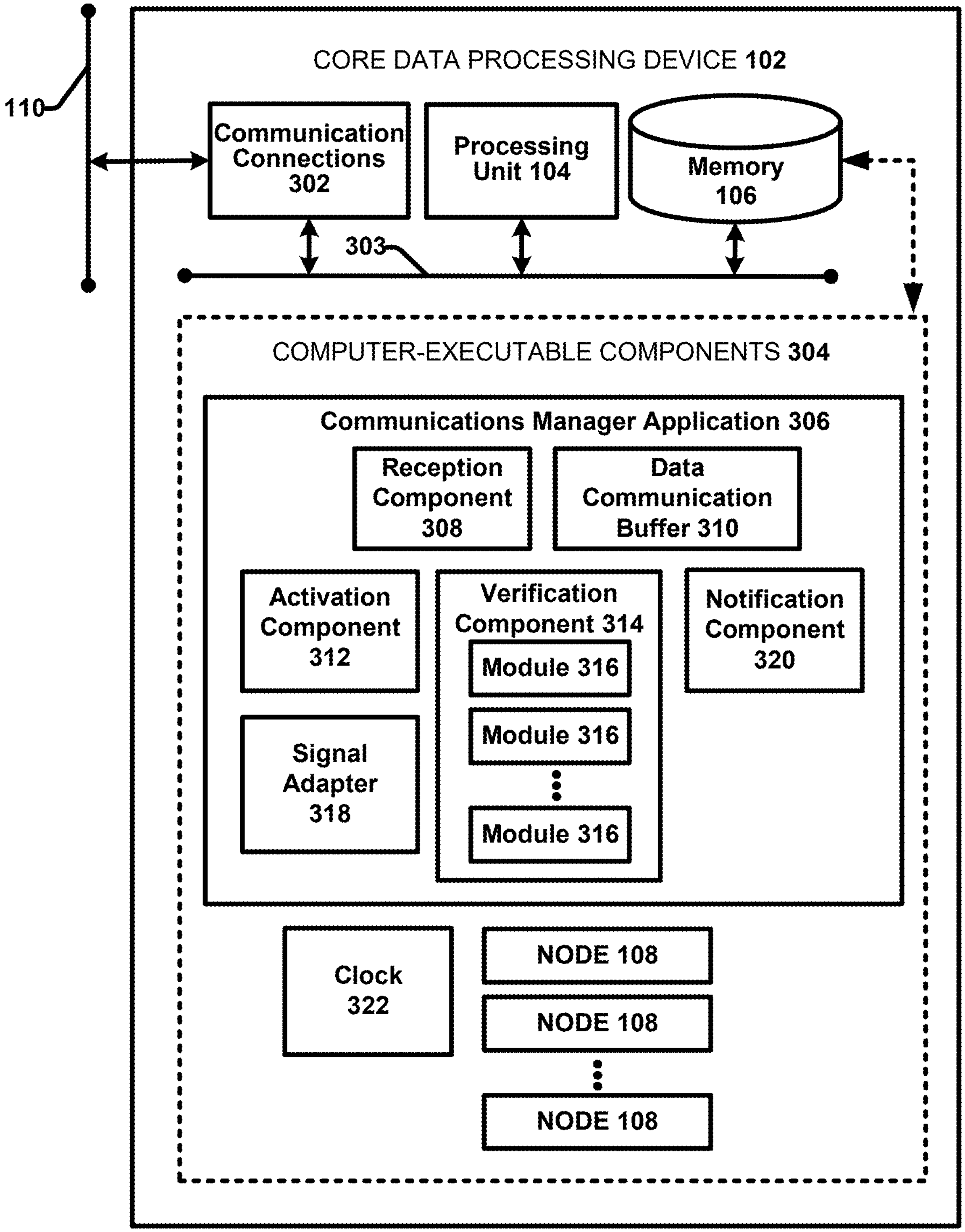
FIG. 3 illustrates an example data processing device that facilitates centralized signal verification management, in accordance with one or more embodiments described herein.

The computer-executable components stored in memory 106 can also include a communications manager application (e.g., communications manager application 308, as shown in FIG. 3 or communications manager application 1100 shown in FIG. 10) that performs centralized signal verification for all or some protected data messages sent by one or more sender nodes of the system 100 (e.g., one or more nodes 112 and/or nodes 108) and directed to one or more receiver nodes (e.g., one or more nodes 112 and/or nodes 108) of the system 100. Examples of said memory 106, processing unit 104, and other computer system components that can be included in the core data processing device 102 to facilitate the various features and functionalities of system 100 can be found with reference to FIG. 19 (e.g., system memory 1906, processing unit 1904, and the like).

System 100 can correspond to any system comprising a plurality of nodes (e.g., nodes 112 and/or nodes 108) connected to one another via a communication framework 110 and configured to communicate data messages in accordance with a secure communication protocol. The communication framework 110 can include any suitable wired and/or wireless communication framework. The secure communication protocol can include any communication protocol wherein the sender nodes are configured to send protected data messages directed to one or more receiver nodes over time at relatively high send frequencies (e.g., between every 10 milliseconds and every 60 seconds), wherein the protected data messages must be verified via a verification process in order to extract data content from the protected data messages for consumption by the one or more receiver nodes, and wherein the activation frequency of the verification process is controlled by the corresponding send frequencies. In various embodiments, such a system can include or correspond to an automotive system employing AUTOSAR E2E communication protocols or similar communication protocols.

Figure 2:
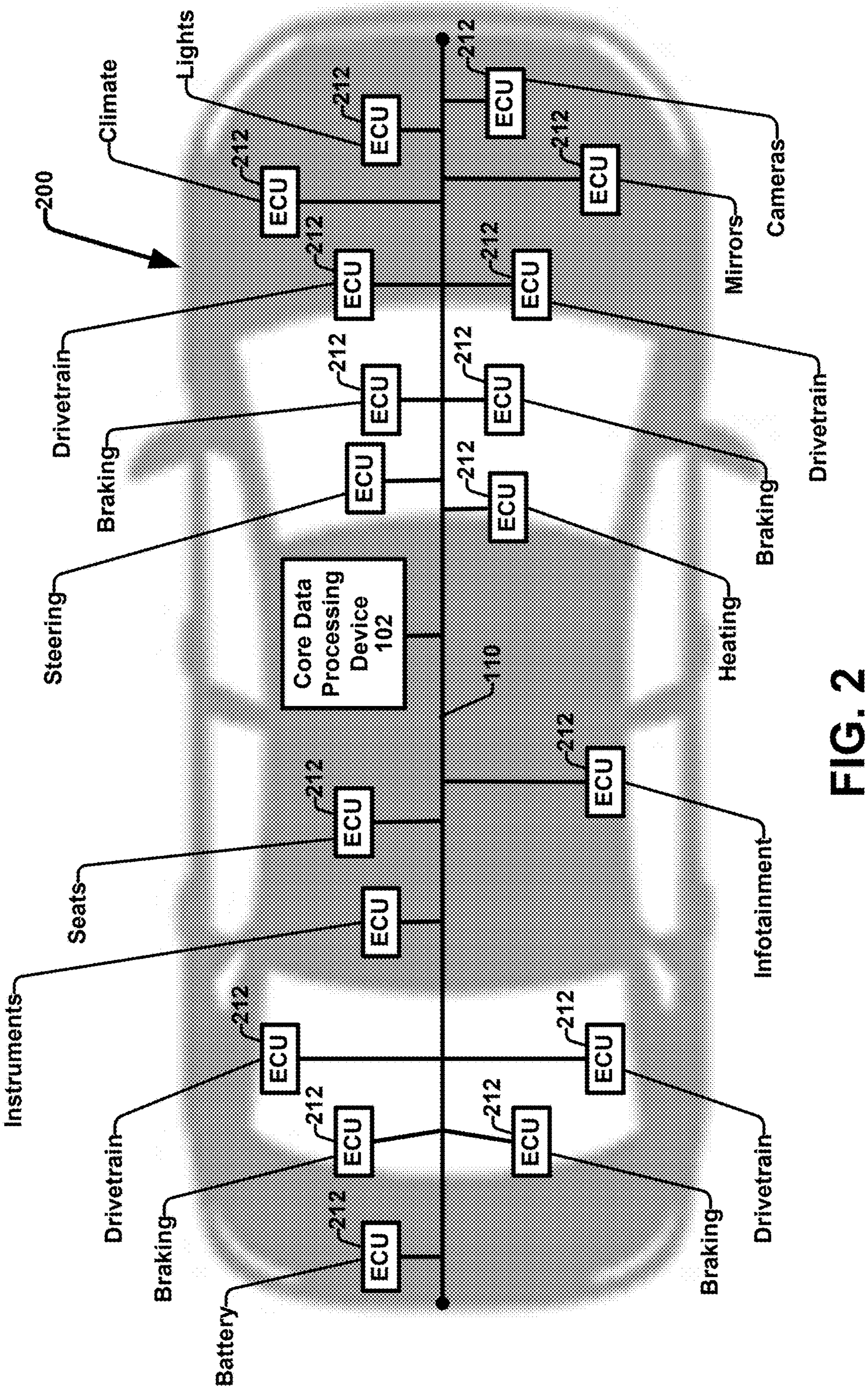
FIG. 2 illustrates an example automotive system that can employ E2E communication protocols with centralized signal verification management, in accordance with one or more embodiments described herein.

For example, FIG. 2 illustrates an example implementation of system 100 as integrated on or within a vehicle 200. As illustrated in FIG. 2, elements of the core data processing device 102 are removed merely for ease of illustration. With reference to FIGS. 1 and 2, as illustrated in FIG. 2, the nodes 112 of system 100 correspond to ECUs 212 of different onboard systems of the vehicle 200 (e.g., a battery system, braking system, drivetrain systems, instruments, steering systems, heating systems, climate systems, mirrors, cameras, lights, etc.). The different ECUs manage various vehicle functions, and a modern car can have over 70 ECUs handling diverse operations. In some implementations of these embodiments, nodes 108 can correspond to different applications configured to consume information sent by one or more of the ECUs and/or by other applications of amongst the applications. For example, nodes 108 can include a first application configured to consume protected data messages sent by a braking system ECU reporting the status of the breaks of the vehicle 200. In another example, nodes 108 can include a second application configured to consume protected data messages sent by the braking system ECU as well as protected data messages from the steering system ECU reporting steering system information. The number of different applications corresponding to nodes 108 can vary and include any number. It should also be appreciated that system 100 supports bi-directional communication between two or more nodes 108, between two or more nodes 112, and between nodes 112 and nodes 108.

However, as integrated on within a vehicle 200, the nodes 112 of system 100 are not limited to ECUs and can include or correspond to hardware and/or software entities configured to communicate protected data messages between one another and/or nodes 108 via the communication framework 110 in accordance with the secure communication protocol. In this regard, while AUTOSAR E2E is primarily designed for protecting data in communication between ECUs in automotive systems, its application is not strictly limited to ECUs. The E2E protocols can be used for any safety-critical communication within an automotive system and other systems, especially where data integrity and fault tolerance are essential. For example, E2E protection mechanisms can also be used in communication between sensors (e.g., radar, lidar, ultrasonic) and actuators within the vehicle's control network, ensuring that critical inputs like speed, distance, and object detection data are reliable. In this regard, as integrated on or within a vehicle 200, the nodes 112 of system 100 can include or correspond to sensors and actuators.

In addition, in some embodiments, one or more of the nodes 112 can include a plurality (e.g., two or more) sub-nodes that can also respectively correspond to separate sender and/or receiver nodes. For example, the sub-nodes can correspond to different applications executed by a node 112, different hardware components, and/or different software components controlled by the node 112. For instance, in various embodiments, the core data processing device 102 can correspond to a node 112 and/or one or more of the nodes 112 can correspond to same or similar instances of the core data processing device 102 (e.g., hosting a plurality of different nodes 108).

In various implementations in which system 100 is integrated on or within a vehicle 100, the communication framework 110 may include various in-vehicle networks, such as a CAN, a LIN, FlexRay, an Ethernet, or the like. E2E protection helps ensure that data transferred across these networks maintains its integrity, even as it's routed through gateways. In this regard, it should be appreciated that the communication framework 110 can include various gateways and modules and different communication buses to connect the nodes 112, the core processing device 102 and the nodes 108 to one another. The communication framework 110 may also include other types of wired and/or wireless communication frameworks.

In addition, the disclosed techniques are not limited to automotive systems and AUTOSAR E2E communication protocols. For example, the disclosed techniques can also be applied to manufacturing systems, aircraft systems, watercraft systems, sensor networks, medical systems comprising a system similar to system 100. In this regard, the disclosed techniques are particularly applicable to system comprising a plurality of nodes configured to send data protected messages to other nodes via a communication framework 110 at relatively high send rates (e.g., every 10 milliseconds to every 60 seconds or another rate) that needs to be verified continuously at the receiving end in order to extract and consume the data content from the protected data messages. For example, as applied to system 100 integrated on or within a vehicle 200, an example implementation of system 100 may involve a large number of ECUs 212 (e.g., 20 to about 100 ECUs or more) configured to send protected data messages to each other and/or nodes 108 regularly or continuously over time at varying send rates ranging from every 10 milliseconds to every 60 seconds or longer. The particular rate at which the respective protected data messages are sent can vary for different types of protected messages. In this regard, the disclosed techniques are applicable to implementations of system 100 wherein respective sender nodes of the system 100 are configured to repeatedly or continuously send the same type of message to one or more receiver nodes.

In this regard, the protected messages sent to the receiver nodes of system 100 can include different message types. For example, the different message types can include or correspond to different sender nodes, such as different ECUs 212 of an automotive system and/or different applications hosted by the same node (e.g., corresponding to different nodes 108 hosted by data processing device 102). In accordance with this example, messages sent from a first ECU can correspond to a first type of message, messages sent from a second ECU can correspond to a second type of message, and so on. For instance, one message type may correspond to a message sent from an ECU of a braking system of the vehicle that indicates the status of the brakes (e.g., status activated or deactivated). The braking system ECU may be configured to repeatedly send a status update message for the breaks status at a defined send frequency (e.g., every 10 milliseconds, every 100 milliseconds, or another send rate). In another example, the different message types can correspond to different messages comprising different types of data content. For instance, the braking system ECU may be configured to repeatedly send a first type of message that reports the status of the breaks and a second type of message that reports the intensity of the breaking activation. In other words, messages of the same type can include messages that report the same type of data content or same property (e.g., a status update for the brakes), yet the value of the property can change over time and from one message to another. Yet in other words, protected messages of the same type that are repeatedly sent by a sender node can respectively comprise updated versions of the same data content. The type of protected data message sent by respective sender nodes of the system can be indicated via a unique identifier (ID) included in the protected data message (e.g., in the message header or the like). In accordance with various embodiments of the disclosed techniques, protected data messages of the same type are counted together and sequentially via counters embedded by the sender node.

FIG. 3 illustrates an example core data processing device 102 that facilitates centralized signal verification management, in accordance with one or more embodiments described herein. Repetitive description of like elements employed in respective embodiments is omitted for sake of brevity.

With reference to FIGS. 1-3, as noted above, the core data processing device 102 can include at least one memory 106 that stores computer-executable component 304 and at least one processing unit 104 (e.g., a CPU or the like), that executes the computer-executable components 304 stored in the memory 106. The data processing device 106 can also include communication connections 302. Communication connections 302 refers to the hardware and software employed to connect the data processing device 106 to external systems and devices (e.g., nodes 112) via communication framework 110. Any suitable secure wired and/or wireless technology with E2E protection can be utilized by the communication connections 302 to enable communication of information between the core data processing device 102 and external systems and devices. The core data processing device 102 can also include a system bus 303 that connects the communication connections 302, the processing unit 104 and the memory 106 to one another. In this regard, the communication framework 110 can include or otherwise encompass the system bus 303.

In various embodiments, the computer-executable components 304 can include (but are not limited to) communications manager application 306, clock 322, and a plurality of nodes 108 respectively corresponding to different applications executed by the processing unit 106. As noted above, in some implementations, nodes 108 can correspond to different receiver nodes configured to receive protected data messages sent via one or more sender nodes via the communication framework 110 (including system bus 303) in accordance with a secure communication protocol, wherein the one or more sender nodes can include nodes 112 (or sub-nodes thereof) and/or other nodes 108 (e.g., other applications). The different nodes 108 can also correspond to sender nodes configured to send protected data messages to one or more receiver nodes via the communication framework 110 (including system bus 303) in accordance with the secure communication protocol, wherein the one or more receiver nodes can include nodes 112 (or sub-nodes thereof) and/or other nodes 108.

The secure communication protocol can include any communication protocol wherein the sender nodes are configured to send protected data messages directed to one or more receiver nodes over time at relatively high send frequencies (e.g., between every 10 milliseconds and every 60 seconds), wherein the protected data messages must be verified via a verification process in order to extract data content from the protected data messages for consumption by the one or more receiver nodes, and wherein the activation frequency of the verification process is controlled by the corresponding send frequencies. The communication framework 110 can include any suitable wired and/or wireless communication framework. In this regard, the term "protected data message" is used herein to refer to a data message that has been configured with one or more data protection mechanism that require a verification process to be performed on the receiving end in order to extract and read the data content included in the protected data message. For example, in some embodiments, the secure communication protocol can include AUTOSAR E2E or a similar protocol. With these embodiments, the one or more protection mechanisms can include counters that are embedded in the protected messages and used at the receiver end to verify whether the protected messages are valid.

In this regard, in AUTOSAR E2E and similar E2E protection protocols, counters are used to ensure data freshness and to detect issues such as message loss, duplication, or out-of-sequence messages. This is essential for maintaining data integrity across a vehicle's communication network, especially in safety-critical applications. When using counter-based protection, each protected message of the same type that is sent between nodes 112 and/or nodes 108 includes a counter value that is incremented each time a new message of that type is generated. In other words, messages of the same type are counted together and sequentially via counters embedded by the sender node. In accordance with conventional AUTOSAR E2E protocols, the counter's value is checked by the receiving node to validate the message order and freshness. The one or more protection mechanism can also include CRC checks, and/or other types of protection mechanism (e.g., encryption and the like).

The communications manager application 306 corresponds to centralized communications management application that performs the signal verification processes for all (or a select subset) of the receiver nodes of system 100. To facilitate this end, the communications manager application 306 can include reception component 308, data communication buffer 310, activation component 312, verification component 314, signal adapter 318 and notification component 320.

In accordance with the disclosed techniques, the reception component 308 intercepts or otherwise receives protected data messages sent over time by respective sender nodes of the system 100 via the communication framework 110 and directed to respective receiver nodes of the system 100 and temporarily stores the received protected data messages in a data communication buffer 310. In an example implementation of system 100, this can involve a plurality of different sender nodes regularly or continuously sending protected data messages to one or more receiver nodes over time at varying send rates ranging from every 10 milliseconds to every 60 seconds or more. For instance, as applied to system 100 integrated on or within a vehicle 200, each ECU of the plurality of ECUs 212 may be configured to repeatedly send protected data messages (e.g., a status update message, or the like) to one or more receiver nodes over time, wherein the messages sent by different ECUs correspond to different types of messages and wherein messages repeatedly sent by the same ECU correspond to the same type of messages. In another example, a same ECU of the plurality of ECUs may be configured to repeatedly send different types of messages, wherein the send rate of the different types of messages can vary. With this example, the type of data content included in the different messages can vary.

In some embodiments, in response to reception of the protected data messages, the reception component 308 can be configured to check the clock 322 and generate timestamps for the respective messages indicating timing of reception of the respective messages by the reception component 308. The messages are stored in the data communication buffer 310 in sequential order as a function of their timestamps and verified sequentially in time over time.

The verification component 314 performs a verification process to verify the protected messages as intercepted. This involves accessing the protected data messages as stored in the data communication buffer 310 (e.g., via signal adapter 318) and verifying the respective messages based on the counters and in some instances performing a CRC check. Additional details regarding the verification process are described below. To facilitate this end, the activation component 312 can be configured to direct the verification component 314 to activate the verification process according to a defined activation frequency. For example, in some implementations, the defined activation frequency can be set to a high frequency (e.g., every 10 milliseconds), or another frequency tailored to the system 100. In some embodiments, the execution frequency of the verification process performed by the verification component 314 can be tailored to different message types and their corresponding send frequencies. In other embodiments, the execution frequency of the verification process performed by the verification component 314 can be the same for different message types regardless of their varying send frequencies.

In this regard, in accordance with the existing AUTOSAR E2E protocols, the send frequencies of the protected data messages are generally predefined for each of the different message types and can vary, wherein the send frequencies control the execution frequency employed by the receiver nodes to wake up and verify the corresponding messages. On the contrary, in accordance with some embodiments of the disclosed techniques, rather than having the receiver nodes individually perform the signal verification process, the verification component 314 can perform the verification process on behalf of all (or as select subset) of the receiver nodes and/or message types. In some embodiments, in which the different message types are tied to different verification execution frequencies and/or different send frequencies, the activation component 312 can direct the verification component 314 to execute different instances of the verification process for the different types of messages in accordance with their different verification execution frequencies. For example, the activation component 312 may direct the verification component 314 to execute a first instance of the verification process at a first execution frequency (e.g., every 10 milliseconds) for validating a protected data messages of a first type and direct the verification component 314 to execute a second instance of the verification process at a second execution frequency (e.g., every 100 milliseconds) for validating a protected data messages of a second type. It should be appreciated that the number of different types of messages can vary and include any number of different types (e.g., a few different types, 50 different types, hundreds of different types, etc.).

In other embodiments in which the different message types are tied to different verification execution frequencies and/or different send frequencies, the activation component 312 can direct the verification component 314 to execute different instances of the verification process for the different types of messages in accordance with the same verification execution frequencies. For example, the verification component 314 can be configured to execute the verification process for all incoming signals at the highest execution frequency (e.g., every 10 milliseconds) and thus be able to verify every incoming message including a counter.

In some embodiments, the verification component 314 can employ separate software modules 316 that are tailored to the different message types and configured to perform separate instances of the verification process as tailored to the respective message types. For example, the modules 316 can respectively correspond to different modules respectively configured to handle protected data message verification for different message types. For instance, in implementations in which the different types of messages correspond to messages sent from different sender nodes, modules 316 can include or correspond to a separate module for each of the different sender nodes. Additionally, or alternatively, the different types of messages can correspond to messages reporting different types of data content. The number of different modules 316 can vary and account for any number of different types of messages. As noted above, protected messages of the same type are counted together and sequentially. Thus, the protected messages verified by a particular module of the different modules 316 will be of the same type and thus can be verified based on the respective counters applied to the messages being valid sequentially over time.

In this regard, as opposed to executing separate threads or applications for each instance of the verification process, a single application (i.e., the communications manager application 306) can execute separate software modules 316 sequentially in time, thus eliminating or minimizing the context switching overhead attributed to switching (e.g., by the processing unit 104) between executing different applications. For example, in some embodiments, the respective modules 316 can include or correspond to plugins. A plugin is a software component that adds specific functionality to an existing application or platform, which in this case corresponds to the communications manager application 306. Plugins allow users to customize and extend the capabilities of a host application without altering its core functionality. Unlike a standalone application, a plugin cannot function on its own; it must work within the context of a host application. In addition, the separate software modules 316 tailored to different message types are dynamically loaded shared objects that can be efficiently configured and integrated into the communications manager application 306 as needed for different signal types and verification process demands. With this design, the disclosed techniques minimize system complexity in terms of scalability and adding/adjusting E2E protection mechanisms, both in terms of software architecture and in the ECU interactions.

In some embodiments, the different instances of the verification process performed by the respective modules 316 for different types of protected data messages can differ with respect to the counters evaluated, the number of missed messages allowed, the CRC mechanisms, the error correction and response mechanism involved, and the like. In this regard, the frequency at which respective protected data messages are repeatedly sent by a sender node and the data protection mechanisms applied (e.g., with respect to counters applied, number of missed messages allowed, the CRC mechanism used, and so on) can vary depending on the type of the protected data messages. Some types of messages may be more critical than others and require more robust protection mechanisms (and thus different verification protocols) to ensure data integrity. For example, AUTOSAR E2E provides several standardized E2E profiles, each designed for different types of communication scenarios based on requirements like data criticality, network load, and processing resources. The different profiles vary in terms of data protection mechanisms used, counters, and error handling mechanisms. For example, common AUTOSAR E2E profiles include Profile 1, designed for basic error detection and is suitable for non-critical data where only a basic level of error detection is needed. Profile 1 provides a simple level of error detection with minimal overhead and an 8-bit CRC for error detection. In comparison, Profile 4 is designed for high integrity protection for very critical data, such as Advance Driver Assistance Systems (ADAS) or other highly safety-critical applications and features a 24-bit CRC and a freshness counter. Thus, in some embodiments, the different types of data messages can be associated with different AUTOSAR E2E profiles and thus different data protection mechanisms. With these embodiments, the respective modules 316 can be configured to apply the corresponding verification protocols for the different data protection mechanism applicable to the particular type of protected data messages they are configured to process.

In response to successful verification of a protected data message, in some embodiments, the verification component 314 (and/or the corresponding module 316 applied for the type of the protected data message) extracts or reads the data content from the protected message and provides the data content along with a timestamp to the respective receiver nodes via the communication framework 110. In this regard, the verification component 314 can forgo reading the data content and providing the data content to the receiver nodes in response to unsuccessful verification. The extracted data content upon successful verification can include or correspond to the information that is included in the protected data message that is protected and otherwise cannot be safely read or extracted prior to the verification process performed by the verification component 314. For example, although all received messages of the same type may include the same type of data content, such as a status value or state value indicating the state or status of a vehicle's system (e.g., battery system, braking system, etc.), the actual data content, that is the actual status value or state value, cannot be extracted from a protected data message until successful verification by the verification component 314. In accordance with this example, the extracted data content would include the actual status or state value.

In some embodiments, the timestamp can indicate timing of interception of the protected data message by the reception component 308 (e.g., as determined by the verification component 314 via checking the clock 322 at the time of interception of the protected data message). The timestamp can thus indicate the time at which the protected data message was went by the sender node. In other implementations, the timestamp can correspond to the timing of successful verification of the protected data message (as determined by the verification component 314 via checking the clock 322 at the time of successful verification of the protected data message).

The mechanism via which the verification component 314 (and/or the corresponding module 316) provides the extracted data content and the timestamp to the one or more receiver nodes via the communication framework 106 can vary so long as the verification component 314 (and/or the corresponding module 316) has an integrity protected way to communicate the extracted data content to the receiver nodes, such as a safe shared memory, so that the integrity of the data and timestamp set by the communications manager application 306 (e.g., via verification component 314) can be guaranteed to be correct. For example, in some embodiments, the verification component 314 (and/or the corresponding module 316 applied for the type of the protected data message) can publish the data content to the memory 106, a shared portion of the memory 106, or another memory device accessible to the receiver nodes via the communication framework. In this regard, because the data content has been extracted from the protected data message in response to successful verification, the data content is published to the shared memory in a deprotected format (i.e., a safely readable form). With these embodiments, the receiver nodes can be configured to read the data content as extracted and published to memory 106, the shared portion of the memory 106, or the like in the deprotected format at any desired read execution frequency. For example, one or more of the receiver nodes can be configured to consume the extracted data content can execute read operations at lower frequency relative to the execution frequency employed by the verification component 314 (and/or the corresponding module 316 applied for the type of the protected data message) and suitable for the function they realize.

By reading the timestamp of the published data content, the receiver nodes can verify if the data is fresh enough or handle the situation if the data is too old. For example, the receiver nodes can be configured to compare the timestamps to the current time and employ a time difference threshold (e.g., a freshness criterion) for the data content to determine whether the data content satisfies the time difference threshold. The receiver nodes can be configured to consume the data content based on the time difference satisfying the time distance threshold.

In this manner, the disclosed techniques do not bind the receiving nodes to execute message verification in relation to the message type send frequency as with exiting E2E communication protocols. On the contrary, with the disclosed techniques, the receiver nodes do not perform the message verification and merely read the verified and extracted data content from the memory 106 (or a shared portion of the memory, another memory device, or the like). The read frequency employed for each receiver node can thus be tailored as needed for the respective message types based on the demands of data freshness. Importantly, this allows some or all of the receiver nodes to employ a lower read frequency relative to the execution frequency employed by the verification component 314 to verify the incoming protected data messages which they are configured to receive, thus significantly reducing computational resources used by the receiver nodes in comparison to exiting implementations of AUTOSAR E2E protocols wherein the receiver nodes need to wake up at a frequency equal to or higher than send frequency of the incoming messages. In this regard, the receiver node can access and read the memory at any desired read rate and consume the data content as long as the timestamp indicates the data content is fresh enough (e.g., that the data content was updated less than a threshold time difference relative to the current read time).

In some embodiments, in association with publishing the extracted data content, the verification component 314 (or the respective modules 316) can be configured to only publish the extracted data content if the actual data content changes from one message to the next for messages of the same type. For example, as applied to the data content corresponding to a state or status value, a property value or the like, the verification component 314 (or the respective modules 316) can be configured to compare a currently extracted value to the most recently published value for a particular message type. The verification component 314 (or the respective modules 316) can further be configured to publish the currently extracted value based on the current value changing from the previous published value. In other words, the verification component 314 can be configured to update the data content entry in the shared memory for respective types of data messages based on changes to the data content reflected in the received messages over time.

In some embodiments, the notification component 320 (or alternatively the verification component 314 and/or the respective modules 316) can be configured to notify certain receiver nodes in response to publishing updated data content for a particular message type that the certain receiver nodes are configured to receive. For example, the notification component 320 can send a notification to the applicable receiver nodes to which the protected messages are directed indicating that updated data content has been received and published. With these embodiments, the respective receiver nodes can be configured to read the updated data content from memory 106 (or a shared portion of the memory, another memory or the like) in response to reception of the notification. As an alternative to the memory 106, an integrity-protected database, message bus, or any other means of inter-process communication could be utilized for providing the extracted data content to the receiver nodes, provided the integrity of the extracted data content remains intact.

Figure 4:
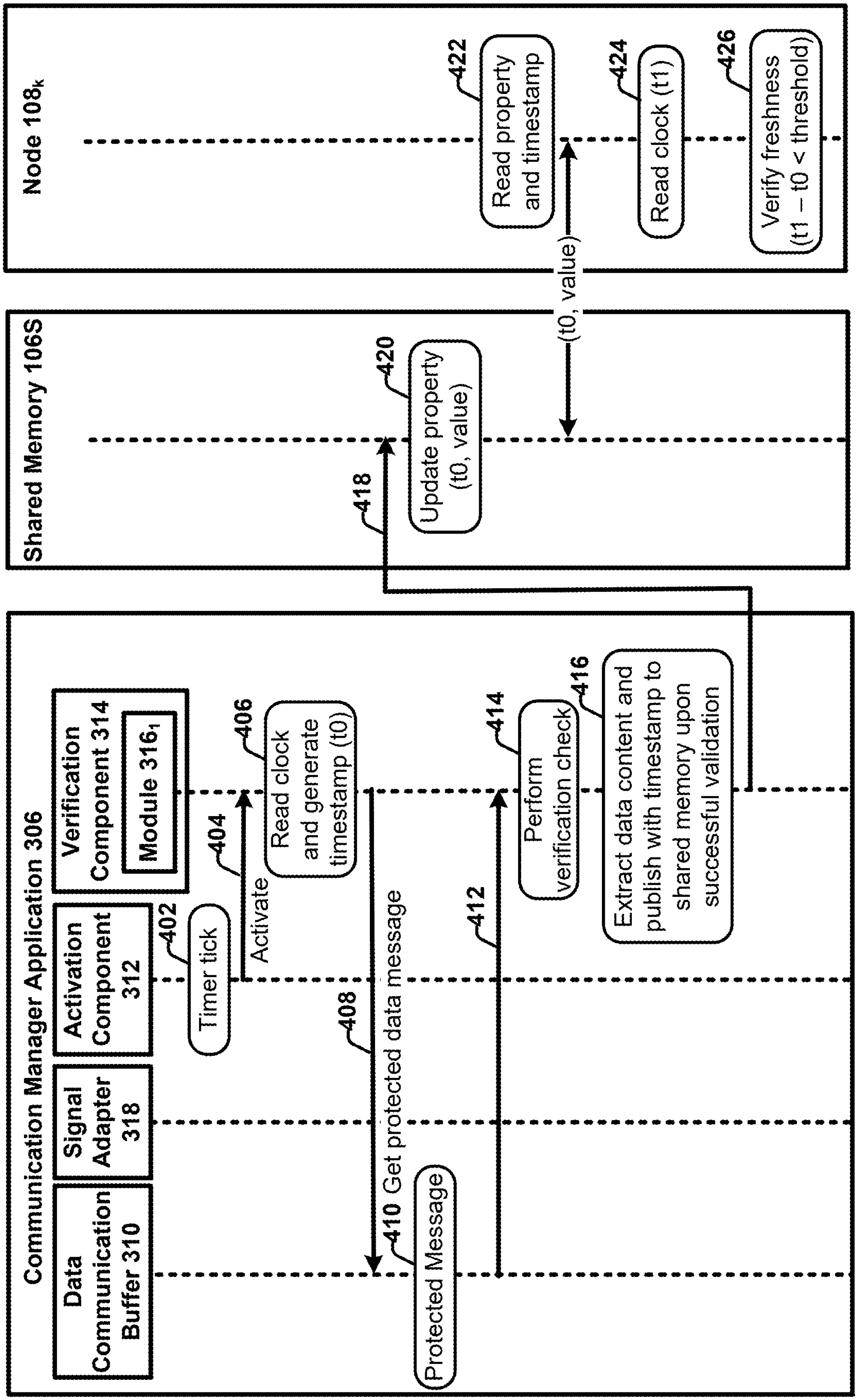
FIG. 4 illustrates a signal diagram of an example process for verifying data messages sent to one or more nodes in accordance with an E2E communication protocol, in accordance with one or more embodiments described herein.

FIG. 4 illustrates a signal diagram of an example process for verifying data messages sent to a receiver node by a sender node of system 100 in accordance with an E2E communication protocol, in accordance with one or more embodiments described herein. With reference to FIG. 4 in view of FIGS. 1-3, the process illustrated in FIG. 4 illustrates the functions of and interactions between the respective components of the communications manager application 306, the shared memory 106S and a receiver node. The shared memory 106S corresponds to a secure portion of memory 106 that is accessible to the nodes of system 100 (e.g., nodes 108 and nodes 112).

In this example, the receiver node corresponds to one of the nodes 108 (identified as node $\mathbf{108}_k$) hosted and executed by the core data processing device 102. For instance, the receiver node $\mathbf{108}_k$ can correspond to an application configured to consume the information (i.e., data content) included in protected data messages sent by the sender node. It should be appreciated that in other implementations, the receiver node can correspond to one or more nodes 112. The sender node can vary and correspond to another node 108 (e.g., another application) or a node 112. The process illustrated in FIG. 4 assumes the sender node regularly or continuously sends protected data messages of the same type (and thus counted together and sequentially) over time and directed to the receiver node $\mathbf{108}_k$. Thus, in accordance with the embodiment illustrated in FIG. 4, each new message sent by the sender node includes an updated counter value in terms of protection and may also include a CRC and/or other protection mechanisms (e.g., encryption or the like). The rate at which the protected messages are sent can vary and may range between every 10 milliseconds to every 60 seconds. The protected data messages are intercepted by reception component 308 and temporarily stored in the data communication buffer 310.

In this regard, the process illustrated in FIG. 4 begins at 402 with a timer click observed or detected by the activation component 312. The timer tick at 402 corresponds to an event timer that controls the frequency of activation of verification for the protected messages by the communications management application 306. For example, in some implementations, the activation frequency may be set to a high activation frequency, such as every 10 milliseconds, which may be tailored based on the type of the protected messages or the same for all types of protected messages. In this example, the activation component 312 is configured to monitor the clock 322 and/or otherwise employ an event timer set to every 10 milliseconds to control activation of the verification processes. In other words, the timer tick at 402 may be set to tick every 10 milliseconds or another predefined activation rate. At 404, in response to the timer tick, the activation component 312 directs the verification component 314 to perform the verification process for the protected data messages.

In association with activating the verification processes, the verification component 314 executes a module $\mathbf{316}_1$ of the respective modules 316 configured to perform an instance of the verification process for the particular type of the protected data messages sent by the sender node. In this regard, the process illustrated in FIG. 4 is described with reference to verifying one type of protected data messages sent by a single sender node. It should be noted that in embodiments in which the verification component 314 is configured to activate the verification process for all different types of protected data messages at the same activation rate (e.g., every 10 milliseconds or the like), that in response to the timer tick at 402, the activation component 412 can direct the verification 314 to activate all modules 316 respectively configured to handle verification for the different types of protected data messages at the same time. In some implementations of these embodiments, the verification component 314 can execute all modules 316 to perform their respective verification processes for their corresponding message types simultaneously or in parallel. In other implementations of the embodiments, the verification component can execute respective ones of the modules 316 sequentially in time.

In this regard, steps 406-418 correspond to functions performed by a single module $\mathbf{316}_1$. It should be appreciated that in an actual runtime environment, multiple modules 316 will be activated at the timer tick 402 and perform operations similar to operations 406-416 in association with verifying their respective protected data message types. In this regard, the respective modules $\mathbf{316}_1$ can be likened to separate verification channels, wherein each channel performs an instance of a verification process to verify respective protected data messages of an incoming stream of protected data messages over time, and wherein each channel processes protected data messages of a different type (e.g., sent from a different sender node and/or comprising a different type of data content or information).

With this context in mind, upon activation, at 406 module $\mathbf{316}_1$ reads the clock (e.g., clock 322) and generates a timestamp (t0). Alternatively, the module $\mathbf{316}_1$ can be configured to generate the timestamp in response to successful verification (e.g., at 420). The module $\mathbf{316}_1$ then gets the protected data message (e.g., the most recently received, if available), from the data communication buffer 310. To facilitate this end, module $\mathbf{316}_1$ can employ signal adapter 318. The signal adapter 318 corresponds to an interfacing component that enables module $\mathbf{316}_1$ to read protected data messages from the data communication buffer 310. In this regard at 408, the module $\mathbf{316}_1$ employs the signal adapter 318 to get the protected message 410 from the data communication buffer 310 which is then received by module $\mathbf{316}_1$ at 412. At 414, module $\mathbf{316}_1$ then performs a verification check for the protected data message to determine whether the message is valid. As described above, the verification check that the module $\mathbf{316}_1$ is configured to perform at 414 can be tailored to the type of the protected data message and the type of data protection mechanisms used for the type of the protected data message. In some embodiments, the data protection mechanisms used can include a CRC check and/or counters. With these embodiments, the verification check performed at 414 and can include performing a CRC and/or verifying whether the counter included in the protected data message 410 is valid (e.g., based on the expected counter value for the counter given the counter value of the last received message of the same type). However, the protection mechanisms and the corresponding verification mechanism used for the protected data messages can vary and is not limited to verification based on CRCs and/or counters.

At 416, in response to successful verification of the protected data message, the module $\mathbf{316}_1$ extracts the data content from the protected message, and at 418 publishes it along with the timestamp to the shared memory106S. The information published 420 includes the extracted data content, which in this case includes an updated property value and the timestamp. For example, protected messages of the same type can respectively be associated with a unique identifier, such as an identifier for the sender node in implementations in which the message types are defined by sender node. In association with publishing the information to the shared memory 106S, the extracted data content for the message type can be linked to the corresponding unique ID for the message type in the shared memory 106S. For example, in some implementations, the shared memory 106S can include a dynamic information index that identifies the different message types and includes a data entry field for each of the different message types that is updated with the currently extracted data content if it different from the previous entry.

In other words, in some embodiments, at 418, the module 316$_1$ can be configured to only publish the extracted data content if it differs from the previous entry for the information (i.e., the entry for the type of the message from which the data content was extracted) in shared memory 106S. For example, as applied to an embodiment in which system 100 is integrated on or within a vehicle, let's assume the protected data messages sent by the sender node correspond to brake status messages sent by the braking system ECU that report the status of the brake of a vehicle and the braking system ECU is configured to send an updated message every 10 milliseconds (or another send frequency). In accordance with this example, the extracted data content can include the property value included in the protected data message 410, which may be for instance either active status or inactive status. In accordance with this example, at 418 the module 316$_1$ would only publish the extracted value if it differs from last published value for the protected message type (e.g., if the status changes from active to inactive, or vice versa).

At 422, the receiver node 108$_k$ reads the property value and the timestamp from the shared memory 106 in response to an event trigger or a defined read frequency for the type of the protected data messages that the receiver node 108$_k$ is configured to apply. As described above, because the verification process is decoupled from the receiver node 108$_k$, the receiver node 108$_k$ can be configured to employ any suitable read frequency depending on the receiver node's sensitivity to the freshness of the data content. In some embodiments, the read frequency can be lower than the activation frequency of the timer tick 402 (and thus the activation frequency of the verification process), thereby decreasing resource consumption (e.g., consumption of processing power/speed by the processing unit 104 and usage of memory 106) by the receiver node 108$_k$.

At 424, the receiver node 108$_k$ reads the clock (e.g., clock 322) to determine the current time (t1). At 426, the receiver node 108$_k$ verifies whether the data content (e.g., the updated value) satisfies a freshness threshold based on the time difference between t1 and t0. In this regard, the freshness threshold can correspond to a maximum allowed time difference between t1 and t0. The freshness threshold applied by respective receiver nodes and for different types of data content can vary. In accordance with the disclosed techniques, the receiver node 108$_k$ can be configured to consume the data content based on the data content satisfying the freshness threshold. The response performed by the receiver node 108$_k$ if the data content fails to satisfy the freshness threshold can vary and be tailored based on the context of the receiver node, the type of the data content, and so on.

Figure 5:
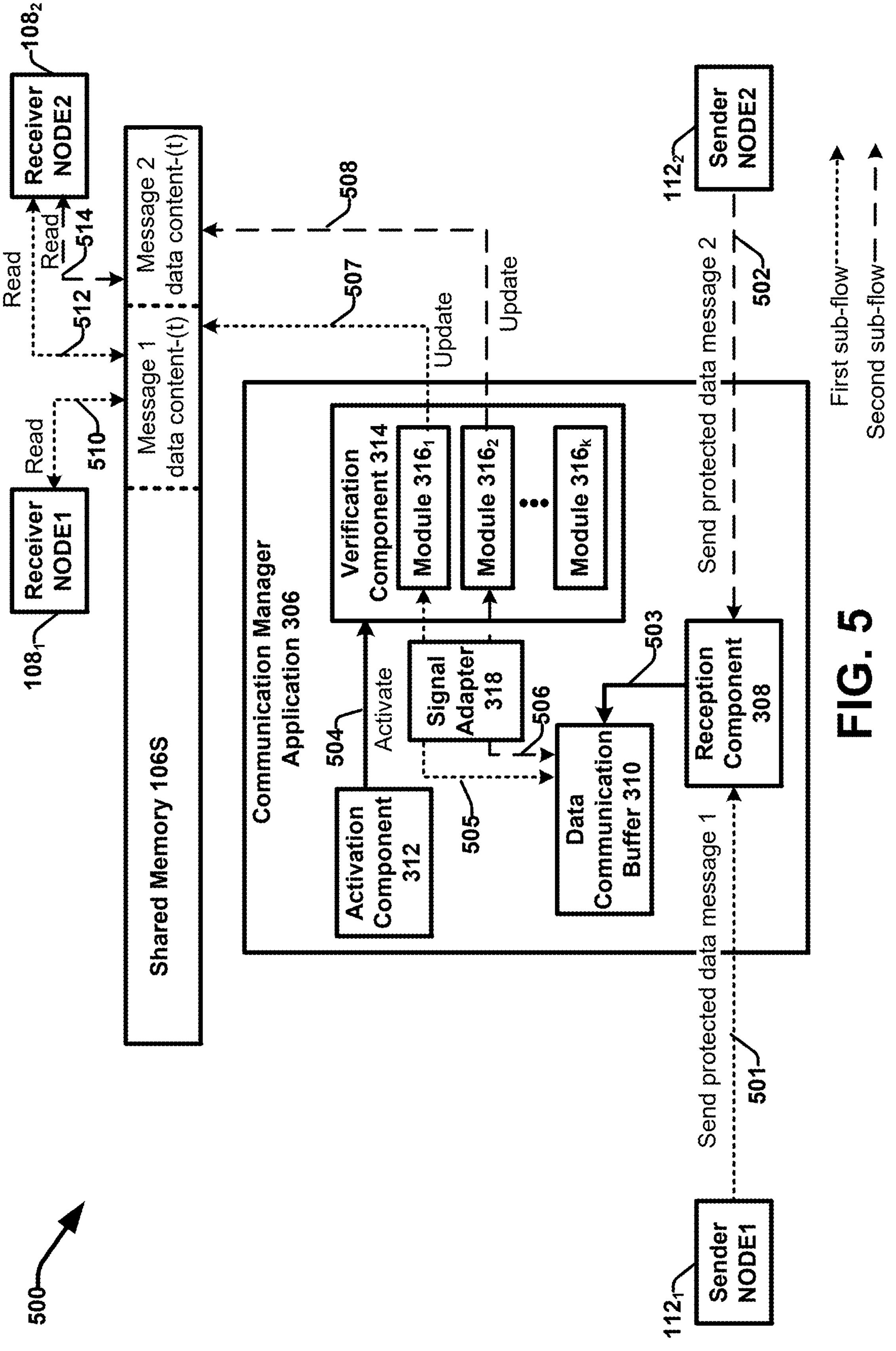
FIG. 5 illustrates an example communication flow of data communication amongst nodes of a communication system employing centralized E2E signal verification, in accordance with one or more embodiments described herein.

FIG. 5 illustrates an example communication flow 500 of data communication amongst nodes of system 100 in accordance with one or more embodiments described herein. With reference to FIG. 5 in view of FIGS. 1-4, the flow 500 illustrated in FIG. 5 illustrates the functions of and interactions between the respective components of the communications manager application 306, the shared memory 106S, two sender nodes, and two receiver nodes.

In this example, the sender nodes correspond to different nodes 112, respectively identified as sender node 112$_1$ (hereinafter sender node 1) and sender node 112$_2$ (hereinafter sender node 1). The receiver nodes correspond to different nodes 108, respectively identified as receiver node 108$_1$ (hereinafter receiver node 1) and receiver node 108$_2$ (hereinafter receiver node 2). It should be appreciated that in other implementations, either of the sender nodes can correspond to a node 108 (e.g., an application hosted and executed by the data processing device 102) and/or either of the receiver nodes can correspond to a node 112.

In accordance with flow 500, at 501 sender node 1 sends a protected data message 1 (e.g., corresponding to a messages of a first type) as directed to one or more receiver nodes of the system 100, which in this example includes both receiver nodes. At 502, sender node 2 sends a protected data message 2 (e.g., corresponding to a messages of a second type) as directed to one or more receiver nodes of the system 100, which in this example includes receiver node 2. As illustrated in FIG. 5, flow 500 includes two sub-flows, a first sub-flow associated with protected data message 1, indicated via the small, dashed arrow lines, and a second sub-flow associated with protected data message 2, indicated via the larger, dashed arrow lines. Although flow 500 is illustrated in association with the sender nodes respectively sending a single protected data message, it should be appreciated that sender nodes are respectively configured to send new protected data messages of the same type regularly or continuously over time. The send frequency at which the protected data messages 1 are sent by sender node 1 and at which protected data messages 2 are sent by sender node 2, can vary.

By way of example as applied to an embodiment in which system 100 is integrated on or within a vehicle 200, let's say assume sender node 1 corresponds to the vehicle's braking system ECU, and protected data message 1 indicates the breaking status of the braking system every, sent every 10 milliseconds. Let's say receiver node 1 corresponds to an application that performs an action in response to pressing the brake pedal in association with starting the vehicle and pushing a button. Let's further assume that receiver node 2 corresponds to a beacon motion state application that uses the brake pedal status information to determine and communicate the vehicle's motion state to other applications, systems and/or devices onboard the vehicle (and/or external to the vehicle). Let's say sender node 2 corresponds to the vehicle's steering system ECU and protected data message 2 indicates the gear shift status of the vehicle, also sent every 10 milliseconds. In this example, the beacon motion state application (e.g., receiver node 2) also consumes the gear shift status information to determine and communicate the vehicle's motion state.

In accordance with flow 500, at 503, the reception component 308 intercepts or otherwise receives protected data message 1 and protected data message 2 as they are sent (e.g., via communication framework 110 and prior to reaching the receiver nodes) and temporarily stores them in the data communication buffer 310. In accordance with the example implementation, as both protected data message 1 and protected data message 2 are configured to be sent every 10 milliseconds, the reception component 308 should receive a new protected data message 1 and a new protected data message 2 every 10 milliseconds.

At 504, the activation component directs the verification component 314 to activate the message verification process for all (or a select subset) of the different types of messages it is configured to verify. It should be appreciated that although flow 500 is illustrated with respect to only two different message types (e.g., protected data messages 1 and 2), that the number of different message types can vary and include tens, hundreds or more of different message types. The activation rate for the verification process can be predefined and preferably set to a high activation frequency (e.g., every 10 milliseconds or another high activation frequency) to ensure every incoming message is verified regardless of its send frequency.

In response to verification processes activation as directed by the activation component 312 (e.g., in response to an event timer set for every 10 milliseconds or the like), the verification component 314 loads and executes the corresponding modules 316 for the respective message types to perform their respective instances of the verification process as tailored to the respective message types. For instance, in this example, module 316$_1$ is configured to perform a first instance of the verification process tailored to protected data messages 1, and module 316$_2$ is configured to perform a second instance of the verification process tailored to protected data messages 2. Because both modules (e.g., module 316$_1$ and module 316$_2$) are activated every 10 milliseconds, the respective modules perform their instances of the verification process every 10 milliseconds. In some embodiments, the verification component 314 can execute different models 316 sequentially. In other embodiments, the verification component 314 can execute different modules 316 in parallel.

In this regard, in accordance with the first sub-flow, in response to exaction of module 316$_1$, at 505 module 316$_1$ reads the protected data message 1 from the data communication buffer 310 and performs a first verification check to verify protected data message 1. For example, in implementations in which the protected data message 1 includes a counter value, the first verification check can be based on whether the counter value is valid. The first verification check may also involve a CRC and/or another verification mechanism. In this regard, the first module 316$_1$ is configured to perform the first instance of the verification process in accordance with defined verification rules tailored to the protected data messages 1. Based on successful verification of protected data message 1, module 316$_1$ extracts or otherwise reads the data content from protected message 1, generates a timestamp (t) for the data content (e.g., corresponding to the timing of reception and/or successful verification), and at 507, publishes the timestamp and the message 1 data content to the shared memory 106S. In some embodiments, module 316$_1$ only publishes (or updates) the shared memory 106S for data message 1 if the extracted data content has changed from the last entry.

In accordance with the second sub-flow, in response to exaction of module 316$_2$, at 506 module 316$_2$ reads the protected data message 2 from the data communication buffer 310 and performs a second verification check to verify protected data message 2. For example, in implementations in which the protected data message 2 includes a counter value, the second verification check can be based on whether the counter value is valid. The second verification check may also involve a CRC and/or another verification mechanism. In this regard, the second module 316$_2$ is configured to perform the second instance of the verification process in accordance with defined verification rules tailored to the protected data messages 2. Based on successful verification of protected data message 2, module 316$_2$ extracts or otherwise reads the data content from protected message 2, generates a timestamp (t) for the data content (e.g., corresponding to the timing of reception and/or successful verification), and at 508, publishes the timestamp and the message 2 data content to the shared memory 106S. In some embodiments, module 316$_2$ only publishes (or updates) the shared memory 106S for data message 1 if the extracted data content has changed from the last entry.

As illustrated in FIG. 500, both receiver node 1 and receiver node 2 are configured to read (e.g., at 510 and 512 respectively) the message 1 data content and the timestamp from the shared memory 106S. In this regard, flow 500 illustrates how data messages of the same type that are consumed by separate receiver nodes can be verified by a single, central application, (e.g., communications manager application 306) once and then the content provided to the separate applications once verified, thereby eliminating duplicated verification processing of protected data messages of the same type using separate verification processes performed by separate receiver nodes.

In addition, in accordance with the disclosed techniques, the read frequency employed by receiver node 1 and receiver node 2 in association with reading the message 1 data content can be different and lower than the activation frequency at which module 316$_1$ executes the first instance of the verification process (and/or the send frequency of protected data messages 1). In this regard, the read frequency of receiver node 1 and receiver node 2 for message 1 data content can tailored based on their respective usages of the information and related freshness constraints for the information. For example, as applied to the vehicle implementation wherein message 1 data content includes the brake pedal status, the beacon motion state application (e.g., receiver node 2) may require updated values at a significantly higher duty cycle (e.g., every 10 milliseconds) relative to the application (e.g., receiver node 1) that preforms a response into staring the vehicle and pressing the brake pedal (e.g., which may require update values every 200 milliseconds). In this example, the read frequency of receiver node 2 for message 1 data content can be higher than that of receiver node 1. For example, the read frequency of receiver node 2 for message 1 data content may be set to the highest frequency (e.g., every 10 milliseconds) that is the same as the verification process activation frequency or a slightly lower frequency. On the other hand, to conserve resources and tailor the read frequency based on the freshness demands of receiver node 1, the read frequency of receiver node 1 for message 1 data content may be set to a lower read frequency relative to the verification process activation frequency (e.g., every 200 milliseconds or another read frequency responsive to a trigger event or the like).

Likewise, in accordance with the second sub-flow, receiver node 2 is also configured to read and consume the message 2 data content from the shared memory at 514. The read frequency at which receiver node 2 reads the message 2 data content can also vary relative to the ready frequency at which it reads message 1 data content (or be the same) and be lower (or the same) than the activation frequency at which module 316$_2$ performs the second instance of the verification process for the protected data messages 2.

In some embodiments, (although not shown), the respective modules 316 (and/or the notification component 320) can be configured to notify certain receiver nodes in response to publishing updated data content for a particular message type that the certain receiver nodes are configured to receive. For example, the notification component 320 can send a notification to the applicable receiver nodes to which the protected messages are directed indicating that updated data content has been received and published. The applicable receiver nodes can correspond to those which subscribe to receive such notifications, or all receiver nodes can be configured to receive such notifications. With these embodiments, the respective receiver nodes can be configured to read the updated data content from memory 106 (or a shared portion of the memory, another memory or the like) in response to reception of the notification. For example, assuming receiver node 1 has been configured to receive a notification in response to message 1 data content being updated in the shared memory 106S, in association with publishing the message 1 data content at 507, module 316$_1$ (and/or notification component 320) can send receiver node 1 a notification message regarding the publishing of the updated content. Reception of the notification message can trigger receiver node 1 to read the updated message 1 data content and timestamp from the shared memory 106S.

Figure 6:
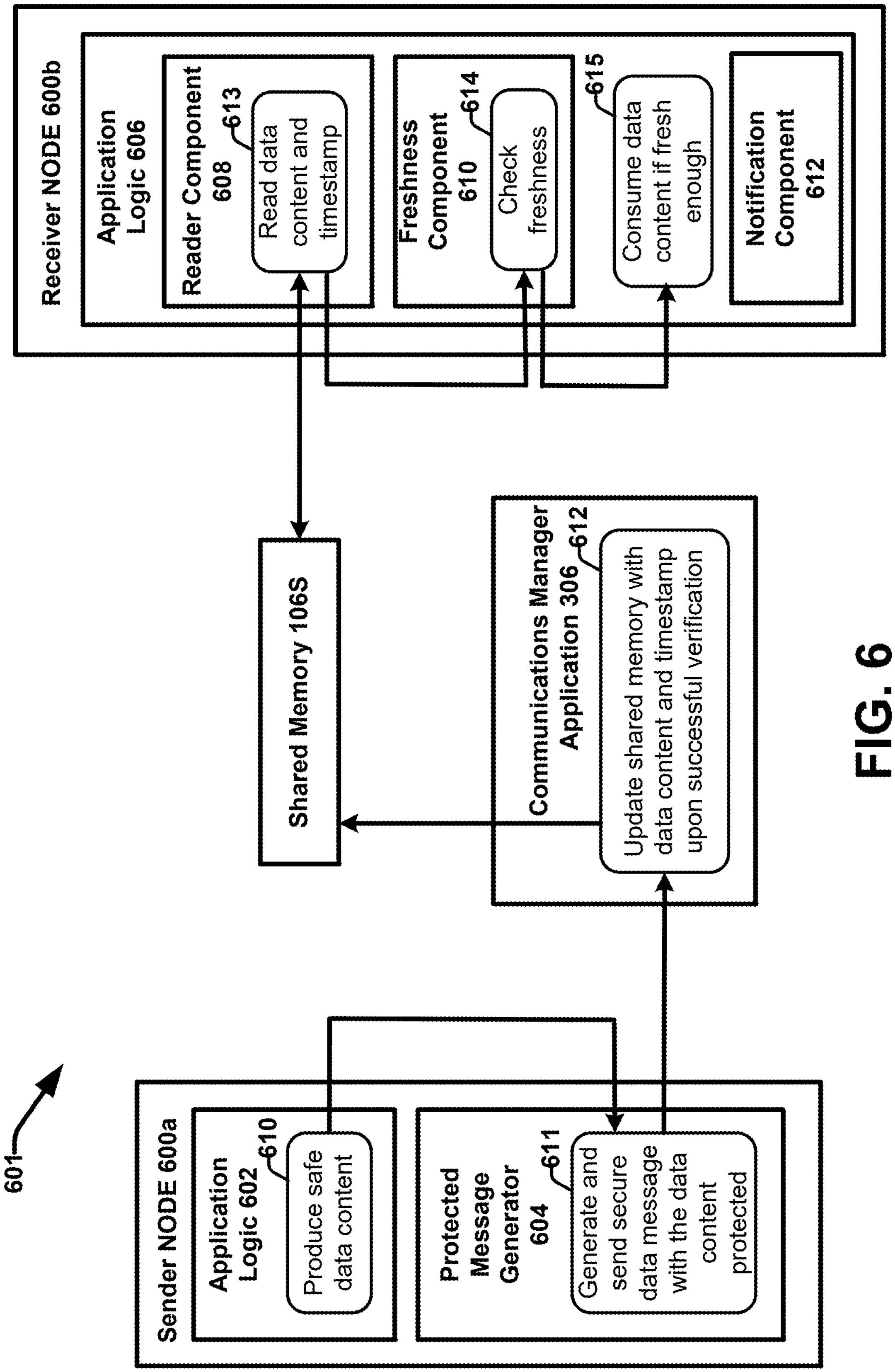
FIG. 6 illustrates an example communication flow between a sender node and a receiver node, in accordance with one or more embodiments described herein.

FIG. 6 illustrates an example communication flow 601 between a sender node (sender node 600*a*) and a receiver node (receiver node 600*b*) in accordance with one or more embodiments described herein. With reference to FIG. 6 in view of FIGS. 1-5, in various embodiments, sender node 600*a* can correspond to any one of the nodes 112 or nodes 108 of system 100. Likewise, receiver node 600*b* can correspond to any different one (excluding the one used for the sender node 600*a*) of the nodes 112 or nodes 108 of system 100. As shown in FIG. 6, the sender node 600*a* and the receiver node 600*b* can respectively include computer-executable components that can be stored in at least one memory and executed by at least one processing unit coupled to the at least one memory. In some implementations in which the sender node 600*a* or the receiver node 600*b* corresponds to one of the nodes 108 (e.g., an application hosted by the core data processing device 102) the memory can correspond to memory 106 and the processing unit can correspond to processing unit 104. In other implementations in which the sender node 600*a* or the receiver node 600*b* corresponds to one of the nodes 112 external to the core data processing device 102, the memory and the processing unit can include a separate memory and/or processing unit, examples of which are shown and described with reference to FIG. 19.

In accordance with this embodiment, the computer-executable components associated with the sender node 600*a* include application logic 602 and protected message generator 604. The computer-executable components associated with the receiver node 600*b* include application logic 606 which includes reader component 608, freshness component 610 and notification component 612.

Communication flow 601 initiates at the sender node 600*a* at 602 at 610, wherein the application logic 602 produces safe data content to be sent to the receiver node (e.g., via the communication framework 110 and/or system bus 303). For example, the safe data content may correspond to a status or state value of an onboard system of a vehicle 202 as determined by the application logic based on relevant sensor data received by the onboard system. The application logic 602 provides the data content to the protected message generator 604. At 611, the protected message generator 604 generates and sends a secure data message with the data content protected to the communications manager application 306. For example, the protection mechanism employed can include or correspond to a protection mechanism configured for usage by the sender node 600*a* in accordance with a secure data communications protocol employed by the system (e.g., AUTOSAR E2E or the like). For instance, the protection mechanism may involve adding a counter value to the message, adding a CRC, and/or another suitable protection mechanism that enables the message to be verified using a corresponding verification mechanism. At 612, the communications manager application 306 updates the share memory with the data content as published thereto in a deprotected format and with a timestamp (indicating timing of reception of the secure data message and/or verification) upon successful verification.

At 613, the reader component 608 reads the data content and the timestamp from the share memory 106S. Importantly, the reader component 608 can be configured to read the data content from the shared memory 106S at any desirable frequency and/or in response to any suitable trigger event depending on the usage needs of the information by the receiver node 600*b*. Accordingly, in some embodiments, the read frequency can be lower than the frequency of the verification process. At 614, the freshness component 610 checks the freshness of the data content and determines whether the timestamp on the data content reflects the data content satisfying a freshness threshold (e.g., based on the time difference between the current time and the timestamp being less than or equal to the freshness threshold). At 615, the application logic consumes the data content if it is fresh enough. The notification component 612 can correspond to a component that receives the notifications from notification component 320 in accordance with some embodiments. Additionally, or alternatively, the notification component 612 can be configured to notify communications manager application 306 regarding data content that fails to satisfy the freshness check at 614.

Figure 7:
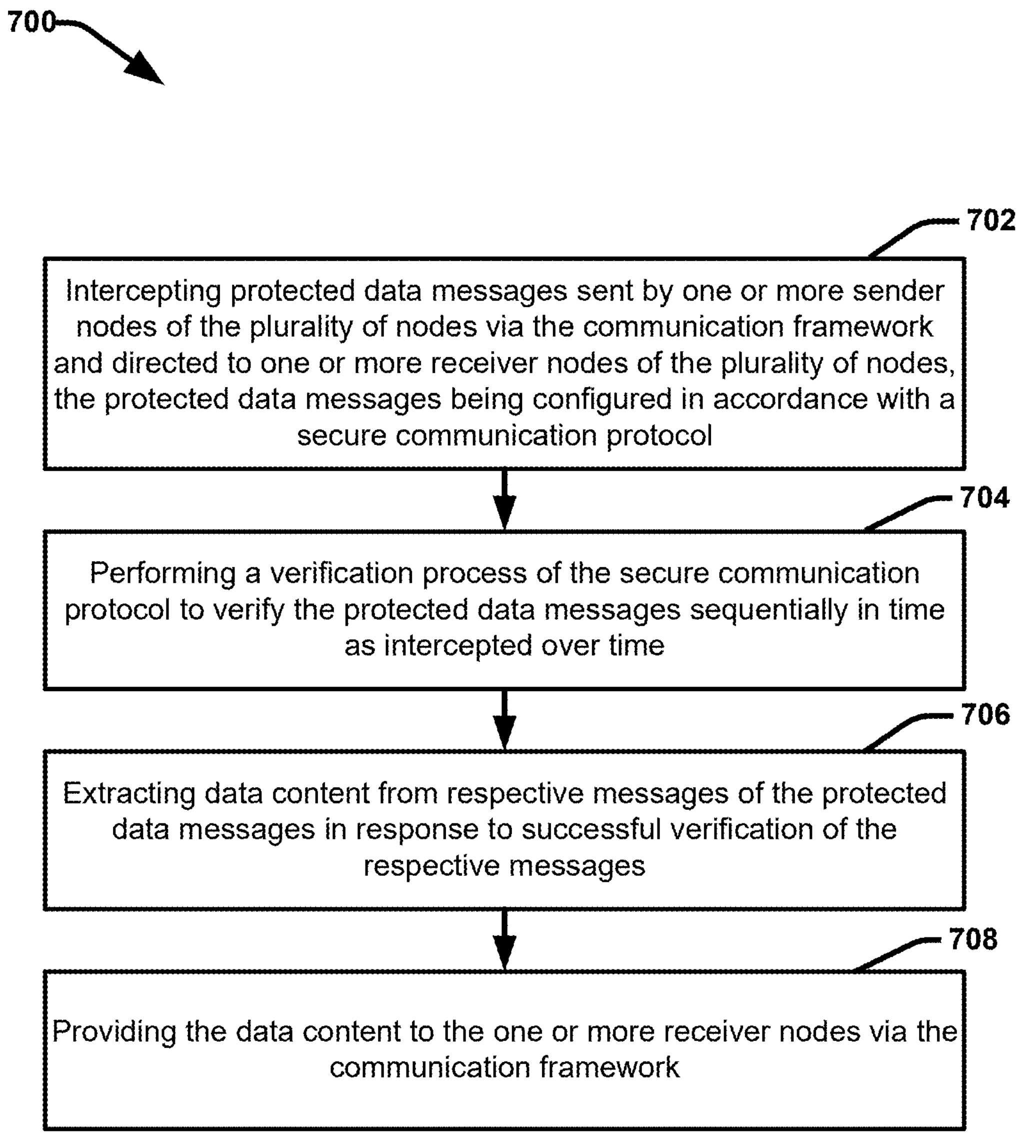
FIG. 7 illustrates a block flow diagram of an example, non-limiting computer-implemented method for centralized management of signal verification of a communication system employing E2E communication protocols, in accordance with one or more embodiments described herein.

FIG. 7 illustrates a block flow diagram of an example, non-limiting computer-implemented method 700 for centralized management of signal verification of a communication system employing E2E communication protocols, in accordance with one or more embodiments described herein. With reference to FIG. 7 in view of FIGS. 1-6, method 700 corresponds to an example computer-implemented method that can be performed by a data processing device (e.g. data processing device 102) of a system (e.g., system 100) comprising a plurality of nodes (e.g., nodes 108 and nodes 112) respectively connected to one another via a communication framework (e.g., communication framework 110). At 702, method 700 comprises intercepting (e.g., via reception component 308) protected data messages sent by one or more sender nodes of the plurality of nodes via the communication framework and directed to one or more receiver nodes of the plurality of nodes, the protected data messages being configured in accordance with a secure communication protocol (e.g., AUTOSAR E2E or a similar protocol). At 704, method 700 comprises performing (e.g., via verification component 314) a verification process of the secure communication protocol to verify the protected data messages sequentially in time as intercepted over time. At 706, method 700 comprises extracting data content from respective messages of the protected data messages in response to successful verification of the respective messages (e.g., via verification component 314). At 708, method 700 comprises providing the data content to the one or more receiver nodes via the communication framework. (e.g., via verification component 314).

In various embodiments of method 700, the protected data messages comprise different types of messages, and wherein performing the verification process at 704 comprises performing different instances of the verification process for each type of the different types of messages, the different instances respectively tailored to the different types of messages. For example, the one or more sender nodes can comprise a plurality of sender nodes and wherein the different types of messages correspond to different sender nodes of the plurality of sender nodes. In other words, messages coming from the same sender node are grouped together as a single type and counted together and sequentially. Additionally, or alternatively, the different types of messages vary with respect to a type of the data content respectively included in the different types of messages. In other words, messages comprising the same type of data content are grouped together as a single type and counted together and sequentially In some embodiments, in accordance with method 700 the different instances of the verification process employ different activation frequencies respectively tailored to the different types of messages. For example, different instances of the verification process can be performed by separate software modules (e.g., modules 316) and the activation frequencies of the different modules 316 can vary. In other embodiments, the verification component 314 (or the activation component 312) can execute all the modules 316 (or a select subset thereof) at the same activation frequency, such as a high activation frequency (e.g., every 10 milliseconds or another activation frequency).

In one or more embodiments, the providing the data content at 708 comprises publishing, via the communication framework, the data content to a memory of the system with timestamps respectively indicating timing of interception of corresponding messages of the respective messages, wherein the one or more receiver nodes are configured to read the data content from the memory via the communication framework.

In some implementations of method 700, at least one receiver node of the one or more receiver nodes is configured to read the data content associated with a same type of messages of the different types of messages from the shared memory at a different read frequency relative to a corresponding activation frequency of a corresponding instance of the verification process employed for the same type of messages. In some implementations of method 700, wherein at least some of the one or more receiver nodes are configured to read the data content associated with a same type of messages of the different types of messages from the memory at different read frequencies. For example, in an embodiment of method 700, the one or more sender nodes comprise a first sender node configured to send first protected data messages of a first type of messages of the different types of messages at a first frequency, wherein performing the verification process at 704 comprises performing a first instance of the verification process tailored to the first type of messages and using an activation frequency corresponding to the first frequency, and wherein the one or more receiver nodes comprise at least one receiver node configured to read the data content as extracted from the first protected data messages from the memory at a lower frequency relative to the first frequency.

In some embodiments, the system of method 700 corresponds to a system integrated on or within a vehicle (e.g., vehicle 200) as shown in FIG. 2. With these embodiments, the one or more sender nodes can comprise ECUs associated with different onboard systems of the vehicle (e.g., ECUs 212) and wherein the one or more receiver nodes comprise different applications (e.g., nodes 108 corresponding to different applications) executed by the data processing device 102.

Figure 8:
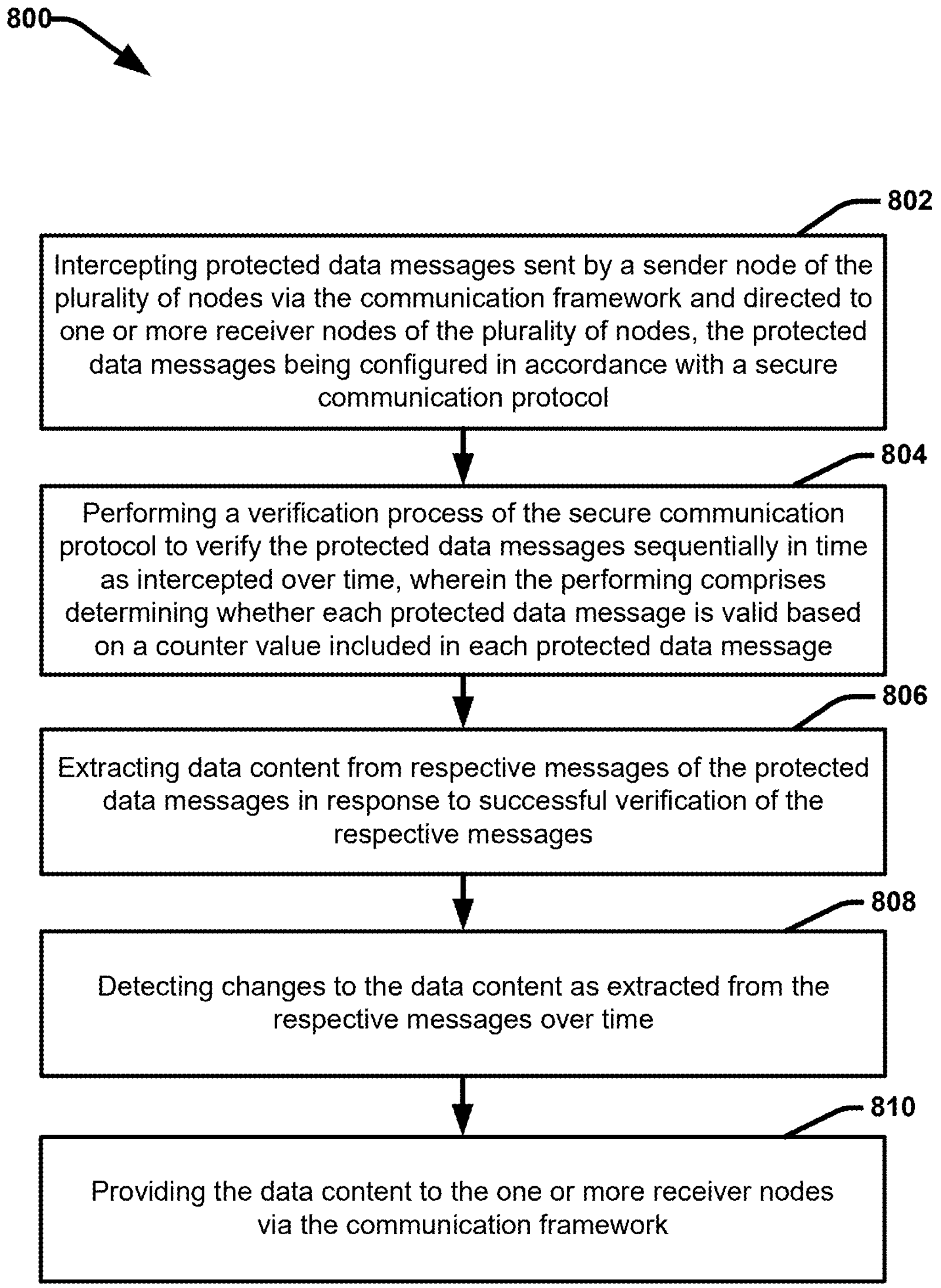
FIG. 8 illustrates a block flow diagram of another example, non-limiting computer-implemented method for centralized management of signal verification of a communication system employing E2E communication protocols, in accordance with one or more embodiments described herein.

FIG. 8 illustrates a block flow diagram of an example, non-limiting computer-implemented method 800 for centralized management of signal verification of a communication system employing E2E communication protocols, in accordance with one or more embodiments described herein. With reference to FIG. 8 in view of FIGS. 1-6, method 800 corresponds to an example computer-implemented method that can be performed by a data processing device (e.g. data processing device 102) of a system (e.g., system 100) comprising a plurality of nodes (e.g., nodes 108 and nodes 112) respectively connected to one another via a communication framework (e.g., communication framework 110). At 802, method 800 comprises intercepting (e.g., via reception component 308) protected data messages sent by a sender node of the plurality of nodes via the communication framework and directed to one or more receiver nodes of the plurality of nodes, the protected data messages being configured in accordance with a secure communication protocol (e.g., AUTOSAR E2E or a similar protocol). In this regard, method 800 assumes the protected data messages sent by the sender node are the same type of messages that are repeatedly or continuously sent by the sender node over time.

At 804, method 800 comprises performing (e.g., via verification component 314) a verification process of the secure communication protocol to verify the protected data messages sequentially in time as intercepted over time, wherein the performing comprises determining whether each protected data message is valid based on a counter value included in each protected data message. At 806, method 800 comprises extracting data content from respective messages of the protected data messages in response to successful verification of the respective messages (e.g., via verification component 314). 808, method 800 comprises detecting changes to the data content as extracted from the respective messages over time. (e.g., via verification component 314). At 810, method 800 comprises providing the data content to the one or more receiver nodes via the communication framework based on detection of a change to the data content. (e.g., via verification component 314).

Figure 9:
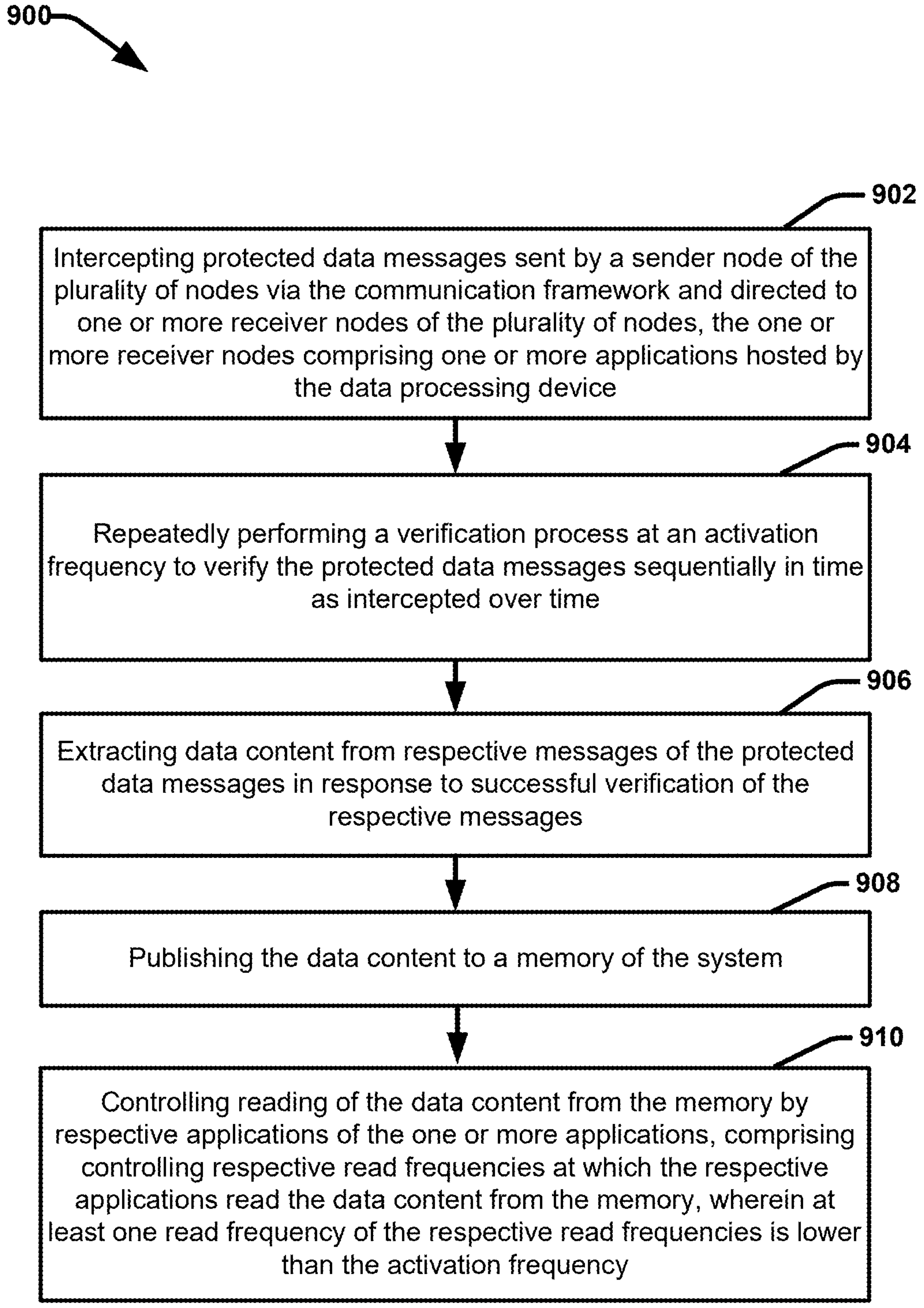
FIG. 9 illustrates a block flow diagram of another example, non-limiting computer-implemented method for centralized management of signal verification of a communication system employing E2E communication protocols, in accordance with one or more embodiments described herein.

FIG. 9 illustrates a block flow diagram of an example, non-limiting computer-implemented method 900 for centralized management of signal verification of a communication system employing E2E communication protocols, in accordance with one or more embodiments described herein. With reference to FIG. 9 in view of FIGS. 1-6, method 900 corresponds to an example computer-implemented method that can be performed by a data processing device (e.g. data processing device 102) of a system (e.g., system 100) comprising a plurality of nodes (e.g., nodes 108 and nodes 112) respectively connected to one another via a communication framework (e.g., communication framework 110). At 902, method 900 comprises intercepting (e.g., via reception component 308) protected data messages sent by one or more sender nodes of the plurality of nodes via the communication framework and directed to one or more receiver nodes of the plurality of nodes, the one or more receiver nodes comprising one or more applications hosted by the data processing device. At 904, method 900 comprises repeatedly performing (e.g., via verification component 314) a verification process at an activation rate to verify the protected data messages sequentially in time as intercepted over time. At 906, method 900 comprises extracting data content from respective messages of the protected data messages in response to successful verification of the respective messages (e.g., via verification component 314). At 908, method 900 comprises publishing the data content to a memory of the system (e.g., shared memory 106S). At 910, method 900 comprises controlling reading (e.g., by the data processing device 102 in accordance with the respective reader component 608 of the respective applications) of the data content from the memory by respective applications of the one or more applications, comprising controlling respective read frequencies at which the respective applications read the data content from the memory, wherein at least one read frequency of the respective read frequencies is lower than the activation frequency (e.g., via verification component 314).

Figure 10:
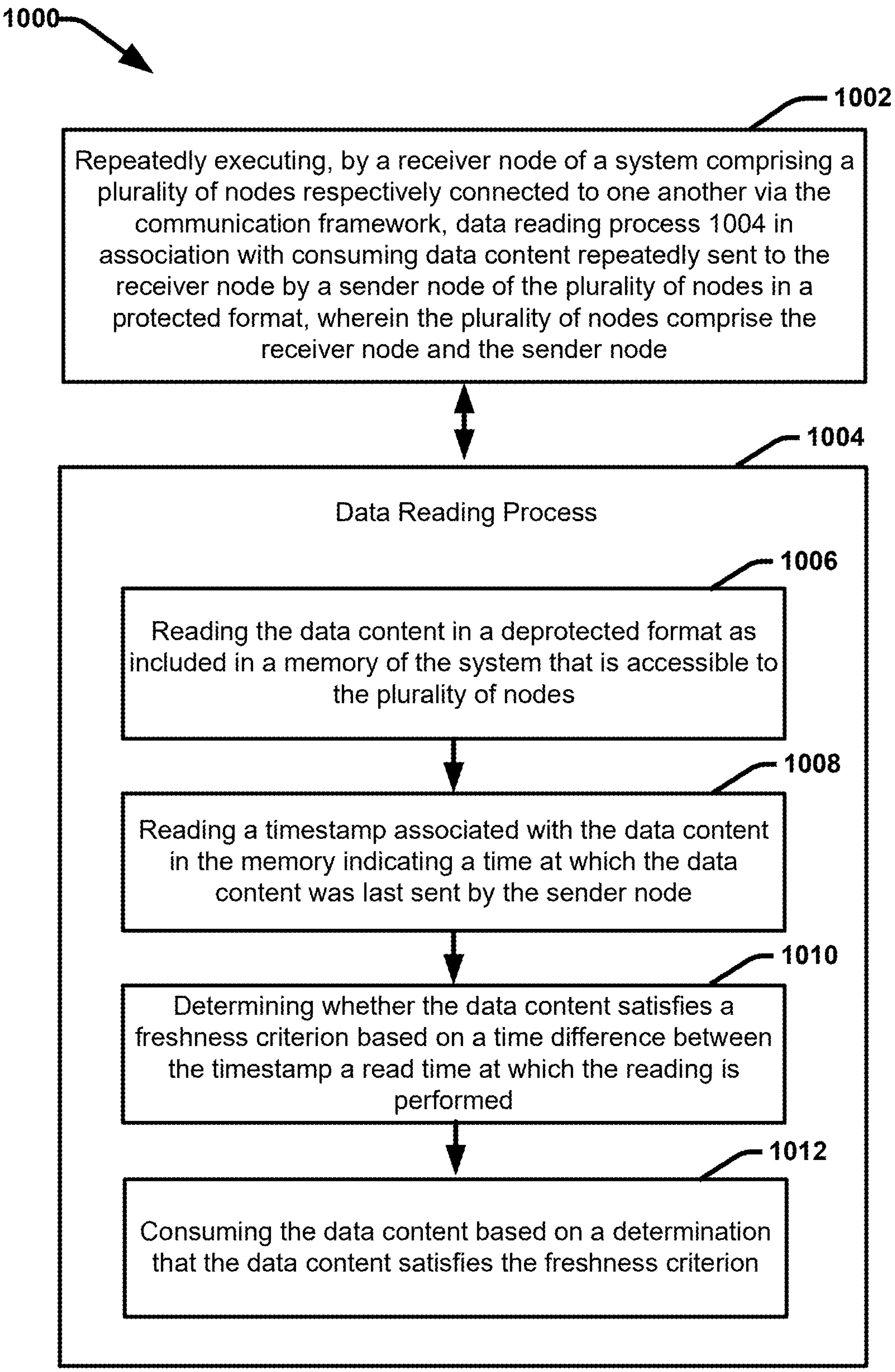
FIG. 10 illustrates a block flow diagram of another example, non-limiting computer-implemented method for centralized management of signal verification of a communication system employing E2E communication protocols, in accordance with one or more embodiments described herein.

FIG. 10 illustrates a block flow diagram of another example, non-limiting computer-implemented method 1000 for centralized management of signal verification of a communication system employing E2E communication protocols, in accordance with one or more embodiments described herein. With reference to FIG. 10 in view of FIGS. 1-6, method 1000 corresponds to an example computer-implemented method that can be performed by a receiver node (e.g., receiver node 600*b*) of system 100 in accordance with an embodiment. In this regard, at 1002, method 1000 comprises repeatedly executing, by a receiver node (e.g., receiver node 600 *b*) of a system comprising a plurality of nodes respectively connected to one another via the communication framework (e.g., system 100), data reading process 1004 in association with consuming data content repeatedly sent to the receiver node by a sender node of the plurality of nodes in a protected format (e.g., as a protected data message in accordance with an E2E protocol, such as AUTOSAR E2E or a similar protocol), wherein the plurality of nodes comprise the receiver node and the sender node. In this regard, the data reading process 1004 comprises, at 1006, reading (e.g., via reader component 608) the data content in a deprotected format as included in a memory of the system that is accessible to the plurality of nodes (e.g., memory 106, shared memory 106S, or the like). At 1008, the data reading process comprises reading a timestamp associated with the data content in the memory indicating a time at which the data content was last sent by the sender node (e.g., via reader component 608). At 1010, the data reading process comprises determining (e.g., via freshness component 610) whether the data content satisfies a freshness criterion (e.g., a time difference threshold) based on a time difference between the timestamp a read time at which the reading is performed. At 1012, method 1000 comprises consuming the data content (e.g., via application logic 606) based on a determination that the data content satisfies the freshness criterion.

In accordance with some implementations of method 1000, the repeatedly executing comprising repeatedly executing the data reading process 1004 at a read frequency that is different than a send frequency at which the sender node is configured to repeatedly send the data content to the receiver node. In this regard, the send frequency can correspond to the execution frequency at which the communications manager application performs signal verification for the protected data messages. Additionally, or alternatively, the read frequency can be different than the execution frequency at which the communications manager application performs signal verification for the protected data messages. In this regard, in some implementations, the read frequency can be lower than the send frequency and/or the execution frequency. Additionally, or alternatively, the read frequency can be responsive to a trigger event. In some cases, the read frequency varies and the send frequency and/or the execution frequency is fixed. For example, in some implementations, the execution frequency can be set to be the same for all types of protected data messages verified by the communications manager application 406.

Figure 11:
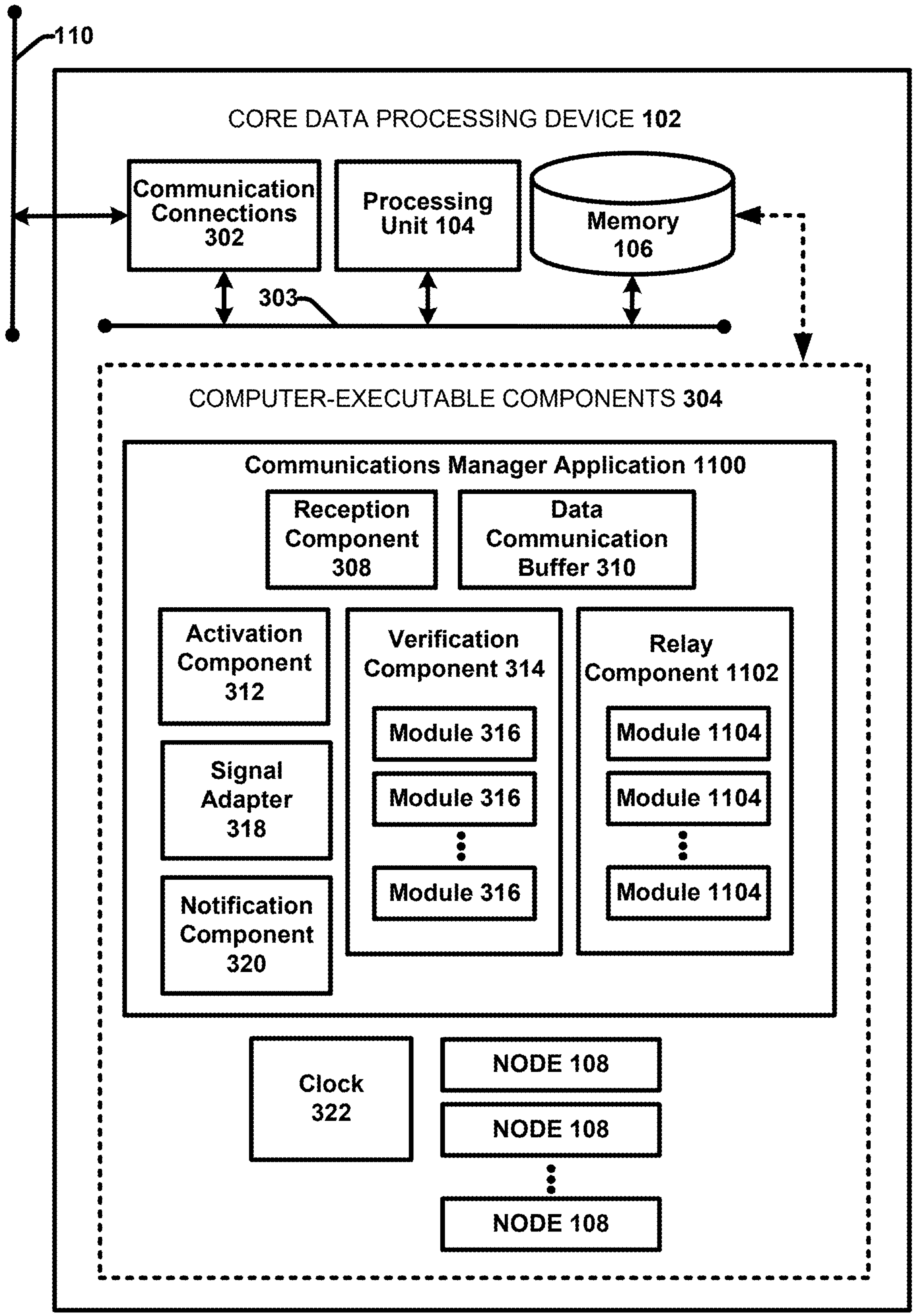
FIG. 11 illustrates another example data processing device that facilitates centralized signal verification management, in accordance with one or more embodiments described herein.

FIG. 11 illustrates the core data processing device 102 in accordance with one or more embodiments additional embodiments described herein. With reference to FIG. 10 in view of FIG. 3, in accordance with one or more additional embodiments, the core data processing device 102 can include communications manager application 1100 as opposed to communications manager application 306. Communications manager application 1100 corresponds to communications manager application 306 with the addition of relay component 1102. Repetitive description of like elements employed in respective embodiments is omitted for sake of brevity.

While the embodiments discussed with reference to FIGS. 3-10 are directed to an efficient solution for receiver nodes to verify received E2E protected communication, they do not address improvements in data transmission. One aspect of E2E messaging is timeout detection, which is verified at the receiving node. In accordance with existing AUTOSAR E2E protocols in which sender node is configured to regularly or continuously transmit the same message (e.g., the same type of data content yet with the current property value) to a receiver node over time, the receiver node is configured to apply a fixed timer to detect a timeout corresponding to a failure to receive an expected message within a defined timeframe. This fixed timer is set based on the transmission frequency of the message by the sender node. Thus, in accordance with existing AUTOSAR E2E communication protocols, the transmission frequency used by the sender node for a particular type of signal cannot be varied.

The frequency of the transmitted signal may be linked to safety requirements, user experience, or a combination of both. For example, as applied to communication amongst applications of an automotive system and a transmitted signal identifying the status of the child safety lock mechanism of the vehicle (e.g., which may be either active or inactive), a high transmission signal frequency can be necessary to minimize latency when specific events occur, however a lower frequency signal may be suitable in other contexts of the vehicle. However, because the timeout timer employed by the receiver node is fixed, this requires the sending node to send the signal at fixed frequency, which must be set to the highest transmission frequency needed for the most critical scenarios. Thus, existing AUTOSAR E2E protocols do not enable the sender node to down-sample its transmission frequency, and thus its resource consumption, in contexts in which higher latency is appropriate.

To resolve this issue, in one or more additional embodiments, in addition to (and/or alternative to) the verification component 314, the communications manager application 1100 can include relay component 1102 that performs a transmission relay process to control transmission of protected data messages between the sender nodes and the receiver nodes. The transmission relay process enables the sender nodes to dynamically tailor (i.e., increase, decrease, or maintain) the frequencies at which they communicate their information to the receiver nodes. In other words, a sender node can vary it's execution frequency, (which correspond to the frequency at which the sender node generates, obtains or otherwise reports out the information), independent of the fixed signal transmission frequency expected at the receiver node while still ensuring E2E protection and usage of the fixed timeout timer. As a result, the sender node execution frequency can be decreased under contexts in which higher latency is acceptable, thereby decreasing consumption of resources. In addition, the sender node execution frequency can be fully or even partially event driven.

To this end, in some embodiments, the communications manager application 1100 can perform the transmission relay process or the signal verification process described above with reference to FIGS. 3-10. Thus, in some embodiments, when performing the transmission relay process as opposed to the signal verification process, the receiver nodes can be configured to receive the protected messages as sent by the communications manager application 1100 (as discussed in greater detail below) and perform signal verification in accordance with existing E2E communication protocols (e.g., foregoing usage of the signal verification process described with reference to FIGS. 3-10). In other embodiments, the communications manager application 1100 can perform both the transmission relay process and the signal verification process described above with reference to FIGS. 3-10.

With reference to FIG. 11 in view of FIGS. 1 and 2, in various embodiments, the transmission relay process performed by the relay component 1102 removes the transmission of the protected data signals from the sender nodes and places control of the transmission at the communications manager application 1100 on behalf of all (or a select subset) of the sender nodes and/or types of the protected messages. The term "transmission" as used in this context refers to sending, communicating or otherwise providing a signal to one or more receiver nodes and can involve any type of wired or wireless communication technology. In this regard, it should be appreciated that the system bust 303 and the communication framework 110 can employ any suitable wired and/or wireless communication technology to send data messages between nodes of system 100.

In accordance with the transmission relay process, as opposed to generating and sending the protected data messages in accordance with the embodiment shown in FIG. 6, the sender nodes are configured to publish the data content (i.e., the payload) to be sent in the protected data messages to a centralized memory of the system 100 (e.g., a shared memory portion of memory 106, or the like) accessible to the nodes of the system (e.g., nodes 108 and nodes 112) and the communications manager application 1100. In other words, rather than sending a protected data signal at a fixed transmission frequency to one or more receiver nodes, the sender node can be configured to publish the data content (e.g., the current/updated property value) to the centralized memory, wherein the publication frequency can be event driven, vary over time, and/or vary based on the context of the system. For instance, in furtherance to the child safety lock mechanism example above, the publication frequency of the signal information (also referred to as the data content), that is the current status of the locking mechanism (e.g., either active or inactive), may be event driven (e.g., based only on detection of a change in status), fixed (e.g., set to a defined frequency, such as every 10 milliseconds, set to a low frequency) , vary over time, and/or vary based on the context of the vehicle (e.g., an operating status, a driving status, a speed of the vehicle, the occupants of the vehicle, a location of the vehicle, etc.). To this end, the publication frequency corresponds to the execution frequency of the sender node.

The relay component 1102 further performs the transmission relay process which is executed repeatedly at a defined execution frequency for all (or a select subset) of sender nodes and/or types of protected data messages. In various embodiments, the transmission relay process comprises reading the data content from the memory, generating a protected data message comprising the data content, and sending the protected data message to the one or more receiver nodes on behalf of the sender node. In other words, the relay component 1102 operates as a relay that relays information from a sender node to one or more receiver nodes in a protected format (e.g., with an E2E header and added protection such as a counter, a CRC, encoding, or the like). The execution frequency at which the relay component 1102 performs the transmission relay process for a particular type of protected data message (e.g., corresponding to the same type of data content and/or sender node) can be fixed in accordance with the corresponding timeout timer employed by the one or more receiver nodes. For example, the execution frequency can be higher than the corresponding publication frequency (e.g., which corresponds to an up sampling of the publication frequency). In these scenarios, the data content read from the shared memory and included in some consecutive messages will remain the same despite not being updated in the shared memory by the sender node. In other implementations, the execution frequency of the transmission relay process can be the same or lower than the corresponding publication frequency (e.g., which corresponds to a down sampling of the publication frequency).

In some embodiments, in association with publishing the data content to be sent to one or more receiver nodes to the shared memory, the sender nodes can be configured to publish a timestamp with the data content that represents the time at which the data content was determined by, generated by or otherwise collected by the sender node. Alternatively, the timestamp can represent the timing of publication of the data content to the shared memory 106S. In addition, the sender node can apply a validity threshold to the data content that represents the duration of time the data content is valid. With these embodiments, the transmission relay process can further involve verifying the validity of the data content prior to sending it in a protected message. In other words, the centralized management application can be configured to only send the data content in a protected data message if it is valid. In this regard, at each repetition of the transmission relay process performed for a particular type of protected data message, the relay component 1102 reads the data content, the timestamp and the validity threshold from the shared memory. The relay component 1102 determines whether the data content is valid based on whether the time difference between the current time (e.g., the read time) and the timestamp satisfies the validity threshold. The relay component 1102 further generates and sends (e.g., using signal adapter 318) the data content in a protected data message to the corresponding receiver node or receiver nodes in response to a determination that the data content is valid, and forgoes generating and sending the protected data message in response to a determination that the data content is invalid. In this manner, the receiver nodes can proceed with detecting timeout events in accordance with their fixed timeout timers, which would reflect an error with the data content being too old as included in the shared memory. In some implementations of these embodiments, the sender nodes can tailor (e.g., adjust, increase or decrease, etc.) the validity thresholds based on their needs (e.g., different sender nodes and/or different types of protected data messages can employ different validity thresholds). In addition, a sender node can vary its validity threshold over time and/or as needed based on the context of the system (e.g., a context of the vehicle 200 in implementation involving vehicles).

In various embodiments, the relay component 1102 can perform different instances of the transmission relay process tailored to different types of protected data messages. For example, in a same or similar matter described above with respect to the receiver signal verification, the relay component 1102 can employ separate software modules or plugins (e.g., modules 1104) that are tailored to the different message types and configured to perform separate instances of the transmission relay process as tailored to the respective message types (and their respective counters, CRC mechanisms, and the like). In other words, modules 1104 can correspond to modules 316, yet configured to perform the transmission relay process as opposed to the receiver end signal verification discussed with reference to modules 316. In this regard, as opposed to executing separate threads or applications for each signal type transmission process, the centralized manager application, a single application, can execute separate software modules or plugins sequentially in time in association with performing signal transmission for all (or a select subset) of sender nodes and/or signal types, thus eliminating or minimizing the corresponding context switching overhead.

In other embodiments, the features and functionalities of the verification component 314 and the relay component 1102 can be combined into a single component comprising a plurality of modules, wherein each module is configured to preform both the transmission relay process and the receiver end signal verification process. In other words, the same execution path can handle both transmission and reception of signals between nodes, ensuring efficient processing. In addition, the separate software modules or plugins tailored to different message types are dynamically loaded shared objects that can be efficiently configured and integrated into the centralized management application as needed for the different message types. With this design, the disclosed techniques minimize system complexity in terms of scalability and adding or adjusting E2E protection mechanisms, both in terms of software architecture and in the ECU interactions.

Figure 12:
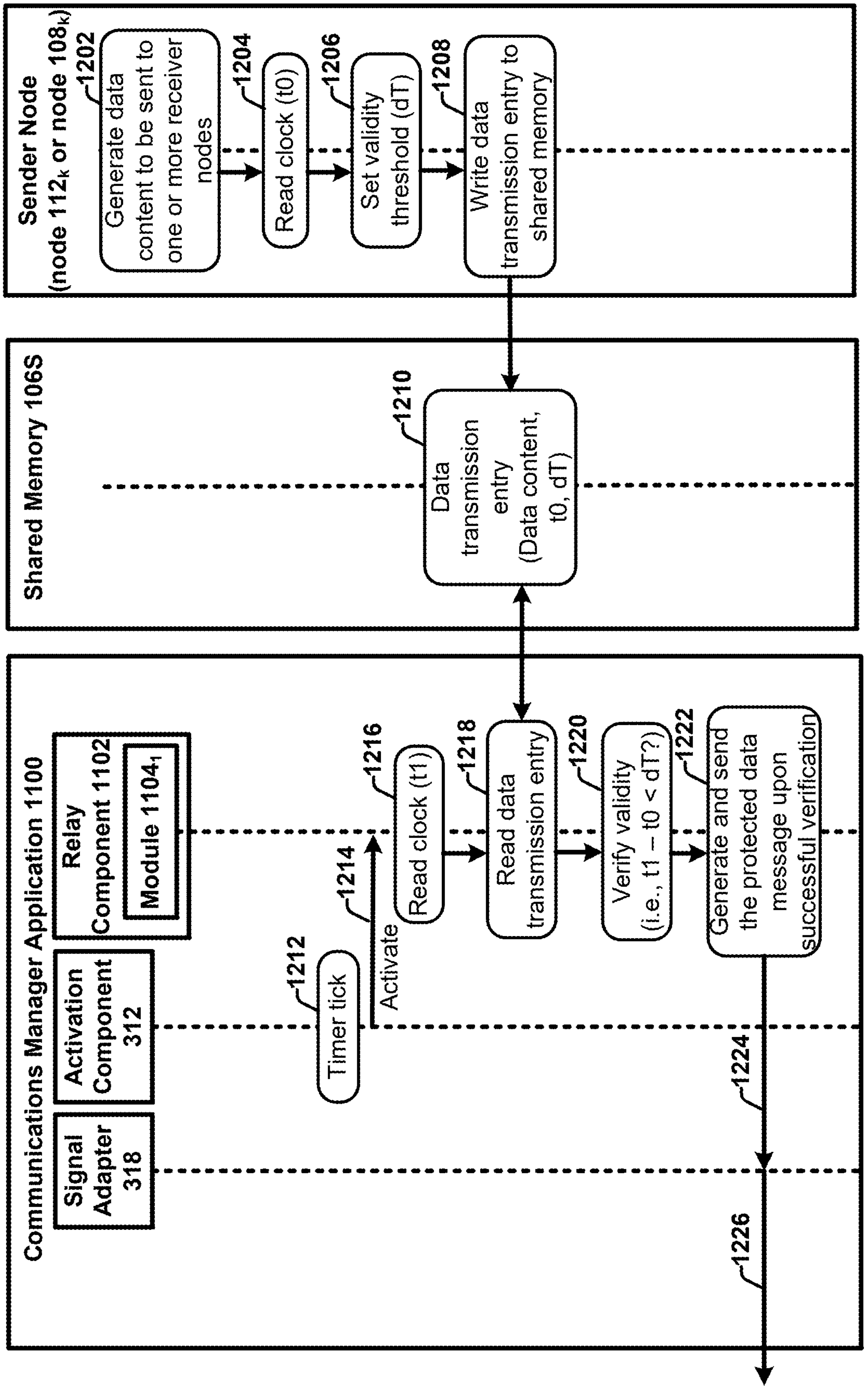
FIG. 12 illustrates a signal diagram of an example process for controlling transmission of protected data messages in accordance with an E2E communication protocol, in accordance with one or more embodiments described herein.

FIG. 12 illustrates a signal diagram of an example process for controlling transmission of protected data messages in accordance with an E2E communication protocol, in accordance with one or more embodiments described herein. With reference to FIG. 12 in view of FIGS. 1, 2 and 11, the process illustrated in FIG. 12 illustrates the functions of and interactions between the respective components of the communications manager application 1100, the shared memory 106S and a sender node in association with performing the transmission relay process. The shared memory 106S corresponds to a secure portion of memory 106 that is accessible to the nodes of system 100 (e.g., nodes 108 and nodes 112). In this example, the sender node corresponds to one of the nodes 112 or nodes 108 (identified as node 112$_k$ or node 108$_k$). For instance, as applied to embodiments in which system 100 is integrated on or within a vehicle (as shown in FIG. 2), the sender node could correspond to an ECU 212 or an application hosted by the data processing device 102. The receiver node or receiver nodes can also correspond to one or more nodes 112 and/or nodes 108.

The process illustrated in FIG. 12 begins at 1202, wherein the sender node generates (or otherwise obtains) the data content to be sent to one or more receiver nodes. The data content corresponds to information that the sender node is configured to provide the one or more receiver nodes repeatedly over time. For example, the data content may correspond to raw sensor data collected by the sender node from one or more sensors. In another example, the data content may correspond to information computed from or determined by the sender node based on processing the raw sensor data. The execution frequency at which the sender node is configured to provide the one or more receiver nodes with the information can vary over time, be event based and/or otherwise based on a context of the system. For example, in some implementations, as applied to a status update message that reflects the status of system of a vehicle, depending on the vehicle system and the criticality of the information, the sender node may be configured to provide the one or more receiver nodes the status update message reporting the current status of the vehicle system at a high frequency (e.g., every 10 milliseconds), a low frequency (e.g., every 500 milliseconds), conditionally based on occurrence of a predefined trigger event (e.g., a change to the status, a change to the context of the vehicle, etc.) and/or at different frequencies over time based on the context of the vehicle. Likewise, although the process in FIG. 12 is described with reference to a single sender node, in the context of the entire system 100, the execution frequencies of different sender nodes (e.g., which can include different nodes 112 and different nodes 108) and/or employed for different types of data content can vary.

In this regard, the process illustrated in FIG. 12 begins at 1202, wherein the sender node initiates execution of providing requisite data content to the one or more receiver nodes, which may be in response to a trigger event and/or in accordance with a predefined execution frequency. In accordance with the transmission relay process, because the execution at the sender node involves publishing the data content to the shared memory 106S at each execution event, the execution frequency of the sender node is also referred to has the publication frequency (i.e., the sender node execution frequency is equal to the sender node publication frequency). At 1204, the sender node reads a clock of the system 100 (e.g., clock 322, or another monotonic clock accessible to the nodes of the system 100) to generate a timestamp (t0) for the data content. The timestamp reflects the timing of generation or collection of the data content by the sender node. At 1206, the sender node sets a validity threshold (dT) for the data content. The validity threshold corresponds to the duration of time the data content is considered valid. The validity threshold can be tailored based on the data content, the criticality associated with the data content, and/or the sender node. In addition, the validity threshold applied by the same sender node and/or for the same type of data content can vary over time and/or based on the context of the system (e.g., or a context of the vehicle in implementation in which the system 100 is incorporated on or within a vehicle).

At 1208, the sender node writes a data transmission entry 1210 to the shared memory 106S. The data transmission entry includes the data content, the timestamp and the validity threshold. In other words, the sender node publishes the data content along with the timestamp and the validity threshold to the shared memory 106S. With these embodiments, the shared memory 106S can include or correspond to a dynamic information index that stores outgoing data to be sent to respective receiver nodes of the system 100 as provided by respective sender nodes of the system 100. In various embodiments, each sender node and/or different types of data content (provided by the same sender node) can be associated with a unique identifier (ID) in the dynamic index. Each time a sender node publishes a new data transmission entry to the shared memory 106S, the sender node replaces or removes the previous data transmission entry for the corresponding ID. For example, as applied to a status update regarding the status of the child safety locking mechanism of the vehicle sent by a corresponding ECU, the dynamic index can include a cell corresponding to the child safety locking mechanism status message, as identified via a unique message ID. Each time the ECU generates a new status update (e.g., reporting the current status of the child safety locking mechanism), at 1208, the ECU would replace the previous entry in the cell with the current entry. In other words, the sender node is configured to repeatedly publish updated data transmission entries to the shared memory for the same type of data content, wherein each updated data transmission entry comprises an updated or new version (new or updated property value) of the data content. In some implementations, the actual data content published, that is the property value (i.e., the current status), may remain the same from one data transmission entry to the next. In other words, the sender node may be configured to publish an updated data transmission entry even if the actual property value of the data content has not changed from the previous entry.

The transmission relay process performed by the communications manager application 1100 can involve activation component 312, relay component 1202 and signal adapter 318. The transmission relay process begins at 1212 with a timer click observed or detected by the activation component 312. The timer tick at 1212 corresponds to an event timer that controls the execution frequency of the relay component 1202 and the transmission relay process. In this regard, in response to the timer tick at 1212, the activation component 312 activates the transmission relay process by the relay component 1202. For example, in some implementations, the execution frequency may be set to a high execution frequency, such as every 10 milliseconds, which may be tailored for different types of messages and/or the same for all types of messages. In this example, the activation component 312 is configured to monitor the clock 322 and/or otherwise employ an event timer set to every 10 milliseconds to control activation of the transmission relay processes. In other words, the timer tick at 1212 may be set to tick every 10 milliseconds or another predefined activation rate.

In some embodiments, in association with activating the transmission relay process, the relay component 1102 executes a module $1104_1$ of the respective modules 1104 configured to perform an instance of the verification process for the particular message type. In other words, each module of modules 1104 can be configured to handle transmission relay for a separate ID represented in the dynamic information index. In this regard, the transmission relay process illustrated in FIG. 12 is described with reference to relaying one type of protected data message originating from a single sender node (e.g., a status update message from a specific system of the vehicle). It should be noted that in embodiments in which the relay component 1202 is configured to activate the transmission relay process for all different types of protected data messages at the same activation rate (e.g., every 10 milliseconds or the like), that in response to the timer tick at 1202, the activation component 312 can direct the relay component 1102 to activate all modules 1104 respectively configured to handle data transmission for the different types of protected data messages at the same time. In some implementations of these embodiments, the relay component 1102 can execute all modules 1104 to perform their respective transmission relay processes for their corresponding message types simultaneously or in parallel. In other implementations of the embodiments, the relay component 1102 can execute respective ones of the modules 1104 sequentially in time.

In this regard, steps 1216-1226 correspond to functions performed by a single module $1104_1$. It should be appreciated that in an actual runtime environment, multiple modules 1104 can be activated at the timer tick 1202 and perform operations similar to operations 1216-1226 in association with relaying their respective protected data message types. In this regard, the respective modules 1104 can be likened to separate relay channels, wherein each channel performs an instance of a transmission relay process to control sending protected data messages to indicated receiver nodes comprising content read from the shared memory 106S, and wherein each channel processes protected data messages of a different type (e.g., sent from a different sender node and/or comprising a different type of data content or information). In some embodiments, the respective modules 1104 can employ the same execution or activation frequency and the activation component can activate or execute the respective modules 1104 sequentially or in parallel. For example, in an embodiment, the execution frequency applied for all (or select subset) of the modules 1104 can be set to a high frequency (e.g., every 10 milliseconds). With these embodiments, regardless of the publication frequencies of the respective data content that the modules are configured to process, which can vary for different sender nodes, different types of data content, vary over time and/or based on a context of the system 100, the actual transmission frequencies at which the protected data messages comprising the data content are sent by the respective modules 104 can be consistently high.

With this context in mind, upon activation, at 1216 module $1104_1$ reads the clock (e.g., clock 322) and generates a timestamp (t1) representing the current time. At 1218, module $1104_1$ reads the data transmission entry 1210 (e.g., the data transmission entry corresponding to the message ID that the module $1204_1$ is configured to handle) from the shared memory 106. In this regard, module $1104_1$ obtains the data content, the initial timestamp t0 and the validity threshold dT.

At 1220, the module $1104_1$ determines whether the data content is valid based on whether the different between the initial timestamp (t0) and the current timestamp (t1) satisfies the validity threshold (e.g., based on whether $t1-t0<d$). In various embodiments, if the validity threshold is not satisfied, meaning the data content published for the most recent data transmission entry for the message type is too old, then the module $1104_1$ ends the current iteration of the transmission relay process and does not generate or send the data content in a protected data message to the one or more receiver nodes. However, if at 1220 module $1104_1$ determines that the data content is valid, then at 1222, module $1104_1$ generates and sends the protected data message (comprising the data content read at 1218) to the one or more receiver nodes to which it is directed. In this regard, reference to generating a protected data message herein involves packaging the data content as read from the shared memory in a protected message format in accordance with a defined E2E protocol such as AUTOSAR E2E or a similar protocol. For example, generating a protected data message can include adding an E2E header to the data content and adding one or more E2E protection mechanisms, such as a counter, a CRC, encryption, or the like. As indicated via arrows 1224 and 1226, in some embodiments, module $1104_1$ can send the protected data message via the signal adapter 318. In some embodiments, information identifying respective receiver nodes to which respective protected data messages are to be sent to can be associated with the corresponding message IDs in the shared memory 106S. Additionally, or alternatively, the respective modules 104 can be preconfigured to send their protected data messages to specific receiver nodes.

In some embodiments, one or more of the sender nodes may not set a validity threshold for their data content. For example, this could apply when the last data reported by the sender node is always considered safe and valid. In these situations, the corresponding module 1104 will skip the verification step at 1220 and assume the data content is valid, regardless of age, based on exclusion of the validity threshold from the data transmission entry.

Of particular importance, in accordance with the process illustrated in FIG. 12, for a specific type of protected data message, the publication frequency of the sender node and the execution frequency of the transmission relay process for that specific type of protected data message (e.g., as performed by module $\mathbf{1104}_1$) can be different. For example, in some implementations, the publication frequency can be lower than the execution frequency. In other implementations, the publication frequency can be higher than the execution frequency. In another example, in some implementations, the publication frequency can be event based and the execution frequency can be a defined repetition rate (e.g., every 10 milliseconds, every 100 milliseconds, etc.). Still in other implementations, the publication frequency can vary over time and/or based on a context of the system, while the execution frequency of the relay process can remain fixed. For example, as applied to a status update message for the child safety locking mechanism of a vehicle, in one context of the vehicle, the sender node may be configured to publish a new data transmission entry at a high publication frequency, while in another context of the vehicle, the sender node may be configured to publish a new data transmission entry at a low publication frequency. The context of the vehicle can reflect a variety of different contextual factors, such as driving operations and events associated with the vehicle, a location of the vehicle, a time of day, weather conditions, road conditions, occupants of the vehicle, preferences of the occupants, and so on.

In addition, the publication frequencies employed by respective sender nodes and/or for respective message types can vary while the respective execution frequencies of the transmission relay process for the respective sender nodes and/or for the respective message types can be the same or different.

Figure 13:
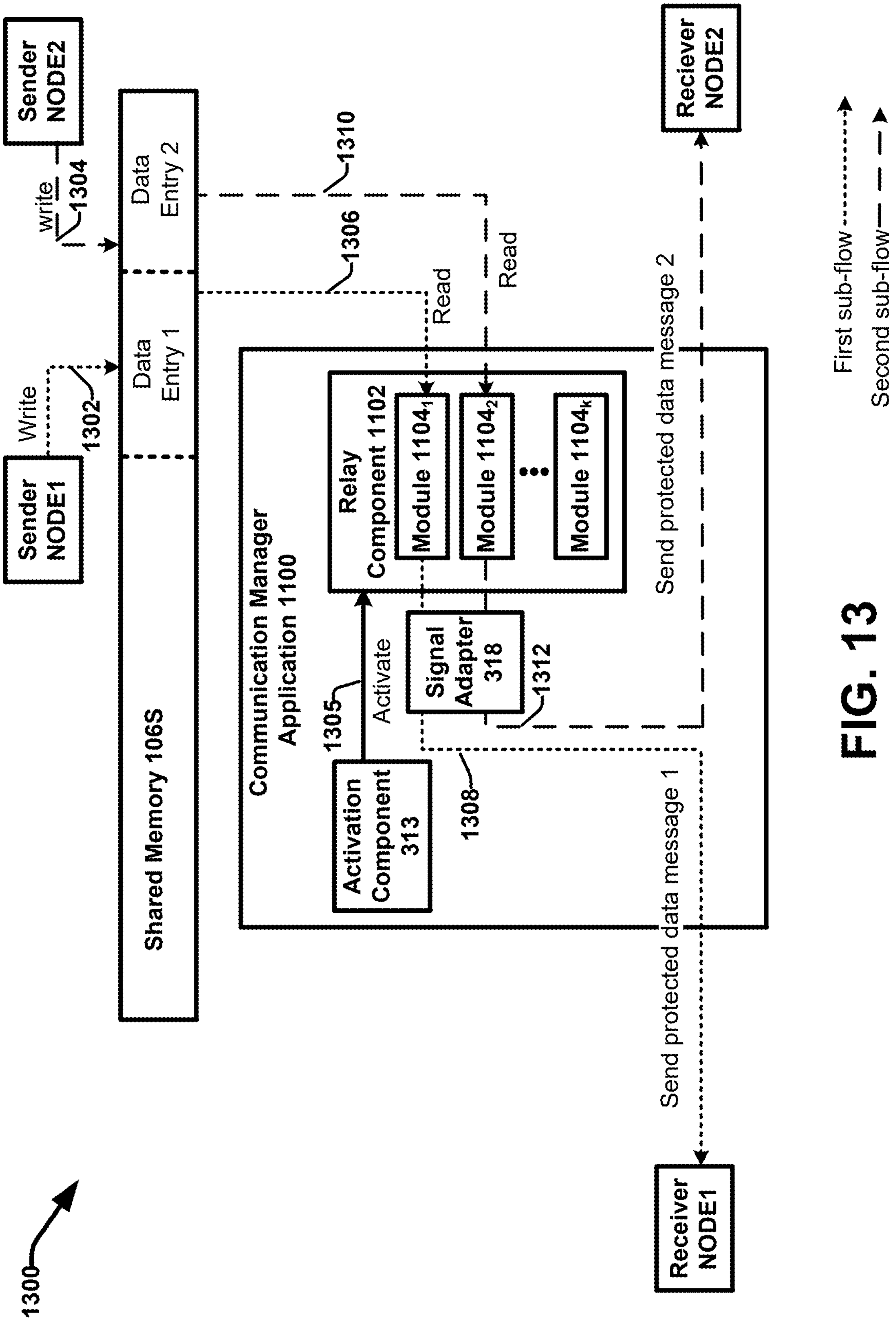
FIG. 13 illustrates an example communication flow amongst nodes of a communication system employing a centralized transmission relay protocol, in accordance with one or more embodiments described herein.

FIG. 13 illustrates an example communication flow 1300 amongst nodes of a communication system (e.g., system 100) employing a centralized transmission relay protocol, in accordance with one or more embodiments described herein. With reference to FIG. 13 in view of FIGS. 1, 2, 11 and 12, communication flow 1300 illustrates the functions of and interactions between the respective components of the communications manager application 1100, the shared memory 106S, two sender nodes, and two receiver nodes. More particularly, flow 1300 illustrates how generation and sending of protected data messages can be removed from the sender nodes and handled be a single, centralized application (communications manager application 1100) on behalf of all (or a select subset) of sender nodes in accordance with the disclosed transmission relay process.

In this example, the sender nodes are respectively identified as sender node 1 and sender node 2, and the receiver nodes are respectively identified as receiver node 1 and receiver node 2. The receiver nodes and the sender nodes can correspond to any of the nodes 108 and/or nodes 112. As illustrated in FIG. 13, flow 1300 includes two sub-flows, a first sub-flow associated with protected data message 1, indicated via the small, dashed arrow lines, and a second sub-flow associated with protected data message 2, indicated via the larger, dashed arrow lines.

In accordance with flow 1300 and the first sub-flow, at 1302 sender node 1 writes a data transmission entry (data entry 1) to the shared memory 106S. The writing can be responsive to a trigger event and/or in accordance with a predefined, first publication frequency for the type of message corresponding to data entry 1. The first publication frequency can also vary over time and/or vary based on the context of the system 100. The data transmission entry 1 includes data content 1 to be sent to receiver node 1. In some embodiments, the data entry 1 can also include an initial timestamp indicating the timing of origin of data content 1 and a first validity threshold for data content 1. In some embodiments, the first validity threshold can be static. In other embodiments, the first validity threshold can be dynamic and tailored by the sender node over time as needed based on the context of the system 100.

In accordance with flow 1300 and the second sub-flow, at 1304 sender node 2 writes a data transmission entry (data entry 2) to the shared memory 106S. The writing can be responsive to a trigger event and/or in accordance with a predefined, second publication frequency for the type of message corresponding to data entry 2. The second publication frequency can also vary over time and/or vary based on the context of the system 100. The second publication frequency can also be different relative to the first publication frequency. The data transmission entry 2 includes data content 2 to be sent to receiver node 2. In some embodiments, data entry 2 can also include an initial timestamp indicating the timing of origin of data content 2 and a second validity threshold for data content 2. In some embodiments, the second validity threshold can be static. In other embodiments, the second validity threshold can be dynamic and tailored by the sender node over time as needed based on the context of the system 100. The second validity threshold can also vary relative to the first validity threshold.

At 1305, the activation component 312 activates execution of the relay component 1102 and the respective instances of the transmission relay process performed by respective modules $\mathbf{1104}_{1\text{-}k}$. (e.g., in response to an activation timer tick or the like). The activation frequency or execution frequency of the relay component 1102 and the respective instances of the transmission relay process performed by respective modules $\mathbf{1104}_{1\text{-}k}$ can be the same or different. In some embodiments, the execution frequency can be set to a high frequency, such as the highest frequency required for safety critical communications and scenarios (e.g., every 10 milliseconds or another high frequency) for any type of protected data message. In this regard, in some embodiments, the execution frequency of the transmission relay process can be higher than the publication frequencies used by one or more of the sender nodes.

The relay component 1102 can execute the respective modules $\mathbf{1104}_{1\text{-}k}$. sequentially or in parallel upon each activation or execution cycle. In this example, module $\mathbf{1104}_1$ is configured to handle transmission relay for data content corresponding to data entry 1 and module $\mathbf{1104}_2$ is configured to handle transmission relay for data content corresponding to data entry 2.

Continuing with the first sub-flow, at 1306 module $\mathbf{1104}_1$ reads the data entry 1 from the shared memory 106S. In implementations in which data entry 1 includes a timestamp and a validity threshold, module $\mathbf{1104}_1$ first performs a validity check to determine whether the data content is fresh enough to send. That is, module $\mathbf{1104}_1$ determines whether the data content is valid based on whether the time difference between the initial timestamp and the current time is less than a threshold time difference. If so, the data content is considered valid, and at 1308, module $\mathbf{1104}_1$ generates a protected message 1 comprising the data content (i.e., in a protected format) and sends (e.g., via signal adapter 318) the protected data message 1 to receiver node 1 (e.g., via communication framework 110, including system bus 303).

However, if the data content 1 is deemed invalid, module $1104_1$ does not generate or send the protected data message 1. Likewise, in implementations in which data entry 1 does not include a validity threshold, at 1308, module $1104_1$ generates the protected message 1 comprising the data content 1 (i.e., in a protected format) and sends (e.g., via signal adapter 318) the protected data message 1 to receiver node 1 (e.g., via communication framework 110, including system bus 303).

Continuing with the second sub-flow, at 1310 module $1104_2$ reads the data entry 2 from the shared memory 106S. In implementations in which data entry 2 includes a timestamp and a validity threshold, the module $1104_2$ first performs a validity check to determine whether the data content is fresh enough to send. That is, module $1104_2$ determines whether the data content is valid based on whether the time difference between the initial timestamp and the current time is less than a threshold time difference. If so, the data content is considered valid, and at 1212, module $1104_2$ generates a protected message 2 comprising the data content 2 (i.e., in a protected format) and sends (e.g., via signal adapter 318) the protected data message 2 to receiver node 2 (e.g., via communication framework 110, including system bus 303). However, if the data content is deemed invalid, module $1104_2$ does not generate or send the protected data message 2. Likewise, in implementations in which data entry 2 does not include a validity threshold, at 1312, module $1104_2$ generates the protected message 2 comprising the data content 2 (i.e., in a protected format) and sends (e.g., via signal adapter 318) the protected data message 2 to receiver node 2 (e.g., via communication framework 110, including system bus 303).

Figure 14:
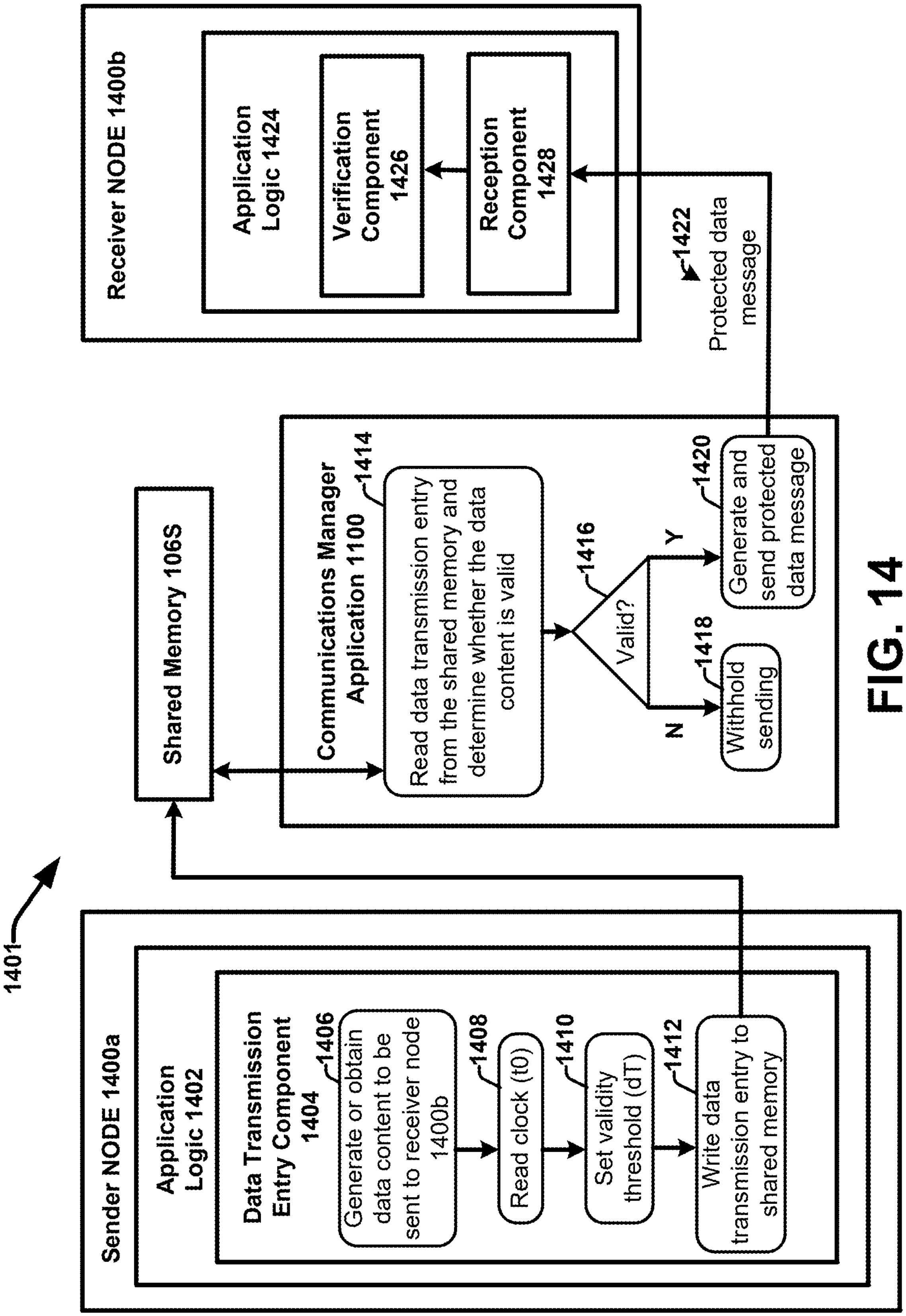
FIG. 14 illustrates another example communication flow between a sender node and a receiver node, in accordance with one or more embodiments described herein.

FIG. 14 illustrates another example communication flow 1401 between a sender node 1400*a* and a receiver node 1400*b*, in accordance with the transmission relay protocol described herein. With reference to FIG. 14 in view of FIGS. 1, 2, 6, and 11-13, in various embodiments, sender node 1400 can correspond to any one of the nodes 112 or nodes 108 of system 100. Likewise, receiver node 1400*b* can correspond to any different one (excluding the one used for the sender node 1400*a*) of the nodes 112 or nodes 108 of system 100. As shown in FIG. 14, the sender node 1400*a* and the receiver node 1400*b* can respectively include computer-executable components that can be stored in at least one memory and executed by at least one processing unit coupled to the at least one memory. In some implementations in which the sender node 1400*a* or the receiver node 1400*b* corresponds to one of the nodes 108 (e.g., an application hosted by the core data processing device 102) the memory can correspond to memory 106 and the processing unit can correspond to processing unit 104. In other implementations in which the sender node 1400*a* or the receiver node 1400*b* corresponds to one of the nodes 112 external to the core data processing device 102, the memory and the processing unit can include a separate memory and/or processing unit coupled to the respective nodes 112, examples of which are illustrated and described with reference to FIG. 19.

In accordance with this embodiment, the computer-executable components associated with the sender node 1400*a* include application logic 1402, which includes a data transmission entry component 1404. In comparison, with reference briefly to FIG. 6, in accordance with this embodiment and the transmission relay process, the sender node 1400*a* application logic 1402 is different from the sender node application logic 602 and excludes the protected message generator 604. In other embodiments, the sender node 1400*a* can include application logic 1402, application logic 602 and/or protected message generator 604. Likewise, the computer-executable components associated with the receiver node 1400*b* include application logic 1424 which differs from application logic 606. For example, application logic 1424 includes reception component 1428 and verification component 1426. In this regard, different from receiver node 600*b*, in accordance with the transmission relay protocol, receiver node 1400*b* is configured to receive protected data messages from the communications manager application 1100 as opposed to reading already verified protected message data content from the shared memory 106S. In other embodiments however, the receiver node 1400*b* can be configured to employ a combination of both application logic 1424 and application logic 606.

Communication flow 1401 initiates at the sender node 1400 *a* at 1406, wherein the data transmission entry component 1404 logic generates or obtains data content to be sent to the receiver node 1400*b* (e.g., via the communication framework 110 and/or system bus 303) in a protected data message. In accordance with the disclosed techniques, the data content corresponds to a property value that can change over time of operation of the system 100 and the data transmission entry component 1404 can be configured to generate or obtain the current property value for reporting to the receiver node 1400*b* in accordance with a defined execution frequency (e.g., every N milliseconds) and/or in response to a trigger event. For example, the data content may correspond to a status or state value of an onboard system of a vehicle 200 as determined by application logic 1402 based on relevant sensor data received by the onboard system. At 1408, the data transmission entry component reads the clock to generate a timestamp (t0) for the data content and sets a validity threshold (dT) for the data content. The validity threshold can be predefined and tailored to the type of the protected data message content and/or be tailored by the data transmission entry component 1404 based on the context of the system.

At 1412, the data transmission entry component 1404 writes a data transmission entry for the protected message to the shared memory 1412. The data transmission entry can include a message identifier for the protected message (e.g., based on the sender node and/or the particular type of data content being sent), the data content (that is the current property value), the timestamp (t0) and the validity threshold (dT). As discussed above, in association with writing the current data transmission entry to the shared memory 1412, the sender node 1400*a* (or the shared memory 106S) replaces the previous entry for the protected message with the current entry in the shared memory 106S.

At 1414, the communications manager application 1100 reads the data transmission entry from the shared memory 106S and determines whether the data content is valid (e.g., via the relay component 1102) in accordance with the transmission relay process. As discussed above, the relay component 1102 can be configured to execute the transmission relay process repeatedly at a defined execution frequency as triggered by a timer or the like (e.g., every 10 milliseconds or another execution frequency). At each execution of the transmission relay process, the relay component 1102, or more particularly a module 104 tailored to handle the particular protected message, reads the data transmission entry from the shared memory and determines whether the data content is valid based on whether the time difference between the current time (t1) and the timestamp (t0) satisfies the validity threshold. If at 1416 the module 104 determines that the data content is invalid, then process 1401 proceeds to 1418, wherein the communications manager application 1100 withholds generating and sending the protected data message 1422 comprising the data content.

However, if the data content is determined to be valid at 1416, then process proceeds to 1420, wherein the communications manager application 1100 generates and sends the data content to the receiver node 1400*b* in a protected data message 1422 (e.g., via communication framework 110 including system bus 303). For example, the protection mechanism employed by the communication manger application 1000 to form the protected data message can include or correspond to a protection mechanism configured in accordance with a secure data communications protocol employed by the system (e.g., AUTOSAR E2E or the like). For instance, the protection mechanism may involve adding a counter value to the message, adding a CRC, and/or another suitable protection mechanism that enables the message to be verified by the receiver node (e.g., using verification component 1426).

The receiver node 1400*b* receives the protected data message 1422 (via reception component 1428). In accordance with this embodiment, the receiver node 1400*b* include verification component 1426 which is configured to essentially deprotect the protected data message and safely read the data content included therein for consumption by the application logic 1424. For example, the verification component 1426 can verify the validity of the data content prior to extraction based on a counter added, a CRC check or the like, in accordance with existing E2E protocols.

Figure 15:
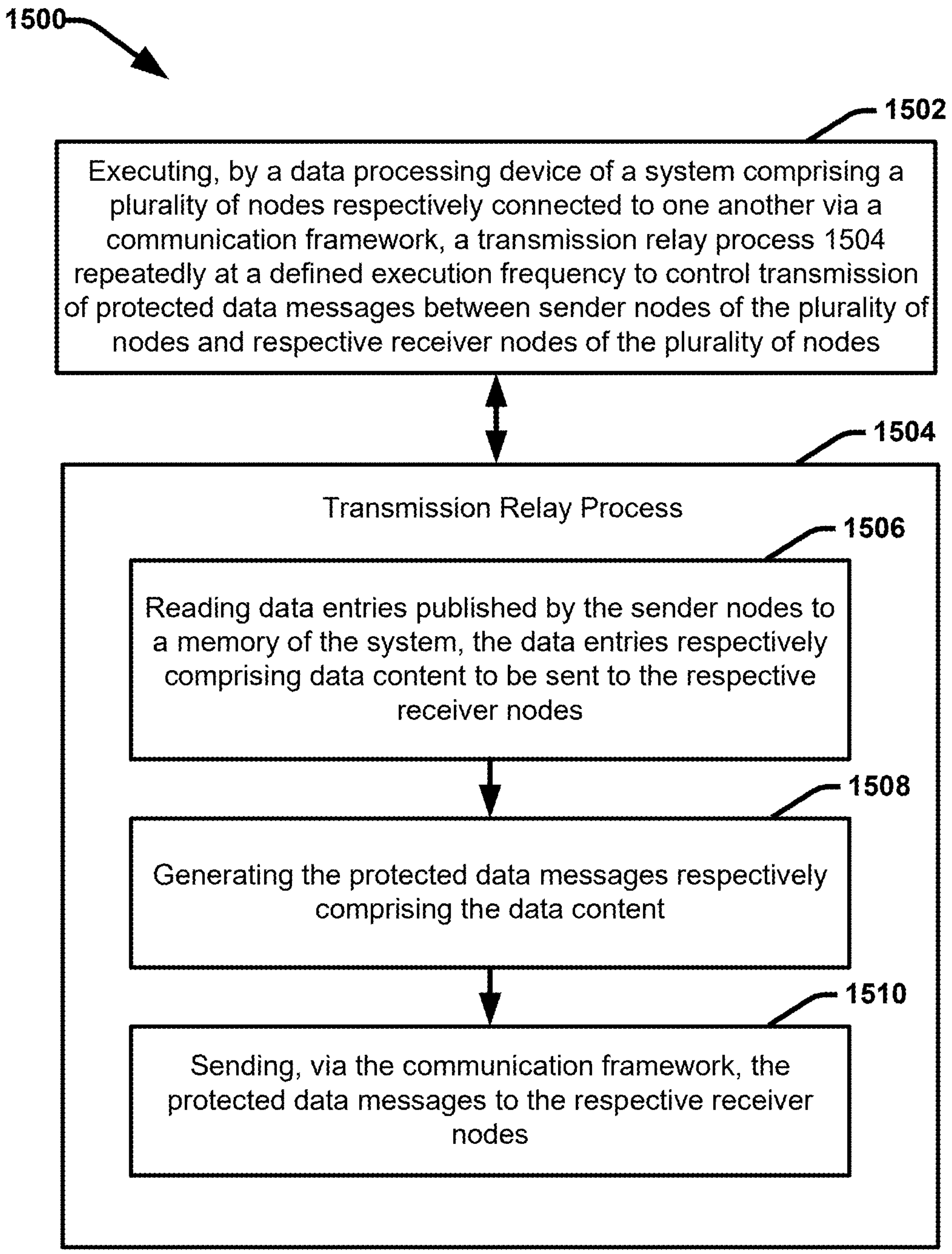
FIG. 15 illustrates a block flow diagram of an example, non-limiting computer-implemented method for controlling transmission of protected data messages in accordance with an E2E communication protocol, in accordance with one or more embodiments described herein.

FIG. 15 illustrates a block flow diagram of an example, non-limiting computer-implemented method 1400 for controlling transmission of protected data messages in accordance with an E2E communication protocol, in accordance with one or more embodiments described herein. Method 1500 comprises, at 1502, executing, by a data processing device (e.g., data processing device 102) of a system comprising a plurality of nodes respectively connected to one another via a communication framework (e.g., system 100), a transmission relay process 1504 repeatedly at a defined execution frequency to control transmission of protected data messages between sender nodes of the plurality of nodes and respective receiver nodes of the plurality of nodes (e.g., via relay component 1102). The transmission relay process 1504 comprises, at 1506, reading data entries published by the sender nodes to a memory of the system, the data entries respectively comprising data content to be sent to the respective receiver nodes. The transmission relay process 1504 further comprises, at 1508, generating the protected data messages respectively comprising the data content, at 1510, sending, via the communication framework, the protected data messages to the respective receiver nodes.

In accordance with method 1500, the data entries are published by the sender nodes to the memory (e.g., shared memory 106S) of the system repeatedly in accordance with respective publication frequencies employed by the sender nodes. In various embodiments, at least some of the publication frequencies are different from one another. Additionally, or alternatively, at least some of the publication frequencies are different (e.g., lower or higher) relative to the defined execution frequency. In addition, at least some of the publication frequencies vary over time and/or based on the context of the system. For example, in embodiment wherein the system is integrated on or within a vehicle, and the context of the system can correspond to a vehicle context of the vehicle. In some implementations of this embodiment, the plurality of nodes comprise ECUs (e.g., ECUs 212) associated with different onboard systems of the vehicle and different applications (e.g., nodes 108) executed by the data processing device. In some cases, the executing comprises executing different instances of the transmission relay process, the different instances respectively tailored to different types of the data content or different sender nodes (e.g., as performed by respective modules 1104).

Figure 16:
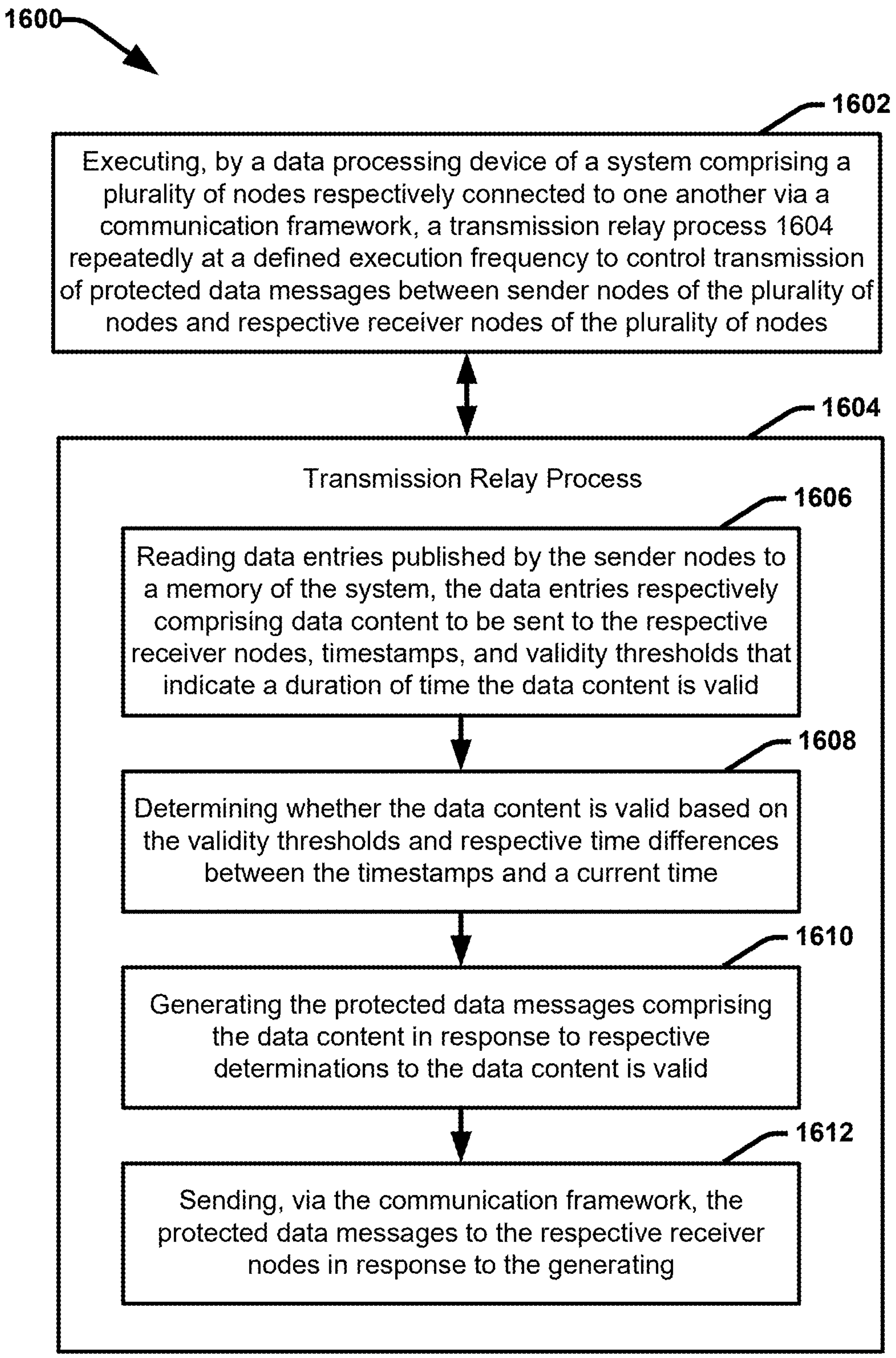
FIG. 16 illustrates a block flow diagram of another example, non-limiting computer-implemented method for controlling transmission of protected data messages in accordance with an E2E communication protocol, in accordance with one or more embodiments described herein.

FIG. 16 illustrates a block flow diagram of another example, non-limiting computer-implemented method 1600 for controlling transmission of protected data messages in accordance with an E2E communication protocol, in accordance with one or more embodiments described herein. Method 1600 comprises, at 1602, executing, by a data processing device (e.g., data processing device 102) of a system comprising a plurality of nodes respectively connected to one another via a communication framework (e.g., system 100), a transmission relay process 1604 repeatedly at a defined execution frequency to control transmission of protected data messages between sender nodes of the plurality of nodes and respective receiver nodes of the plurality of nodes (e.g., via relay component 1102).

The transmission relay process 1604 comprises, at 1606, reading data entries published by the sender nodes to a memory of the system, the data entries respectively comprising data content to be sent to the respective receiver nodes, timestamps, and validity thresholds that indicate a duration of time the data content is valid. The transmission relay process 1604 further comprises, at 1508, determining whether the data content is valid based on the validity thresholds and respective time differences between the timestamps and a current time. At 1610, the transmission relay process comprises generating the protected data messages comprising the data content in response to respective determinations to the data content is valid. At 1612, method 1600 comprises sending, via the communication framework, the protected data messages to the respective receiver nodes in response to the generating.

In accordance with some embodiments of method 1600, at least some of the validity thresholds vary over time. For example, in an implementation in which 2, the system is integrated on or within a vehicle 200, and at least some of the validity thresholds vary over time based on the context of the vehicle.

In accordance with method 1600, the data entries are published by the sender nodes to the memory (e.g., shared memory 106S) of the system repeatedly in accordance with respective publication frequencies employed by the sender nodes. In various embodiments, at least some of the publication frequencies are different from one another. Additionally, or alternatively, at least some of the publication frequencies are different (e.g., lower or higher) relative to the defined execution frequency. In addition, at least some of the publication frequencies vary over time and/or based on the context of the system. For example, in embodiment wherein the system is integrated on or within a vehicle, and the context of the system can correspond to a vehicle context of the vehicle. In some implementations of this embodiment, the plurality of nodes comprise ECUs (e.g., ECUs 212) associated with different onboard systems of the vehicle and different applications (e.g., nodes 108) executed by the data processing device. In some cases, the executing comprises executing different instances of the transmission relay process, the different instances respectively tailored to different types of the data content or different sender nodes (e.g., as performed by respective modules 1104).

Figure 17:
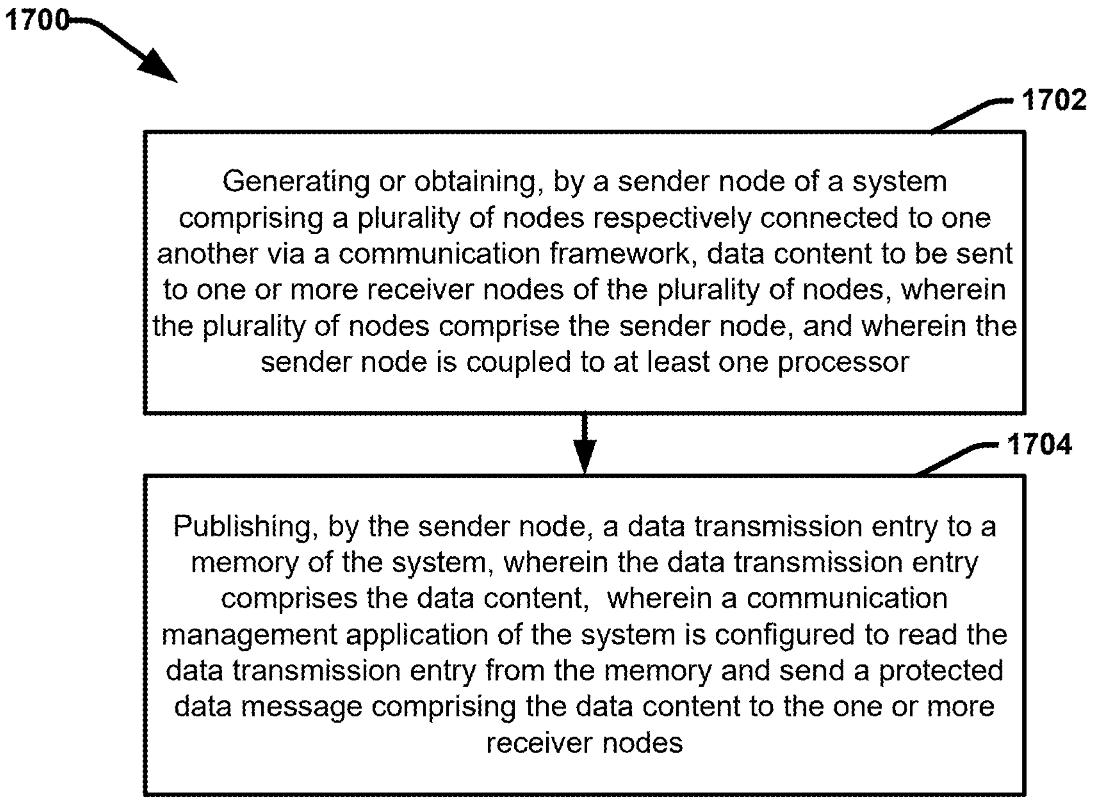
FIG. 17 illustrates a block flow diagram of another example, non-limiting computer-implemented method for controlling transmission of protected data messages in accordance with an E2E communication protocol, in accordance with one or more embodiments described herein.

FIG. 17 illustrates a block flow diagram of another example, non-limiting computer-implemented method 1700 for controlling transmission of protected data messages in accordance with an E2E communication protocol, in accordance with one or more embodiments described herein. Method 1700 corresponds to another example computer-implemented method performed by a sender node of system 100 (e.g., sender node 1400*a* or the like). Method 1700 comprises, at 1702, generating or obtaining, by a sender node (e.g., sender node 1400*a*) of a system (e.g., system 100) comprising a plurality of nodes respectively connected to one another via a communication framework, data content to be sent to one or more receiver nodes of the plurality of nodes, wherein the plurality of nodes comprise the sender node, and wherein the sender node is coupled to at least one processor. At 1704, method 1700 comprises publishing, by the sender node, a data transmission entry to a memory of the system, wherein the data transmission entry comprises the data content, and wherein a communication management application (e.g., communications manager application 1100) of the system is configured to read the data transmission entry from the memory and send a protected data message comprising the data content to the one or more receiver nodes.

In some implementations of method 1700, the data transmission entry further comprises a timestamp and a validity threshold, and wherein the communication management application is configured to send the protected data message comprising the data content to the one or more receiver nodes in response to verifying a validity of the data content based on a time difference between the timestamp and a read time at which the data transmission entry is read by the communication management application satisfying the validity threshold. With these implementations, the communication management application is configured to not send the protected data message comprising the data content to the one or more receiver nodes in response to determining the data content is invalid based on the time difference failing to satisfy the validity threshold.

In accordance with method 1700, the generating or obtaining comprises repeatedly generating or obtaining updated versions of the data content, and wherein the publishing comprises repeatedly publishing updated data transmission entries comprising the updated versions. In other words, the sender node is configured to repeatedly provide the one or more receiver nodes with the same type of message (e.g., a status update message or the like) and/or corresponding data content over time, each time, replacing the previous data transmission entry with the current data transmission entry. In some cases, the publishing the data transmission entry and the repeatedly publishing the updated data entries is responsive to a trigger event.

In some implementations, the communication management application is configured to repeatedly read a current version of the data content data from the memory and repeatedly send the protected data message comprising the current version of the data content to the one or more receiver nodes, and wherein a first frequency at which the sender node is configured to repeatedly publish the updated data transmission entries is different relative to a second frequency at which the communication management application is configured to repeatedly send the protected data message. In some cases, the first frequency is lower than the second frequency. Additionally, or alternatively, the first frequency is based on occurrence of a trigger event. Additionally, or alternatively, the first frequency varies based on a context of the system and wherein the second frequency is fixed.

Figure 18:
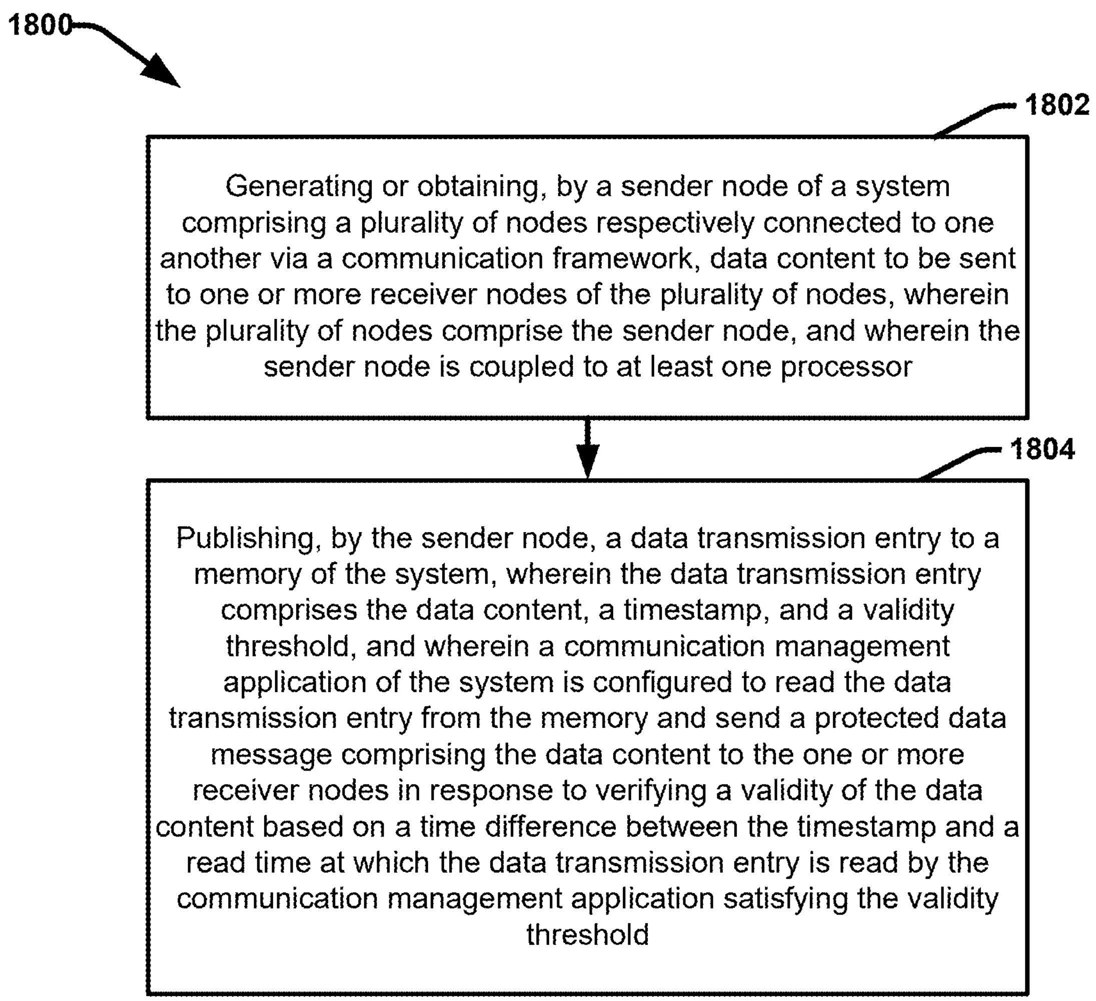
FIG. 18 illustrates a block flow diagram of another example, non-limiting computer-implemented method for controlling transmission of protected data messages in accordance with an E2E communication protocol, in accordance with one or more embodiments described herein.

FIG. 18 illustrates a block flow diagram of another example, non-limiting computer-implemented method 1800 for controlling transmission of protected data messages in accordance with an E2E communication protocol, in accordance with one or more embodiments described herein. Method 1800 corresponds to another example computer-implemented method performed by a sender node of system 100 (e.g., sender node 1400*a* or the like). Method 1800 comprises, at 1802, generating or obtaining, by a sender node of a system comprising a plurality of nodes respectively connected to one another via a communication framework (e.g., system 100), data content to be sent to one or more receiver nodes of the plurality of nodes, wherein the plurality of nodes comprise the sender node, and wherein the sender node is coupled to at least one processor (e.g., processing unit 104 or another processor). At 1804, method 1800 comprises publishing, by the sender node, a data transmission entry to a memory of the system (e.g., shared memory 106S), wherein the data transmission entry comprises the data content, a timestamp, and a validity threshold, and wherein a communication management application of the system (e.g., communications manager application 1100) is configured to read the data transmission entry from the memory and send a protected data message comprising the data content to the one or more receiver nodes in response to verifying a validity of the data content based on a time difference between the timestamp and a read time at which the data transmission entry is read by the communication management application satisfying the validity threshold.

One or more embodiments can be a system, a method, and/or a computer program product at any possible technical detail level of integration. The computer program product can include a computer readable storage medium (or media) having computer readable program instructions thereon for causing a processor to carry out aspects of the present technology.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. To this end, a computer readable storage medium, a machine-readable storage medium, or the like as used herein can include a non-transitory computer readable storage medium, a non-transitory machine-readable storage medium, and the like.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technology can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present technology.

Aspects of the present technology are described herein with reference to flowchart illustrations and/or block diagrams of methods, apparatus (systems), and computer program products according to embodiments of the technology. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 19, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 19:
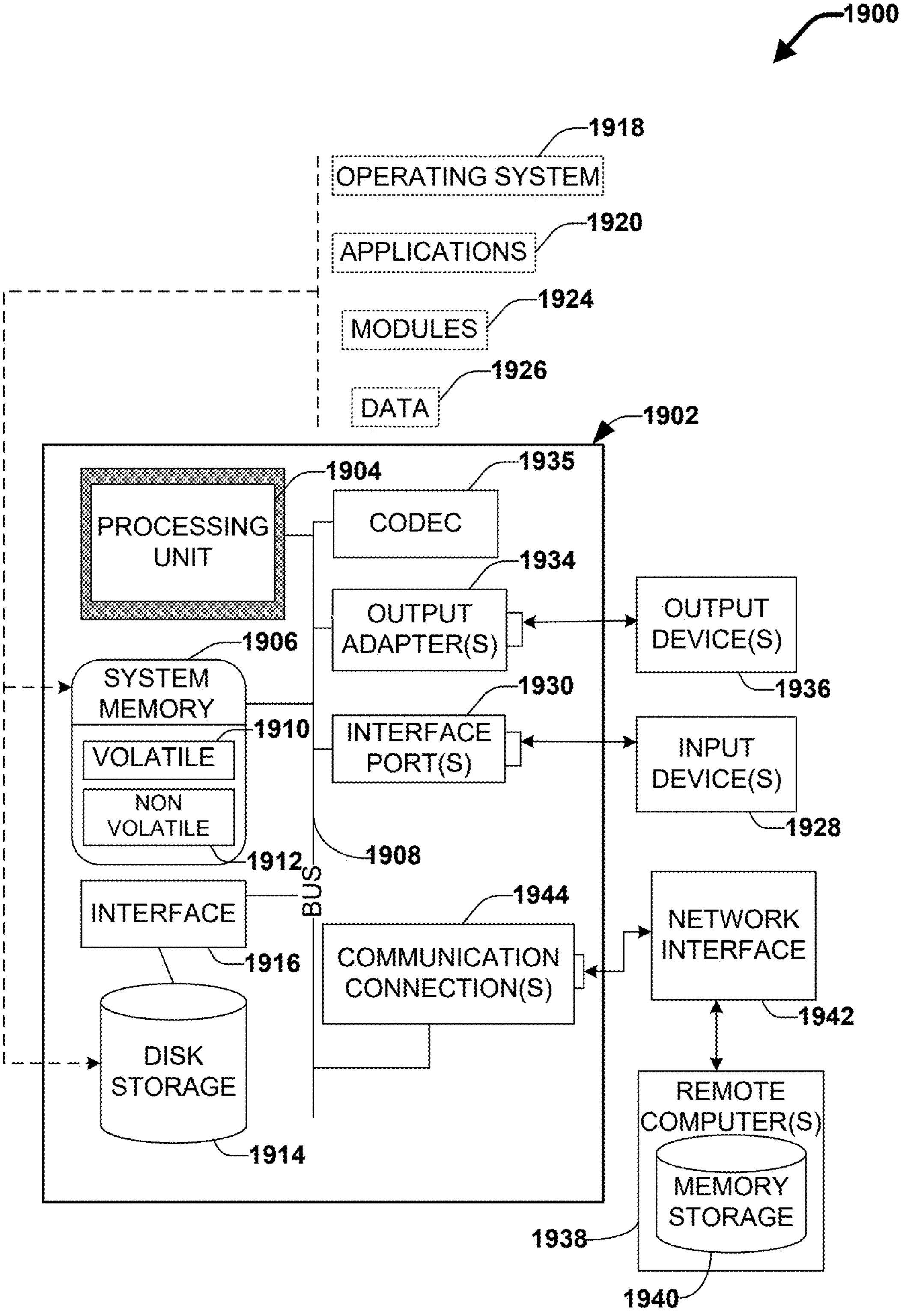
FIG. 19 is an example, non-limiting computing environment in which one or more embodiments described herein can be implemented.

With reference to FIG. 19, an example environment 1900 for implementing various aspects of the claimed subject matter includes a computer 1902. The computer 1902 includes a processing unit 1904, a system memory 1906, a codec 1935, and a system bus 1908. The system bus 1908 couples system components including, but not limited to, the system memory 1906 to the processing unit 1904. The processing unit 1904 can be any of various available processors. Dual microprocessors and other multiprocessor architectures also can be employed as the processing unit 1904.

The system bus 1908 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1384), and Small Computer Systems Interface (SCSI).

The system memory 1906 includes volatile memory 1910 and non-volatile memory 1912, which can employ one or more of the disclosed memory architectures, in various embodiments. The basic input/output system (BIOS), containing the basic routines to transfer information between elements within the computer 1902, such as during start-up, is stored in non-volatile memory 1912. In addition, according to present innovations, codec 1935 can include at least one of an encoder or decoder, wherein the at least one of an encoder or decoder can consist of hardware, software, or a combination of hardware and software. Although, codec 1935 is depicted as a separate component, codec 1935 can be contained within non-volatile memory 1912. By way of illustration, and not limitation, non-volatile memory 1912 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1912 can employ one or more of the disclosed memory devices, in at least some embodiments. Moreover, non-volatile memory 1912 can be computer memory (e.g., physically integrated with computer 1902 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1910 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1902 can also include removable/non-removable, volatile/non-volatile computer storage medium. FIG. 19 illustrates, for example, disk storage 1914. Disk storage 1914 includes, but is not limited to, devices like a magnetic disk drive, solid state disk (SSD), flash memory card, or memory stick. In addition, disk storage 1914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1914 to the system bus 1908, a removable or non-removable interface is typically used, such as interface 1916. It is appreciated that disk storage 1914 can store information related to a user. Such information might be stored at or provided to a server or to an application running on a user device. In one embodiment, the user can be notified (e.g., by way of output device(s) 1936) of the types of information that are stored to disk storage 1914 or transmitted to the server or application. The user can be provided the opportunity to opt-in or opt-out of having such information collected or shared with the server or application (e.g., by way of input from input device(s) 1928).

It is to be appreciated that FIG. 19 describes software that acts as an intermediary between users and the basic computer resources described in the suitable operating environment 1900. Such software includes an operating system 1910. Operating system 1910, which can be stored on disk storage 1914, acts to control and allocate resources of the computer 1902. Applications 1920 take advantage of the management of resources by operating system 1910 through program modules 1924, and program data 1926, such as the boot/shutdown transaction table and the like, stored either in system memory 1906 or on disk storage 1914. It is to be appreciated that the claimed subject matter can be implemented with various operating systems or combinations of operating systems.

A user enters commands or information into the computer 1902 through input device(s) 1928. Input devices 1928 include, but are not limited to, a pointing device such as a mouse, trackball, stylus, touch pad, touchscreen, keyboard, microphone, joystick, game pad, satellite dish, scanner, TV tuner card, digital camera, digital video camera, web camera, and the like. These and other input devices connect to the processing unit 1904 through the system bus 1908 via interface port(s) 1930. Interface port(s) 1930 include, for example, a serial port, a parallel port, a game port, and a universal serial bus (USB). Output device(s) 1936 use some of the same type of ports as input device(s) 1928. Thus, for example, a USB port can be used to provide input to computer 1902 and to output information from computer 1902 to an output device 1936. Output adapter 1934 is provided to illustrate that there are some output devices 1936 like monitors/displays, speakers, and printers, among other output devices 1936, which require special adapters. The output adapters 1934 include, by way of illustration and not limitation, video and sound cards that provide a means of connection between the output device 1936 and the system bus 1908. It should be noted that other devices or systems of devices provide both input and output capabilities such as remote computer(s) 1938.

Computer 1902 can operate in a networked environment using logical connections to one or more remote computers, such as remote computer(s) 1938. The remote computer(s) 1938 can be a personal computer, an onboard vehicle computer, a communication device (e.g., a mobile phone, a smartphone, a smartwatch, a wearable device, etc.), a server, a router, a network PC, a workstation, a microprocessor based appliance, a peer device, a smart phone, a tablet, or other network node, and typically includes many of the elements described relative to computer 1902. For purposes of brevity, only a memory storage device 1940 is illustrated with remote computer(s) 1938. Remote computer(s) 1938 is logically connected to computer 1902 through a network interface 1942 and then connected via communication connection(s) 1944. Network interface 1942 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1944 refers to the hardware/software employed to connect the network interface 1942 to the bus 1908. While communication connection 1944 is shown for illustrative clarity inside computer 1902, it can also be external to computer 1902. The hardware/software necessary for connection to the network interface 1942 includes, for exemplary purposes only, internal and external technologies such as, modems including regular telephone grade modems, cable modems and DSL modems, ISDN adapters, and wired and wireless Ethernet cards, hubs, and routers.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS);

Third Generation Partnership Project (3GPP) Long Term Evolution (LTE); Third Generation Partnership Project 2(3GPP2 ) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

Figure 20:
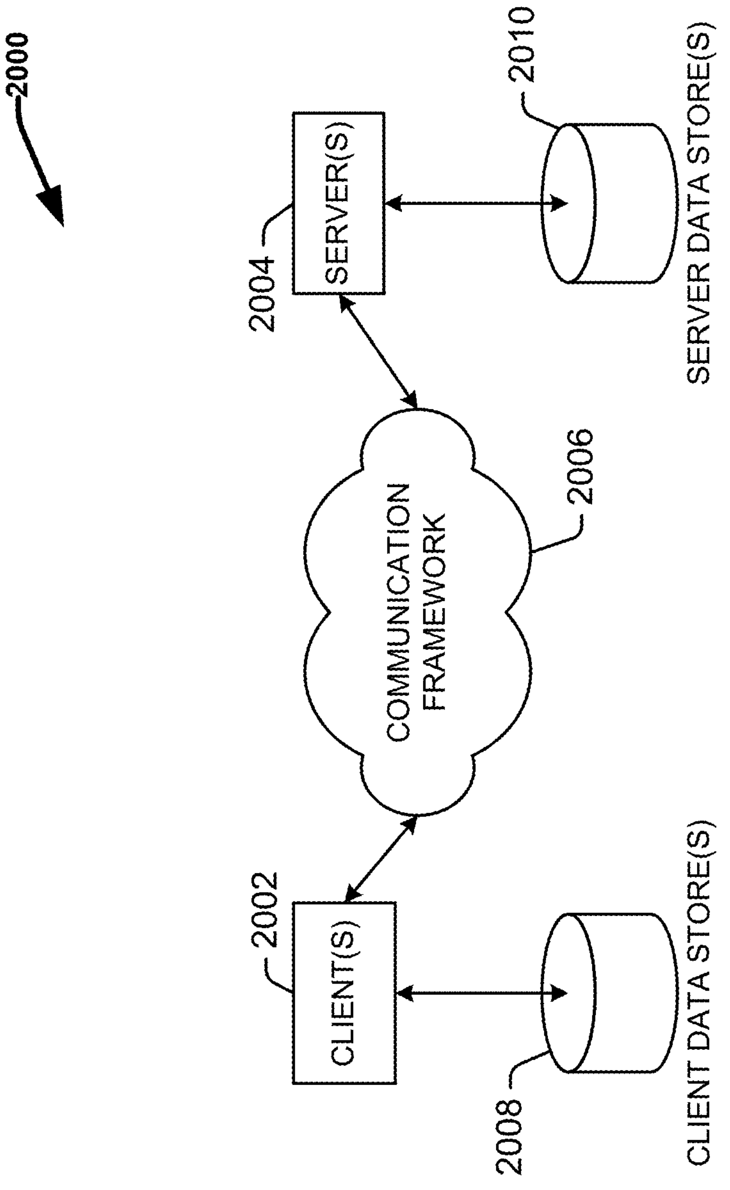
FIG. 20 is another example, non-limiting computing environment in which one or more embodiments described herein can be implemented.

Referring now to FIG. 20, there is illustrated a schematic block diagram of a computing environment 2000 in accordance with this specification. The system 2000 includes one or more client(s) 2002, (e.g., computers, smart phones, tablets, cameras, PDA's). The client(s) 2002 can be hardware and/or software (e.g., threads, processes, computing devices). The client(s) 2002 can house cookie(s) and/or associated contextual information by employing the specification, for example.

The system 2000 also includes one or more server(s) 2004. The server(s) 2004 can also be hardware or hardware in combination with software (e.g., threads, processes, computing devices). The servers 2004 can house threads to perform transformations of media items by employing aspects of this disclosure, for example. One possible communication between a client 2002 and a server 2004 can be in the form of a data packet adapted to be transmitted between two or more computer processes wherein data packets may include coded analyzed headspaces and/or input. The data packet can include a cookie and/or associated contextual information, for example. The system 2000 includes a communication framework 2006 (e.g., a global communication network such as the Internet) that can be employed to facilitate communications between the client(s) 2002 and the server(s) 2004.

Communications can be facilitated via a wired (including optical fiber) and/or wireless technology. The client(s) 2002 are operatively connected to one or more client data store(s) 2008 that can be employed to store information local to the client(s) 2002 (e.g., cookie(s) and/or associated contextual information). Similarly, the server(s) 2004 are operatively connected to one or more server data store(s) 2010 that can be employed to store information local to the servers 2004. Further, the client(s) 2002 can be operatively connected to one or more server data store(s) 2010.

In one exemplary implementation, a client 2002 can transfer an encoded file, (e.g., encoded media item), to server 2004. Server 2004 can store the file, decode the file, or transmit the file to another client 2002. It is noted that a client 2002 can also transfer uncompressed file to a server 2004 and server 2004 can compress the file and/or transform the file in accordance with this disclosure. Likewise, server 2004 can encode information and transmit the information via communication framework 2006 to one or more clients 2002.

The illustrated aspects of the disclosure can also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature can be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive-in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean “one or more” unless either otherwise specified or clear from the context to be directed to a singular form.

The term “set” as employed herein excludes the empty set, i.e., the set with no elements therein. Thus, a “set” in the subject disclosure includes one or more elements or entities. Likewise, the term “group” as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the technology are provided by the subject matter of the following clauses:

1. A computer-implemented method, performed by a data processing device of a system comprising a plurality of nodes respectively connected to one another via a communication framework, comprising:

intercepting protected data messages sent by one or more sender nodes of the plurality of nodes via the communication framework and directed to one or more receiver nodes of the plurality of nodes, the protected data messages being configured in accordance with a secure communication protocol;

performing a verification process of the secure communication protocol to verify the protected data messages sequentially in time as intercepted over time;

extracting data content from respective messages of the protected data messages in response to successful verification of the respective messages; and providing the data content to the one or more receiver nodes via the communication framework.

2. The computer-implemented method of any preceding clause, wherein the protected data messages comprise different types of messages, and wherein performing a verification process comprises performing different instances of the verification process for each type of the different types of messages, the different instances respectively tailored to the different types of messages.

3. The computer-implemented method of any preceding clause, wherein the one or more sender nodes comprise a plurality of sender nodes and wherein the different types of messages correspond to different sender nodes of the plurality of sender nodes.

4. The computer-implemented method of any preceding clause, wherein the different types of messages vary with respect to a type of the data content respectively included in the different types of messages.

5. The computer-implemented method of any preceding clause, wherein the different instances of the verification process employ different activation frequencies respectively tailored to the different types of messages.

6. The computer-implemented method of any preceding clause, wherein providing the data content comprises publishing, via the communication framework, the data content to a memory of the system with timestamps respectively indicating timing of interception of corresponding messages of the respective messages, wherein the one or more receiver nodes are configured to read the data content from the memory via the communication framework.

7. The computer-implemented method of any preceding clause, wherein at least one receiver node of the one or more receiver nodes is configured to read the data content associated with a same type of messages of the different types of messages from the shared memory at a different read frequency relative to a corresponding activation frequency of a corresponding instance of the verification process employed for the same type of messages.

8. The computer-implemented method of any preceding clause, wherein at least some of the one or more receiver nodes are configured to read the data content associated with a same type of messages of the different types of messages from the memory at different read frequencies.

9. The computer-implemented method of any preceding clause, wherein the one or more sender nodes comprise a first sender node configured to send first protected data messages of a first type of messages of the different types of messages at a first frequency, wherein performing a verification process comprises performing a first instance of the verification process tailored to the first type of messages and using an activation frequency corresponding to the first frequency, and wherein the one or more receiver nodes comprise at least one receiver node configured to read the data content as extracted from the first protected data messages from the memory at a lower frequency relative to the first frequency.

10. The computer-implemented method of any preceding clause, further comprising:

for same protected data messages belonging to a same type of messages of the different types of messages, detecting changes to the data content as extracted from the same protected data messages sequentially in time, and wherein the providing comprises providing the data content to the one or more receiver nodes based on detection of a change to the data content.

11. The computer-implemented method of any preceding clause, further comprising:

sending, via the communication framework, a notification to at least one receiver node of the one or more receiver nodes regarding the detection of the change.

12. The computer-implemented method of any preceding clause, wherein the system is integrated on or within a vehicle.

13. The computer-implemented method of any preceding clause, wherein the one or more sender nodes comprise electronic control units associated with different onboard systems of the vehicle and wherein the one or more receiver nodes comprise different applications executed by the data processing device.

14. The computer-implemented method of any preceding clause, wherein the different instances of the verification process are performed by separate software modules.

In various cases, any suitable combination or combinations of clauses 1-14 can be implemented.

The method of clause 1 above with any set of combinations of the method of clauses 2-14 above.

A system configured to perform the method of any one or set of combinations of the method of clauses 1-14 above.

A vehicle comprising the data processing device and configured to perform the method of any one or set of combinations of the method of clauses 1-14 above.

A non-transitory machine-readable storage medium comprising executable instructions that, when executed by a data processing device onboard a vehicle, facilitate performance of the method of any one or set of combinations of the clauses 1-14 above.

15. A computer-implemented method, comprising:

repeatedly executing, by a receiver node of a system comprising a plurality of nodes respectively connected to one another via the communication framework, a data reading process in association with consuming data content repeatedly sent to the receiver node by a sender node of the plurality of nodes in a protected format, wherein the plurality of nodes comprise the receiver node and the sender node, wherein the receiver node is coupled to at least one processor, and wherein the data reading process comprises:

reading, by the receiver node, the data content in a deprotected format as included in a memory of the system that is accessible to the plurality of nodes, wherein the repeatedly executing comprising repeatedly executing the data reading process at a read frequency that is different than a send frequency at which the sender node is configured to repeatedly send the data content to the receiver node.

16. The method of clause 15, wherein the data content in the deprotected format as included in the shared memory further comprises a timestamp indicating a time at which the data content was last sent by the sender node, and wherein the method further comprises:

determining, by the receiver node, whether the data content satisfies a freshness criterion based on a time difference between the timestamp a read time at which the reading is performed; and consuming, by the receiver node, the data content based on a determination that the data content satisfies the freshness criterion.

17. The method of any of clauses 15-16, wherein the read frequency is lower than the send frequency 18. The method of any clauses 15-17, wherein the read frequency is responsive to a trigger event.

19. The method of any clauses 15-18, wherein the read frequency varies and wherein the send frequency is fixed.

20. The method of any clauses 15-19, wherein the data content is included in the deprotected format in the memory in response to:

interception, by a communication management application of the system, of respective protected data messages comprising the data content as repeatedly sent by the sender node, and publication, by the communication management application, of the data content to the memory in the deprotected format as extracted from the respective protected data messages by the communication management application.

21. The method of any clauses 15-20, wherein the publication is further in response to verifying, by the communication management application, a validity of the data content in accordance with a secure communication protocol.

22. The method of any clauses 15-21, wherein the verifying the validity is based on respective counters included in the respective protected data messages.

23. The method of any clauses 15-22, wherein the system is integrated on or within a vehicle.

24. The method of any clauses 15-23, wherein the plurality of nodes comprise electronic control units associated with different onboard systems of the vehicle and different applications executed by a data processing device of the system.

25. The method of any clauses 15-24, wherein the data processing device comprises the processor and wherein the receiver node comprises an application of the different applications.

In various cases, any suitable combination or combinations of clauses 15-25 can be implemented.

The method of clause 15 above with any set of combinations of the method of clauses 16-25 above.

A system configured to perform the method of any one or set of combinations of the method of clauses 15-25 above.

A vehicle comprising the data processing device and configured to perform the method of any one or set of combinations of the method of clauses 15-25 above.

A non-transitory machine-readable storage medium comprising executable instructions that, when executed by a data processing device onboard a vehicle, facilitate performance of the method of any one or set of combinations of the clauses 15-25 above.

26. A computer-implemented method, performed by a data processing device of a system comprising a plurality of nodes respectively connected to one another via a communication framework, comprising:

executing a transmission relay process repeatedly at a defined execution frequency to control transmission of protected data messages between sender nodes of the plurality of nodes and respective receiver nodes of the plurality of nodes, wherein the transmission relay process comprises:

reading data entries published by the sender nodes to a memory of the system, the data entries respectively comprising data content to be sent to the respective receiver nodes;

generating the protected data messages respectively comprising the data content; and sending, via the communication framework, the protected data messages to the respective receiver nodes.

27. The computer-implemented method of clause 26, wherein the data entries further respectively comprise timestamps and validity thresholds that indicate a duration of time the data content is valid, and wherein the transmission relay process further comprises:

determining whether the data content is valid based on the validity thresholds and respective time differences between the timestamps and a current time, wherein the sending is responsive to the generating and wherein the generating is responsive to respective determinations that the data content is valid.

28. The computer-implemented method of any clause 26-27, wherein at least some of the validity thresholds vary over time.

29. The computer-implemented method of any clause 26-28, wherein the system is integrated on or within a vehicle, and wherein at least some of the validity thresholds vary based on a context of the vehicle.

30. The computer-implemented method of any clause 26-29, wherein the data entries are published by the sender nodes to the memory of the system repeatedly in accordance with respective publication frequencies employed by the sender nodes.

31. The computer-implemented method of any clause 26-30, wherein at least some of the publication frequencies are different.

32. The computer-implemented method of any clause 26-31, wherein at least some of the publication frequencies are different relative to the defined execution frequency.

33. The computer-implemented method of any preceding clause 26-32, wherein at least some of the publication frequencies vary over time.

34. The computer-implemented method of any 26-33, wherein the at least some of the publication frequencies vary based on a context of the system.

35. The computer-implemented method of any 26-34, wherein the system is integrated on or within a vehicle, and wherein the context of the system corresponds to a vehicle context of the vehicle.

36. The computer-implemented method of any preceding 26-35, wherein the system is integrated on or within a vehicle.

37. The computer-implemented method of any clause 26-36, wherein the plurality of nodes comprise electronic control units associated with different onboard systems of the vehicle and different applications executed by the data processing device.

38. The computer-implemented method of any 26-37, wherein the executing comprises executing different instances of the transmission relay process, the different instances respectively tailored to different types of the data content or different sender nodes.

39. The computer-implemented method of any 26-38, wherein the different instances of the transmission relay process are performed by separate software modules.

In various cases, any suitable combination or combinations of clauses 26-39 can be implemented.

A system configured to perform the method of any one or set of combinations of the method of clauses 26-39 above.

A vehicle comprising the data processing device and configured to perform the method of any one or set of combinations of the method of clauses 26-39 above.

A non-transitory machine-readable storage medium comprising executable instructions that, when executed by a data processing device onboard a vehicle, facilitate performance of the method of any one or set of combinations of the clauses 26-39 above.

40. A computer-implemented method, comprising:

generating or obtaining, by a sender node of a system comprising a plurality of nodes respectively connected to one another via a communication framework, data content to be sent to one or more receiver nodes of the plurality of nodes, wherein the plurality of nodes comprise the sender node, and wherein the sender node is coupled to at least one processor; and publishing, by the sender node, a data transmission entry to a memory of the system, wherein the data transmission entry comprises the data content, wherein a communication management application of the system is configured to read the data transmission entry from the memory and send a protected data message comprising the data content to the one or more receiver nodes.

41. The computer-implemented method of clause 40, wherein the data transmission entry further comprises a timestamp and a validity threshold, and wherein the communication management application is configured to send the protected data message comprising the data content to the one or more receiver nodes in response to verifying a validity of the data content based on a time difference between the timestamp and a read time at which the data transmission entry is read by the communication management application satisfying the validity threshold.

42. The computer-implemented method of any clause 40-41, wherein the data transmission entry further comprises a timestamp and a validity threshold, and wherein the communication management application is configured to not send the protected data message comprising the data content to the one or more receiver nodes in response to determining the data content is invalid based on a time difference between the timestamp and a read time at which the data transmission entry is read by the communication management application failing to satisfy the validity threshold.

43. The computer-implemented method of any clause 40-42, wherein the generating or obtaining comprises repeatedly generating or obtaining updated versions of the data content, and wherein the publishing comprises repeatedly publishing updated data transmission entries comprising the updated versions.

44. The computer-implemented method of any clause 40-43, wherein the publishing the data transmission entry and the repeatedly publishing the updated data entries is responsive to a trigger event.

45. The computer-implemented method of any clause 40-44, wherein the communication management application is configured to repeatedly read a current version of the data content data from the memory and repeatedly send the protected data message comprising the current version of the data content to the one or more receiver nodes, and wherein a first frequency at which the sender node is configured to repeatedly publish the updated data transmission entries is different relative to a second frequency at which the communication management application is configured to repeatedly send the protected data message.

46. The computer-implemented method of any clause 40-45, wherein the first frequency is lower than the second frequency.

47. The computer-implemented method of any clause 40-46, wherein the first frequency is based on occurrence of a trigger event.

48. The computer-implemented method of any clause 40-47, wherein the first frequency varies based on a context of the system and wherein the second frequency is fixed.

49. The computer-implemented method of any clause 40-48, wherein the system is integrated on or within a vehicle, and wherein the context of the system corresponds to a vehicle context of the vehicle.

50. The computer-implemented method of any clause 40-49, wherein the system is integrated on or within a vehicle.

51. The computer-implemented method of any clause 40-50, wherein the plurality of nodes comprise electronic control units associated with different onboard systems of the vehicle and different applications executed by a data processing device of the system.

52. The computer-implemented method of any clause 40-51, wherein the data processing device comprises the processor and wherein the sender node comprises an application of the different applications.

In various cases, any suitable combination or combinations of clauses 40-52 can be implemented.

A system configured to perform the method of any one or set of combinations of the method of clauses 40-52 above.

A vehicle comprising the data processing device and configured to perform the method of any one or set of combinations of the method of clauses 40-52 above.

A non-transitory machine-readable storage medium comprising executable instructions that, when executed by a data processing device onboard a vehicle, facilitate performance of the method of any one or set of combinations of the clauses 40-52 above.

What is claimed is:

1. A computer-implemented method, comprising:

generating or obtaining, by a sender node of a system comprising a plurality of nodes respectively connected to one another via a communication framework, data content to be sent to one or more receiver nodes of the plurality of nodes, wherein the plurality of nodes comprise the sender node, wherein the system is integrated on or within a vehicle, and wherein the sender node is coupled to at least one processor; and publishing, by the sender node, a data transmission entry to a shared memory of the system, wherein the data transmission entry comprises the data content, and wherein the data content of the data transmission entry corresponds to a payload to be sent in a protected data message and excludes end-to-end protection fields of a secure communication protocol, wherein a communication management application of the system is configured to execute a transmission relay process comprising:

reading the data transmission entry from the shared memory, based on the data content included in the data transmission entry and on the secure communication protocol, sending a protected data message configured in accordance with the secure communication protocol by adding the end-to-end protection fields to the data content comprising the data content to the one or more receiver nodes via the communication framework on behalf of the sender node, the communication management application being further configured to perform the transmission relay process for messages originating from a plurality of different sender nodes of the plurality of nodes, and wherein the data transmission entry further comprises a timestamp and a validity threshold, and wherein the communication management application is configured to not send the protected data message comprising the data content to the one or more receiver nodes in response to determining the data content is invalid based on a time difference between the timestamp and a read time at which the data transmission entry is read by the communication management application failing to satisfy the validity threshold.

2. The method of claim 1, wherein the communication management application is further configured to send the protected data message comprising the data content to the one or more receiver nodes in response to verifying a validity of the data content based on a time difference between the timestamp and a read time at which the data transmission entry is read by the communication management application satisfying the validity threshold.

3. The method of claim 1, wherein the generating or obtaining comprises repeatedly generating or obtaining updated versions of the data content, and wherein the publishing comprises repeatedly publishing updated data transmission entries comprising the updated versions.

4. The method of claim 3, wherein the publishing the data transmission entry and the repeatedly publishing the updated data entries is responsive to a trigger event.

5. The method of claim 3, wherein the communication management application is configured to repeatedly read a current version of the data content data from the memory and repeatedly send the protected data message comprising the current version of the data content to the one or more receiver nodes, and wherein a first frequency at which the sender node is configured to repeatedly publish the updated data transmission entries is different relative to a second frequency at which the communication management application is configured to repeatedly send the protected data message.

6. The method of claim 5, wherein the first frequency is lower than the second frequency.

7. The method of claim 5, wherein the first frequency is based on occurrence of a trigger event.

8. The method of claim 5, wherein the first frequency varies based on a context of the system and wherein the second frequency is fixed.

9. The method of claim 8, wherein the system is integrated on or within a vehicle, and wherein the context of the system corresponds to a vehicle context of the vehicle.

10. The method of claim 1, wherein the plurality of nodes comprise electronic control units associated with different onboard systems of the vehicle and different applications executed by a data processing device of the system.

11. The method of claim 1, wherein the data processing device comprises the processor and wherein the sender node comprises an application of the different applications.

12. A system of a vehicle, comprising:

a plurality of nodes respectively connected to one another via a communication framework;

a processor; and a memory that stores executable instructions that, when executed by the processor, facilitate performance of operations, comprising:

generating or obtaining, by a sender node of the plurality of nodes, data content to be sent to one or more receiver nodes of the plurality of nodes; and publishing, by the sender node, a data transmission entry to a shared memory of the system, wherein the data transmission entry comprises the data content, and wherein the data content of the data transmission entry corresponds to a payload to be sent in a protected data message and excludes end-to-end protection fields of a secure communication protocol, wherein a communication management application of the system is configured to execute a transmission relay process comprising:

reading the data transmission entry from the shared memory, based on the data content included in the data transmission entry and on the secure communication protocol, sending a protected data message configured in accordance with the secure communication protocol by adding the end-to-end protection fields to the data content comprising the data content to the one or more receiver nodes via the communication framework on behalf of the sender node, the communication management application being further configured to perform the transmission relay process for messages originating from a plurality of different sender nodes of the plurality of nodes, and wherein the data transmission entry further comprises a timestamp and a validity threshold, and wherein the communication management application is configured to not send the protected data message comprising the data content to the one or more receiver nodes in response to determining the data content is invalid based on a time difference between the timestamp and a read time at which the data transmission entry is read by the communication management application failing to satisfy the validity threshold.

13. The system of claim 12, wherein the communication management application is further configured to send the protected data message comprising the data content to the one or more receiver nodes in response to verifying a validity of the data content based on a time difference between the timestamp and a read time at which the data transmission entry is read by the communication management application satisfying the validity threshold.

14. The system of claim 12, wherein the generating or obtaining comprises repeatedly generating or obtaining updated versions of the data content, and wherein the publishing comprises repeatedly publishing updated data transmission entries comprising the updated versions, and wherein the communication management application is configured to repeatedly read a current version of the data content data from the memory and repeatedly send the protected data message comprising the current version of the data content to the one or more receiver nodes, and wherein a first frequency at which the sender node is configured to repeatedly publish the updated data transmission entries is different relative to a second frequency at which the communication management application is configured to repeatedly send the protected data message.

15. The system of claim 14, wherein at least one of: the first frequency is lower than the second frequency, the first frequency is based on occurrence of a trigger event, or the first frequency varies based on a context of the system and the second frequency is fixed.

16. The system of claim 12, wherein the plurality of nodes comprise electronic control units associated with different onboard systems of the vehicle and different applications executed by the processor.

17. A non-transitory machine-readable storage medium, comprising executable instructions that, when executed by a processor of a system of a vehicle comprising a plurality of nodes respectively connected to one another via the communication framework, facilitate performance of operations, comprising:

generating or obtaining, by a sender node of the plurality of nodes, data content to be sent to one or more receiver nodes of the plurality of nodes; and publishing, by the sender node, a data transmission entry to a shared memory of the system, wherein the data transmission entry comprises the data content, and wherein the data content of the data transmission entry corresponds to a payload to be sent in a protected data message and excludes end-to-end protection fields of a secure communication protocol, wherein a communication management application of the system is configured to execute a transmission relay process comprising:

reading the data transmission entry from the shared memory, based on the data content included in the data transmission entry and on the secure communication protocol, sending a protected data message configured in accordance with the secure communication protocol by adding the end-to-end protection fields to the data content comprising the data content to the one or more receiver nodes via the communication framework on behalf of the sender node, the communication management application being further configured to perform the transmission relay process for messages originating from a plurality of different sender nodes of the plurality of nodes, and wherein the data transmission entry further comprises a timestamp and a validity threshold, and wherein the communication management application is configured to not send the protected data message comprising the data content to the one or more receiver nodes in response to determining the data content is invalid based on a time difference between the timestamp and a read time at which the data transmission entry is read by the communication management application failing to satisfy the validity threshold.

18. The non-transitory machine-readable storage medium of claim 17, wherein the communication management application is further configured to send the protected data message comprising the data content to the one or more receiver nodes in response to verifying a validity of the data content based on a time difference between the timestamp and a read time at which the data transmission entry is read by the communication management application satisfying the validity threshold.

19. The non-transitory machine-readable storage medium of claim 17, wherein the generating or obtaining comprises repeatedly generating or obtaining updated versions of the data content, and wherein the publishing comprises repeatedly publishing updated data transmission entries comprising the updated versions.

20. The non-transitory machine-readable storage medium of claim 17, wherein the publishing the data transmission entry and the repeatedly publishing the updated data entries is responsive to a trigger event.

* * * * *